US009838900B2

(12) United States Patent
Zhou et al.

(10) Patent No.: US 9,838,900 B2
(45) Date of Patent: Dec. 5, 2017

(54) ENHANCED RTS/CTS ENABLEMENT AND DETECTION

(71) Applicant: QUALCOMM Incorporated, San Diego, CA (US)

(72) Inventors: Yan Zhou, San Diego, CA (US); Gwendolyn Denise Barriac, Encinitas, CA (US); Simone Merlin, Solana Beach, CA (US); George Cherian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 51 days.

(21) Appl. No.: 14/852,434

(22) Filed: Sep. 11, 2015

(65) Prior Publication Data

US 2016/0081106 A1    Mar. 17, 2016

Related U.S. Application Data

(60) Provisional application No. 62/050,691, filed on Sep. 15, 2014.

(51) Int. Cl.
*H04W 72/12* (2009.01)
*H04W 24/10* (2009.01)
(Continued)

(52) U.S. Cl.
CPC ........... *H04W 24/10* (2013.01); *H04W 28/26* (2013.01); *H04W 74/0816* (2013.01); *H04W 74/00* (2013.01)

(58) Field of Classification Search
CPC ..... H04W 24/10; H04W 28/26; H04W 72/12; H04W 72/121; H04W 72/1257;
(Continued)

(56) References Cited

U.S. PATENT DOCUMENTS 7,154,854 B1    12/2006 Zweig et al.
7,912,018 B2    3/2011 Kim et al.
(Continued)

OTHER PUBLICATIONS

Deng J., et al., "Tuning the Carrier Sensing Range of IEEE 802.11 MAC," Global Telecommunications Conference, 2004, Globecom '04, IEEE Dallas, TX, USA Nov. 29-Dec. 3, 2004, Piscataway, NJ, USA,IEEE, Piscataway, NJ, USA, vol. 5, Nov. 29, 2004 (Nov. 29, 2004), pp. 2987-2991, XP010758270, DOI: 10.1109/GL0C0M. 2004.1378900 ISBN: 978-0-7803-8794-2 paragraph [0011].

(Continued)

*Primary Examiner* — Tri H Phan
(74) *Attorney, Agent, or Firm* — Arent Fox LLP

(57) ABSTRACT

In an aspect of the disclosure, a method, a computer-readable medium, and an apparatus are provided. The apparatus may be an AP that requests a plurality of STAs to jointly enable and disable an MRP based on at least one of that each STA of the STAs has uplink traffic with the AP or that each STA of a subset of the STAs has a hidden node. The AP receives, from the STAs, information indicating a communication metric while jointly enabling or disabling the MRP. The AP determines, based on the received information indicating the communication metric, whether the joint enablement of the medium reserving procedure improves communication for the plurality of STAs. The AP requests the STAs to jointly enable the medium reserving procedure for subsequent communication when the joint enablement of the medium reserving procedure improves communication for the plurality of STAs.

25 Claims, 31 Drawing Sheets

(51) Int. Cl.
*H04W 74/08* (2009.01)
*H04W 28/26* (2009.01)
*H04W 74/00* (2009.01)

(58) Field of Classification Search
CPC . H04W 74/00; H04W 74/08; H04W 74/0816; H04W 84/12; H04W 74/02; H04W 74/06
See application file for complete search history.

(56) References Cited

U.S. PATENT DOCUMENTS

| | | | |
|---|---|---|---|
| 8,451,771 B2 | 5/2013 | Hedayat et al. | |
| 8,693,431 B2 | 4/2014 | Patil et al. | |
| 2011/0086664 A1* | 4/2011 | Li | H04W 52/241 455/522 |
| 2014/0334387 A1* | 11/2014 | Doppler | H04W 74/0816 370/329 |
| 2015/0063189 A1 | 3/2015 | Merlin et al. | |
| 2015/0288427 A1* | 10/2015 | Wang | H04W 72/1273 370/329 |
| 2016/0088618 A1* | 3/2016 | Barriac | H04W 74/0816 370/329 |
| 2016/0105888 A1* | 4/2016 | Seok | H04W 16/10 370/329 |
| 2016/0227578 A1* | 8/2016 | Lee | H04W 74/004 |
| 2017/0006596 A1* | 1/2017 | Adachi | H04W 72/0453 |

OTHER PUBLICATIONS

International Search Report and Written Opinion—PCT/US2015/050041—ISA/EPO—dated Mar. 7, 2016.
Orfanos G, "Development and Performance Evaluation of an MAC Protocol for MC-CDMA Wireless LANs with QoS Support," Internet ABMT, vol. 52 Jul. 1, 2006 (Jul. 1, 2006), pp. 137-144, XP002754714, Mainz ISBN: 3-86130-931-9 Retrieved from the Internet: URL:http://www.comnets.rwth-aachen.de/publ ications/complete-lists/abstracts/singlepage/p/892.html?tx_cndownload_pil[subtype]=a bstract [retrieved on Feb. 24, 2016]p. 141.
Abusubaih M., et al., "Collaborative Setting of RTS/CTS in Multi-Rate Multi-BSS IEEE 802.11 wireless LANs", 16th IEEE Workshop on Local and Metropolitan Area Networks, XP055153629, Sep. 1, 2008, pp. 31-36, DOI: 10.1109/LANMAN.2008.4675840, ISBN: 978-1-42-442027-8.
Chen Y., et al., "An RTS-On-Demand Mechanism to Overcome Self-Interference in an 802.11 System", Military Communications Conference, MILCOM 2007, IEEE, Piscataway, NJ, USA, XP031232960, Oct. 29, 2007, pp. 1-7, ISBN: 978-1-4244-1512-0.
Ebert J.P., et al., "Analyzing the RTS/CTS Mechanism", IEEE Draft, IEEE-SA, Piscataway, NJ, USA, vol. 802.11, Jul. 1, 1995 (Jul. 1, 1995), pp. 1-9, XP017606658, [retrieved on Mar. 19, 2001].
Partial International Search Report—PCT/US2015/050041—ISA/EPO—dated Nov. 20, 2015.

\* cited by examiner

700

710

| Element ID | Length | Group Indicator | RTS On Start Time | RTS On Duration | RTS Off Start Time | RTS Off Duration |
|---|---|---|---|---|---|---|
| 711 | 712 | 715 | 716 | 717 | 718 | 719 |

750

| Element ID | Length | Existence Indicator | Report Indicator | Group Indicator | RTS On Start Time | RTS On Duration | RTS Off Start Time | RTS Off Duration |
|---|---|---|---|---|---|---|---|---|
| 751 | 752 | 753 | 754 | 755 | 756 | 757 | 758 | 759 |

FIG. 7

ENHANCED RTS/CTS ENABLEMENT AND DETECTION

CROSS-REFERENCE TO RELATED APPLICATION(S)

This application claims the benefit of U.S. Provisional Application Ser. No. 62/050,691, entitled "ENHANCED RTS/CTS ENABLEMENT AND DETECTION" and filed on Sep. 15, 2014, which is expressly incorporated by reference herein in its entirety.

BACKGROUND

Field

The present disclosure relates generally to communication systems, and more particularly, to techniques of enhanced Request-to-Send (RTS)/Clear-to-Send (CTS) enablement and detection.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer program products, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved narrowband channel selection for devices in a wireless network In an aspect of the disclosure, a method, a computer-readable medium, and an apparatus are provided. The apparatus may be an AP. The AP requests a plurality of STAs to jointly enable and disable a medium reserving procedure (MRP) for communication based on at least one of that each STA of the plurality of STAs has uplink traffic with the AP or that each STA of a subset of STAs of the plurality of STAs has a hidden node that transmits data to the AP and disrupts a communication between the AP and the each STA. The AP receives, from the plurality of STAs, information indicating a communication metric while jointly enabling or disabling the medium reserving procedure for communication. The AP determines, based on the received information indicating the communication metric, whether the joint enablement of the medium reserving procedure improves communication for the plurality of STAs. The AP requests the plurality of STAs to jointly enable the medium reserving procedure for subsequent communication when the joint enablement of the medium reserving procedure improves communication for the plurality of STAs.

In another aspect of the disclosure, a method, a computer-readable medium, and an apparatus are provided. The apparatus may be a first STA. The first STA sends, in accordance with an RTS/CTS procedure, one or more RTS messages to a second STA. The first STA receives zero or more CTS messages in response to the RTS messages from the second STA. The first STA determines a response rate based on the RTS messages and the CTS messages. The first STA sends a first switching request to the second STA when the response rate meets a threshold. The first switching request requests the second STA to implement a polling procedure. The polling procedure announces receiver availability for receiving data transmission.

BRIEF DESCRIPTION OF THE DRAWINGS

FIG. 7 is a diagram illustrating formats of information elements used to signal joint enablement of the RTS/CTS procedure.

DETAILED DESCRIPTION

Figure 1:
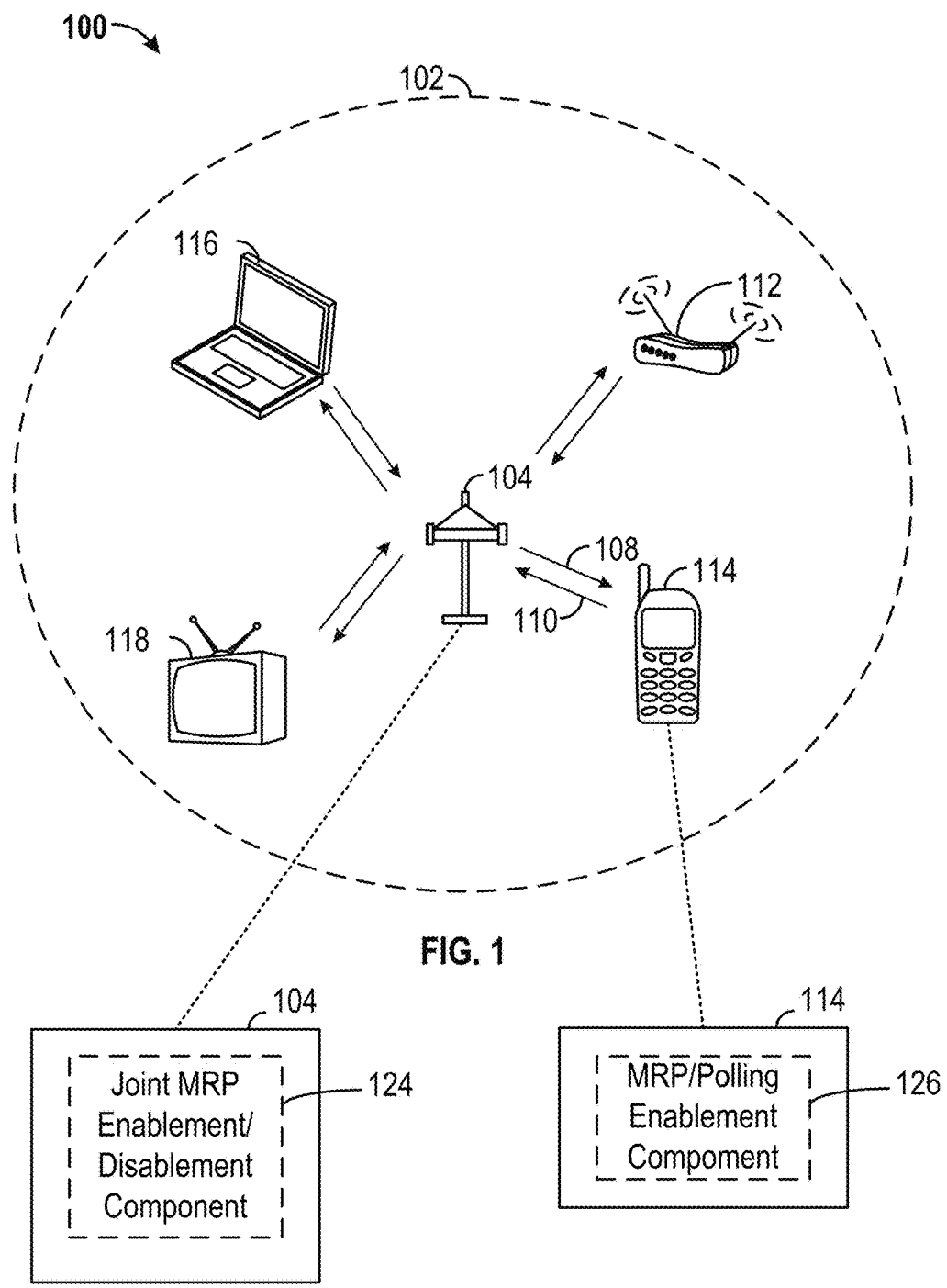
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer-readable media, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., WiFi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams, and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Certain of the devices described herein may further implement Multiple Input Multiple Output (MIMO) technology and be implemented as part of the 802.11 standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104.

In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. The AP 104 may include a joint MRP enablement/disablement component 124. The joint MRP enablement/disablement component 124 may control a process of requesting a plurality of STAs to jointly enable and disable a medium reserving procedure for communication based on at least one of that each STA of the plurality of STAs has uplink traffic with the AP or that each STA of a subset of STAs of the plurality of STAs has a hidden node that transmits data to the AP and disrupts a communication between the AP and the each STA. The joint MRP enablement/disablement component 124 may control a process of receiving, from the plurality of STAs, information indicating a communication metric while jointly enabling or disabling the medium reserving procedure for communication. The joint MRP enablement/disablement component 124 may control a process of determining, based on the received information indicating the communication metric, whether the joint enablement of the medium reserving procedure improves communication for the plurality of STAs. The joint MRP enablement/disablement component 124 may control a process of requesting the plurality of STAs to jointly enable the medium reserving procedure for subsequent communication when the joint enablement of the medium reserving procedure improves communication for the plurality of STAs.

In another aspect, the STA 114 may include one or more components for performing various functions. For example, the STA 114 may include an MRP/polling enablement component 126. The MRP/polling enablement component 126 may control a process of sending, in accordance with an RTS/CTS procedure, one or more RTS messages to a second STA. The MRP/polling enablement component 126 may control a process of receiving zero or more CTS messages in response to the RTS messages from the second STA. The MRP/polling enablement component 126 may control a process of determining a response rate based on the RTS messages and the CTS messages. The MRP/polling enablement component 126 may control a process of sending a first switching request to the second STA when the response rate meets a threshold, the first switching request requesting the second STA to implement a polling procedure, the polling procedure announcing receiver availability for receiving data transmission.

Figure 2:
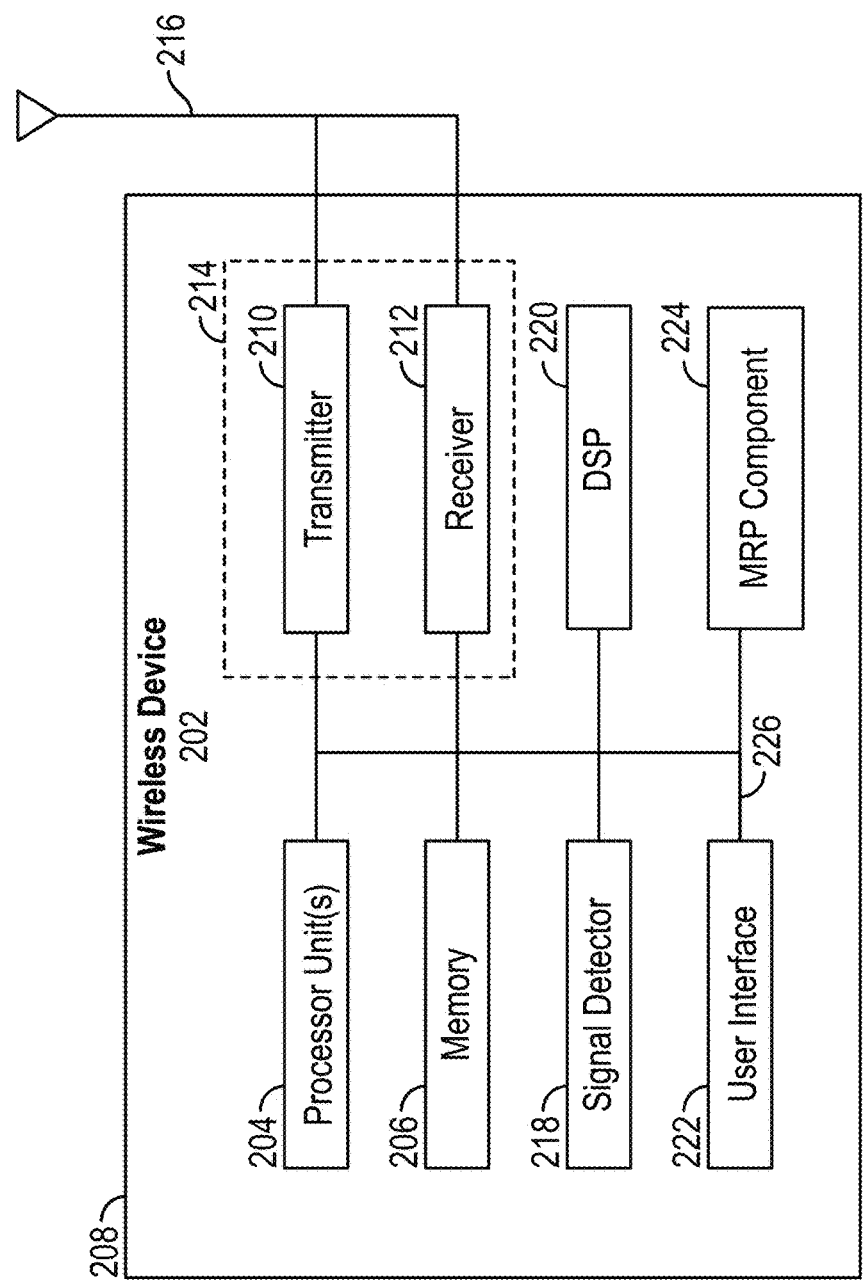
FIG. 2 shows a functional block diagram of an example wireless device that may be employed within the wireless communication system of FIG. 1.

FIG. 2 is a functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or any one of the STAs 112, 114, 116, or 118.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable (by the processor 204, for example) to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote device. The transmitter 210 and the receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used to detect and quantify the level of signals received by the transceiver 214 or the receiver 212. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may also an MRP component 224. When the wireless device 202 is implemented as an AP, the MRP component 224 may control a process of requesting a plurality of STAs to jointly enable and disable a medium reserving procedure for communication based on at least one of that each STA of the plurality of STAs has uplink traffic with the AP or that each STA of a subset of STAs of the plurality of STAs has a hidden node that transmits data to the AP and disrupts a communication between the AP and the each STA. The MRP component 224 may control a process of receiving, from the plurality of STAs, information indicating a communication metric while jointly enabling or disabling the medium reserving procedure for communication. The MRP component 224 may control a process of determining, based on the received information indicating the communication metric, whether the joint enablement of the medium reserving procedure improves communication for the plurality of STAs. The MRP component 224 may control a process of requesting the plurality of STAs to jointly enable the medium reserving procedure for subsequent communication when the joint enablement of the medium reserving procedure improves communication for the plurality of STAs.

When the wireless device 202 is implemented as a STA, the MRP component 224 may control a process of sending, in accordance with an RTS/CTS procedure, one or more RTS messages to a second STA. The MRP component 224 may control a process of receiving zero or more CTS messages in response to the RTS messages from the second STA. The MRP component 224 may control a process of determining a response rate based on the RTS messages and the CTS messages. The MRP component 224 may control a process of sending a first switching request to the second STA when the response rate meets a threshold, the first switching request requesting the second STA to implement a polling procedure, the polling procedure announcing receiver availability for receiving data transmission.

The various components of the wireless device 202 may be coupled together by a bus system 226. The bus system 226 may include a data bus, for example, as well as a power bus, a control signal bus, and a status signal bus in addition to the data bus. Components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218, the DSP 220, the user interface 222, and/or the MRP component 224. Further, each of the components illustrated in FIG. 2 may be implemented using a plurality of separate elements.

A. Full Buffer Hidden Node

Figure 3:
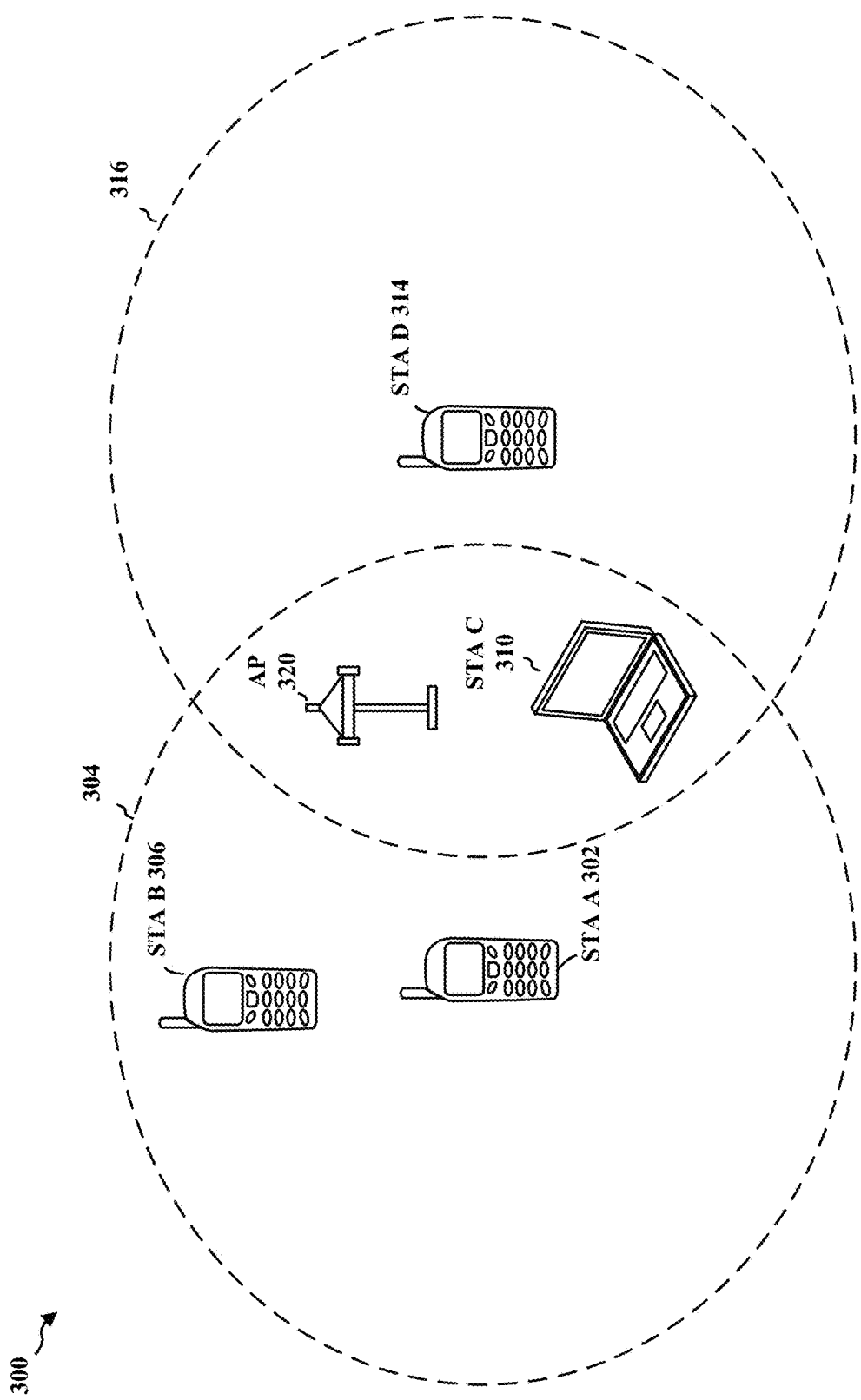
FIG. 3 is a diagram illustrating wireless devices in a wireless network.

FIG. 3 is a diagram 300 illustrating wireless devices in a wireless network. As shown, a station A 302 has a transmission range 304. A station B 306, a station C 310, and an access point 320 are within the transmission range 304 and can receive signal communication from the station A 302. A station D 314 has a transmission range 316. The station C 310 and the access point 320 are within the transmission range 316 and can receive signal communication from the station D 314. The station A 302 and the station D 314 are outside the transmission ranges of each other and may not receive signal communication from each other. Thus, the station A 302 and the station D 314 may be considered as hidden nodes or hidden stations to each other.

Figure 4:
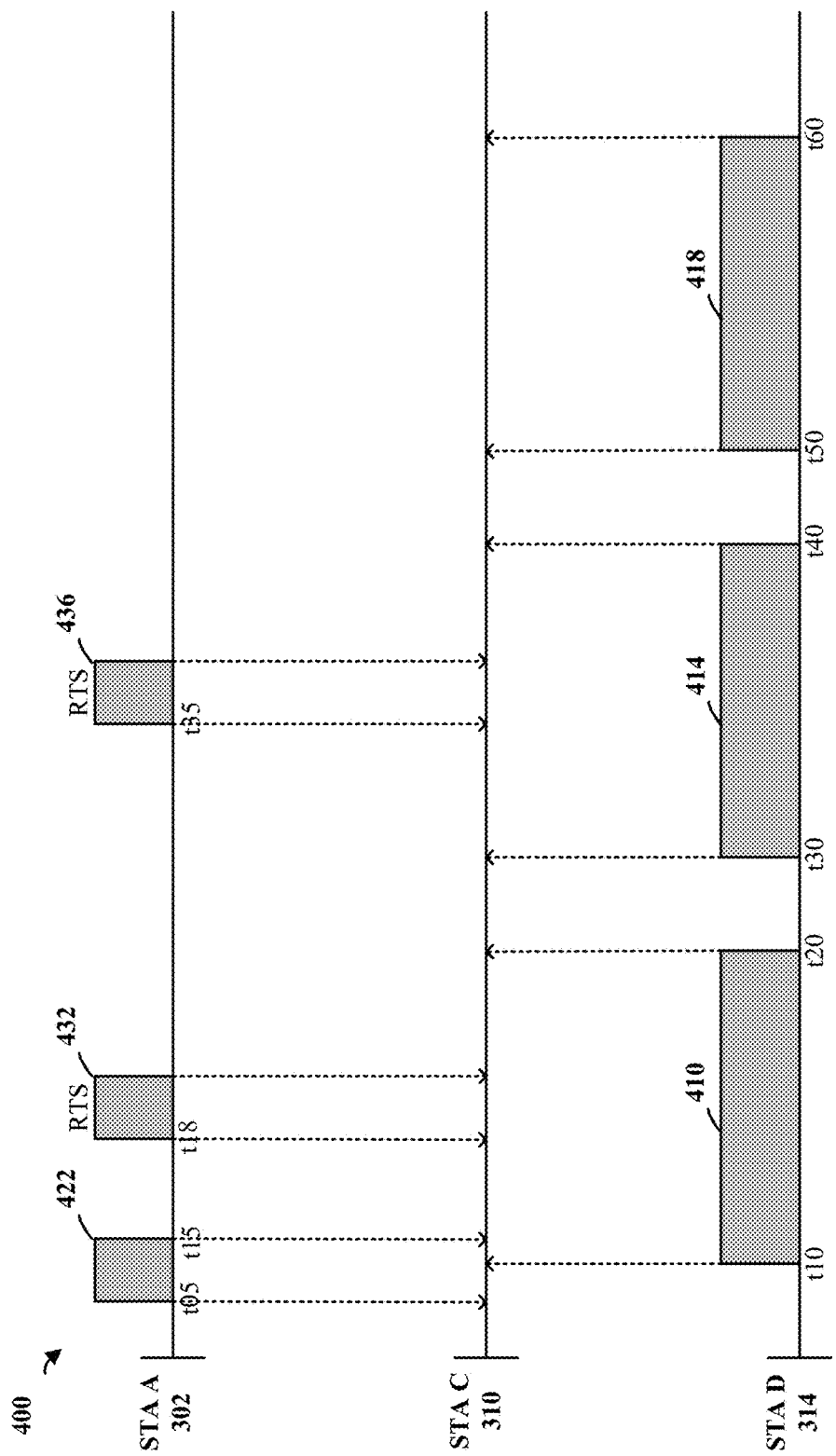
FIG. 4 is a diagram illustrating signal communication among wireless devices having full buffer neighboring devices in a wireless network.

FIG. 4 is a diagram 400 illustrating signal communication among wireless devices having full buffer neighboring devices in a wireless network. For simplicity and clarity, some technical features may be omitted from the figures. As shown, in this example, from time t10 to t20, the station D 314 is transmitting a data frame 410 to the station C 310. From time t30 to t40, the station D 314 is transmitting a data frame 414 to the station C 310. From time t50 to t60, the station D 314 is transmitting a data frame 418 to the station C 310. The station D 314 may have substantial amount of data to be transmitted to the station C 310. Accordingly, the transmission buffer at the station D 314 may be substantially occupied all the time and may have little idle time. The inter-frame spacing between the data frame 410 and the data frame 414 as well as between the data frame 414 and the data frame 418 (e.g., the time period from t20 to t30 and the time period from t40 to t50) may be configured to be a short inter frame space (SIFS). The transmission buffer of the station D 314 may be considered as a full buffer, and the data transmission from the station D 314 to station C 310 may be considered as a full buffer transmission. As will be described infra in more detail, the full buffer transmission from the station D 314 to the station C 310 may cause issues to other stations (e.g., the station A 302) that attempt to transmit data to the station C 310.

In this example, the station A 302 may attempt to communicate with the station C 310 using the same carrier as is used by the station D 314 to transmit data. Particularly, from time t05 to t15, the station A 302 may transmit a data frame 422 to the station C 310. The time t05 is prior to time t10 and time t15 is subsequent to time t10 (at which the station D 314 starts transmitting the data frame 410 to the station C 310). Note that the station D 314 is out of the transmission range 304 of the station A 302 and, thus, does not sense that the station A 302 is using the carrier. Consequently, the station D 314 at time t10 does not withhold data transmission in order to prevent data collisions. Because the data frame 410 and the data frame 422 interferes with each other at the station C 310, each of the data packets used to transmit the data frame 410 and the data frame 422 may or may not be successfully received at the station C 310. In other words, the data frame 410 transmitted from the station D 314 interferes with the data frame 422 transmitted from the station A 302 at the station C 310. Thus, an issue exists in that the data frame 422 may not be correctly received at the station C 310.

A.1 RTS/CTS does not Solve Full Buffer Hidden Node Issue

After several attempts to transmit data frames to the station C 310, in one technique, the station A 302 may decide to initiate a medium reserving procedure such as a Request-to-Send (RTS)/Clear-to-Send (CTS) procedure to protect data transmission based on PER, retry rate, or packet length. The PER is the number of incorrectly received data packets divided by the total number of received packets. A packet is declared incorrect if at least one bit is erroneous. Using the RTS/CTS procedure, when the station A 302 has a frame to send, the station A 302 can initiate the procedure by sending an RTS frame. The RTS frame serves several purposes: in addition to reserving the radio link for transmission, it silences any stations that hear it. If the station C 310 receives the RTS frame, it responds with a CTS frame. Like the RTS frame, the CTS frame silences stations in the immediate vicinity. Once the RTS/CTS exchange is complete, the station A 302 can transmit its frames without worry of interference from any hidden nodes. Hidden nodes beyond the range of the sending station are silenced by the CTS from the receiver. When the RTS/CTS medium reserving procedure is used, frames may be positively acknowledged.

In the example discussed with reference to FIG. 4, an issue still exists. Particularly, enabling an RTS/CTS procedure based on PER, retry rate, or packet length may not improve the throughput between the station A 302 and the station C 310 due to the full buffer data transmission from the station D 314 to the station C 310. For example, after transmitting the data frame 422, based on the PER, the station A 302 may attempt to initiate an RTS/CTS procedure. More specifically, at time t18, the station A 302 transmits an RTS frame to the station C 310. The station C 310 is receiving the data frame 422 at time t18 and, thus, may not detect the RTS frame and may treat the RTS frame as interference. Consequently, the station C 310 does not transmit a CTS frame in response back to the station A 302. The station A 302 waits a CTS frame sent from the station C 310 for a predetermined time period. If the station A 302 does not receive a CTS frame from the station C 310 in the predetermined time period, the station A 302 may send another RTS frame at time t35. At time t35, the station C 310 is receiving the data frame 414 from the station D 314 and may not respond with a CTS frame back to the station A 302. In other words, in this example, enabling a medium reserving procedure (e.g., an RTS/CTS procedure) at the station A 302 may not increase data throughput at the station A 302, because CTSs from the station C are not frequently returned to the station A 302. In addition, such issues still exist if the station D 314 transmits data packets to nodes other than the station C 310, because the station C 310 may miss an RTS from station A 302 due to interference of packets from station D 314.

Further, an issue exists in that the air time and throughput of the station A 302 may drop significantly after enabling RTS/CTS due to low CTS return rate, although PER or interference can be reduced. In other words, medium usage can be significantly reduced due to low CTS return rate. The station C 310 (e.g., the receiver) needs to check if the channel is busy at its side before responding with a CTS. The station C 310 will not respond with a CTS if an RTS is not received due to interference or due to channel being busy (e.g., a network allocation vector (NAV) is set by previous frames from other nodes).

To address these issues, as will be described infra with reference to FIG. 5, the station A 302 and the station C 310 can be configured to consider enabling the RTS/CTS procedure based on criteria other than PER, retry rate, or packet length.

B. Criteria for Enabling RTS/CTS with Respect to a STA

Figure 5:
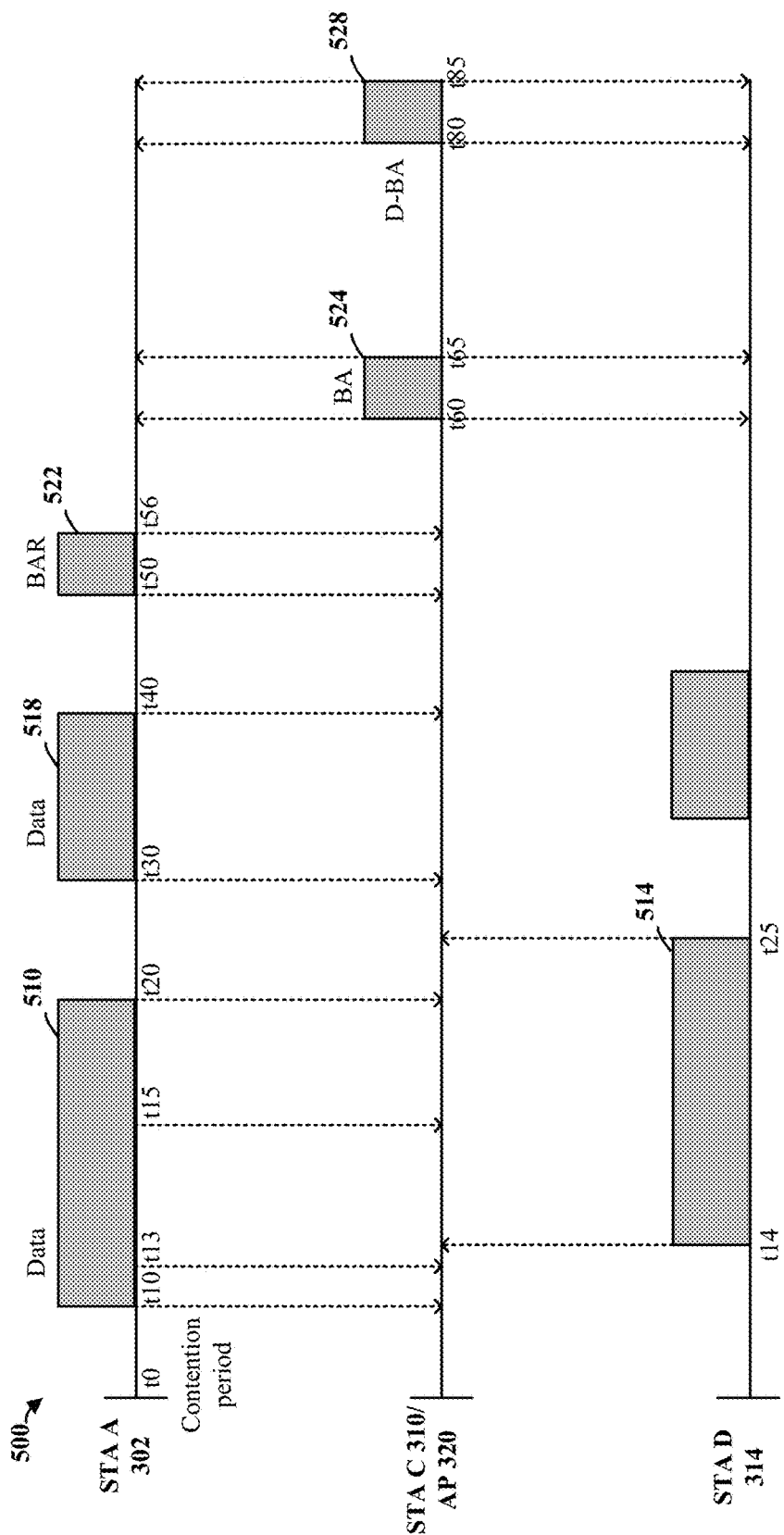
FIG. 5 is a diagram illustrating signal communication among wireless devices implementing an RTS/CTS enablement technique in a wireless network.

FIG. 5 is a diagram 500 illustrating signal communication among wireless devices having full buffer neighboring devices and implementing an RTS/CTS enablement technique in a wireless network in accordance with an aspect of the present disclosure. In this example, from time t10 to time t20, the station A 302 transmits a data frame 510 to the station C 310. As illustrated in FIG. 3, the station D 314 is not within the transmission range 304 of the station A 302. Therefore, the station D 314 does not sense the data frame 510 transmitted on the carrier. The station D 314 may consider that the station C 310 is available and may transmit a data frame 514 to the station C 310 from time t14 to t25, which is between time t10 and t20. The station C 310 at time t14 is receiving the data frame 510 from the station A 302, and may sense the data frame 514 as interference.

In one configuration, to address the issue of reduced medium usage due to low return rate of CTSs described supra, the station A 302 is configured to consider enabling an RTS/CTS procedure based on whether physical layer convergence procedure (PLCP) protocol data units (PPDUs) transmitted to the station C 310 are frequently hit by interference in the middle (e.g., after the preamble) of a transmission. Further, the station A 302 may be configured to use an evaluation procedure to determine whether enabling an RTS/CTS procedure to transmit data to the station C 310 can improve throughput of the station A 302. When the received PPDUs frequently suffer hidden node interference at the station C 310, the station A 302 may decide to enable an RTS/CTS procedure if the throughput of the station A 302 can be improved. The throughput metrics used in the evaluation procedure can include an actual throughput and an equivalent full buffer throughput. The detection of received PPDUs frequently suffering hidden node interference at the station C 310 can be based on techniques described infra.

B.1 Technique Based on Signal Metric

In one configuration, the station A 302 may be configured to implement a technique based on signal metrics at the station C 310 and/or at the station A 302. The station C 310 may be configured to measure multiple times or continuously one or more of signal metrics such as a received signal strength indication (RSSI), an estimated channel coefficient, an estimated phase/frequency offset, and a pilot error vector magnitude of the PPDUs of the data frame 510. If station C 310 determines that there is a sudden change of a measured signal metric, the station C 310 may conclude that the data transmission of the data frame 510 is interfered by another data transmission. For example, the station C 310 may measure a signal metric (e.g., RSSI) at a first location of a PPDU of the data frame 510 at time t13 and measure the signal metric at a second location of the PPDU at time t15. If the difference between the two measurements is greater than a predetermined threshold, the station A 302 may determine to enable the RTS/CTS procedure or to initiate the evaluation procedure. For example, when measuring RSSI, if the difference is greater than 10 decibels, the station A 302 may decide to initiate the RTS/CTS procedure.

The station C 310 may report back to the station A 302 the values of one or more measured signal metrics (e.g., RSSI) at two or more locations of a data packet. The station C 310 may report back to the station A 302 the difference of the values of a measured signal metric (e.g., RSSI) at two locations of a data packet. The signal metric information can be transmitted in a dedicated data frame or can be embedded in one or more existing data frames and/or management frames. The station A 302 can then determine whether to enable the RTS/CTS procedure or whether to initiate an evaluation procedure. The evaluation procedure evaluates whether enabling a medium reserving procedure can improve the data throughput at the station A 302. Alternatively, the station C 310 may report back to the station A 302 an indicator that the difference of the values of a measured signal metric (e.g., RSSI) at two locations of a data packet exceeds a threshold, which can be set by station A 302, the station C 310, or both through negotiation. The station A 302 may then decide to initiate the RTS/CTS procedure or an evaluation procedure.

B.2 Technique Based on Block Acknowledgement

In one configuration, the station A 302 may be configured to implement a technique based on information obtained from a block acknowledgement transmitted from the station A 302. For example, after transmitting the data frame 510 from time t10 to t20 at the station A 302, the station A 302 may transmit a data frame 518 from time t30 to time t40. The station A 302 may consider the data frame 410 and the data frame 418 as a data block, and may subsequently transmit a block acknowledgment request frame 522 at time t50 to the station C 310. Upon receiving the block acknowledgment request frame 522, the station C 310 may choose to send an immediate block acknowledgment frame 524 or a delayed block acknowledgment frame 528. The immediate block acknowledgment frame 524 and the delayed block acknowledgment frame 528 each may include a starting sequence number (SSN), which is the sequence number of the oldest MAC service data unit medium access control (MAC) service data unit (MSDU) in the block for which an acknowledgement is needed. On receiving the block acknowledgment request frame 522, the station C 310 may prepare the immediate block acknowledgment frame 524 or the delayed block acknowledgment frame 528, which includes a bitmap where the first bit represents the MAC protocol data unit (MPDU) with the same sequence number as the SSN from the block acknowledgment request frame 522 and subsequent bits indicate successive sequence numbers. The bitmap thus forms an array indexed by sequence number with the SSN as starting reference.

In one configuration, the station C 310 may transmit the immediate block acknowledgment frame 524 after a short amount of time (e.g., a SIFS) upon receiving the block acknowledgment request frame 522. In another configuration, the station may transmit the delayed block acknowledgment frame 528 in a subsequent, separate channel access. The immediate block acknowledgment frame 524 and the delayed block acknowledgment frame 528 each acknowledge data units correctly received at the station C 310 from the previous block. The station A 302 may re-queue data units which were not correctly received and may send them in the subsequent block.

In one configuration, the station A 302 may determine the interference at the station C 310 and accordingly determine whether to initiate the evaluation procedure based on the information of the data units that are correctly received at the station C 310 indicated in the immediate block acknowledgment frame 524 or delayed block acknowledgment frame 528. For example, the station A 302 may determine the number of the data units (e.g., MPDUs) in a data block (e.g., one or more PPDUs or data frames) that are not correctly received at the station C 310. If the number is greater than a predetermined threshold, the station A 302 may determine that interference exists and that the evaluation procedure should be initiated. In addition or alternatively, the station A 302 may determine a ratio of the data units not correctly received at the station C 310 with respect to the total units of a data block. If the determined ratio is greater than a predetermined threshold (e.g., 10%, 15%, or 20%), the station A 302 may determine that interference exists and that the RTS/CTS procedure should be enabled or the evaluation procedure should be initiated.

In addition or alternatively, the station A 302 may determine a distribution of the data units not correctly received at the station C 310 within the data block. For example, the distribution may indicate that the first half of the data units are received correctly but the second half of the data units are not. In the example with respect to FIG. 5, the station A 302 may receive an immediate block acknowledgment frame 524 or delayed block acknowledgment frame 528 indicating that the data units transmitted after time t14 are not correctly received. If the distribution matches a predetermined pattern, the station A 302 may determine that interference exists and that the RTS/CTS procedure should be enabled or the evaluation procedure should be initiated. Alternatively, the station C 310 may report back to the station A 302 an indicator that interference is detected based on distribution. The station A 302 may then decide to initiate the RTS/CTS procedure or an evaluation procedure.

B.3 Technique Based a Measured PER and an Estimated PER

In one configuration, the station A 302 may be configured to implement a technique based on a measured PER and an estimated PER. Specifically, the station A 302 can determine interference at the station C 310 based on PER. For example, while transmitting data frame 510 and data frame 518 and other data frames, the station A 302 or the station C 310 can measure the actual PER. Further, the station A 302 can obtain a signal-to-noise ratio (SNR) of signal reception at the station C 310, which excludes interference. Based on the SNR, the station A 302 can further determine an estimated PER for a given MCS. For example, the station C 310 may send an acknowledgment that includes an RSSI to the station A 302. Based on the RSSI, the station A 302 can determine the SNR at the station C 310. The station A 302 then compares the actual PER with the estimated PER. If the difference between the PER and the estimated PER is greater than a predetermined threshold, the station A 302 may determine that interference exists and that the RTS/CTS procedure should be enabled or the evaluation procedure should be initiated.

B.4 Evaluation Procedure

Once the station A 302 has determined that it should consider enabling the RTS/CTS procedure, the station A 302 can use an evaluation procedure to determine whether the RTS/CTS procedure can improve the throughput of the station A 302. During the evaluation procedure, the station A 302 can transmit data to the station C 310 using the RTS/CTS procedure in a first time period and then transmit data without using the RTS/CTS procedure in a second time period. The station A 302 can determine the values of one or more throughput metrics in both periods and then determine whether using the RTS/CTS procedure to transmit data improves the throughput of the station A 302 based on the values of the throughput metrics.

For example, the throughput metric can be an actual throughput measured at the station A 302 or the station C 310. In one technique, the actual throughput can be the data units successfully received at a receiver divided by the total time period used to transmit the data (e.g., transmission time). For example, referring to FIG. 5, the actual throughput can be the data units of the data frame 510 and the data frame 518 that are acknowledged in the immediate block acknowledgment frame 524 divided by the time period from time t0 to time t65. The time period from time t0 to time t10 is a contention period.

As another example, the throughput metric can be an equivalent full buffer throughput measured at the station A 302. In one technique, the equivalent full buffer throughput can be the data units successfully received at a receiver divided by the total time period used to transmit the data excluding the buffer idle time. For example, referring to FIG. 5, the equivalent full buffer throughput can be the data units of the data frame 510 and the data frame 518 that are acknowledged in the immediate block acknowledgment frame 524 divided by the time period from time t0 to time t20 plus the time period from time t30 to t65, in which the station A 302 has buffered data.

The station A 302 then may determine the difference between the values of throughput metric in the first time period and the second time period. If the difference is greater than a predetermined threshold (e.g., 5/10/15 Mbps or 5%/10%/15%), the station A 302 can then determine that using the RTS/CTS procedure improves the throughput of the station A 302.

C. Full Buffer Hidden Node with Respect to an AP

Figure 6:
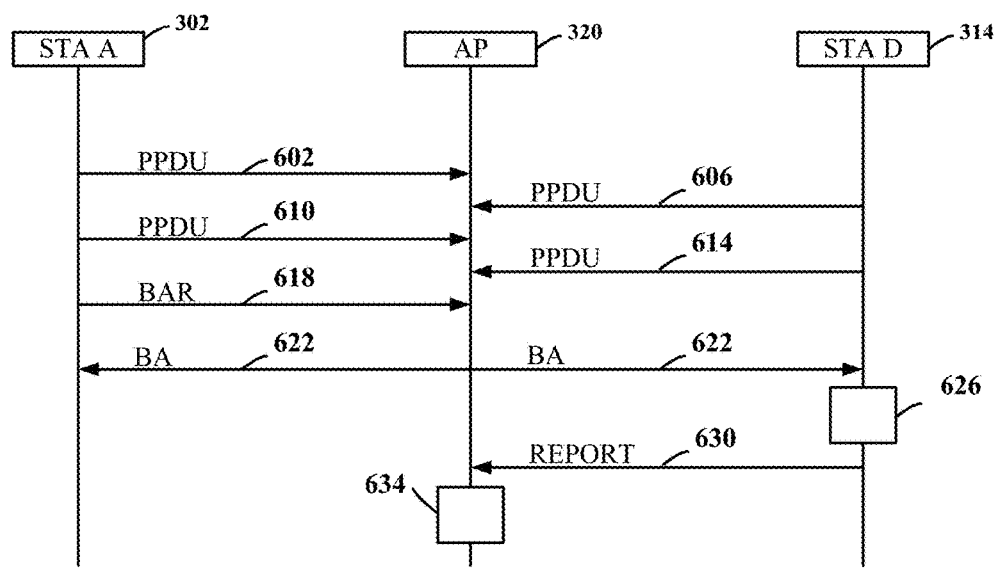
FIG. 6 is a diagram illustrating signal communication among wireless devices in a wireless network.

FIG. 6 is a diagram 600 illustrating signal communication among wireless devices in a wireless network. At operation 602, the station A 302 transmits a data packet (e.g., a PPDU) to the access point 320. At operation 606, the station D 314 transmits a data packet to the access point 320. At operation 610, the station A 302 transmits another data packet to the access point 320. Subsequently, at operation 614, the station D 314 transmits another data packet to the access point 320. As described supra was reference to FIG. 3, the station D 314 is out of the transmission range 304 of the station A 302 and may not sense the data transmission of operation 602 or of operation 610. Therefore, data transmission of operation 606 or operations 614 may start while the data transmission of operation 602 or operation 610 is still ongoing, respectively. At operation 618, the station A 302 transmits a block acknowledgment request to the access point 320. At operation 622, the access point 320 transmits a block acknowledgment. Because the station D 314 is within the range of the access point 320, the station D 314 can also receive the block acknowledgment. In some situations, the station D 314, as described supra with reference to FIG. 5, may be a full buffer hidden node. An issue exists in that the station D 310, which is a full buffer hidden node to the station A 302, may interfere with the data transmission from the station A 302 to the access point 320. Further, as described supra with reference to FIG. 3, simply enabling the RTS/CTS procedure at the station A 302 may not improve the throughput of the station A 302.

C.1 Technique for Identifying a Hidden Node Based on Signal Metrics

In one configuration, the access point 320 can use the techniques described supra with reference to FIG. 5 regarding signal metrics to identify a hidden node of the station A 302. Particularly, the access point 320 can detect that data reception for receiving data from the station A 302 is interfered. The techniques include obtaining an indication of at least one of (a) a change of a signal metric of a first data packet received from the station, (b) one or more data units in a second data packet that have not been correctly received from the station, or (c) a difference between an estimated PER and a measured PER of data packets received from the station. For example, the access point 320 can determine that the data packets received from the station A 302 are frequently hit by interference in middle, e.g., after preamble. The access point 320 can learn this by examining sudden changes of RSSI and estimated phase/frequency within each data packet. Accordingly, the access point 302 can determine that the station A 302 has a hidden node.

C.2 Techniques for Identifying a Hidden Node Based on a Block Acknowledgement

In one configuration, the access point can use the techniques described supra with reference to FIG. 5 regarding block acknowledgements to identify a hidden node of the station D 304. Particularly, in some situations, the station A may be a full buffer hidden node to the station D. Data transmission from the station D 314 to the access point 320 may also be interfered by the data transmission from the station A 302 to the access point 320. At operation 626, the station D 314 can determine that a hidden node (e.g., the station A 302) exists when the station D 314 receives the block acknowledgment transmitted in operation 622, but did not receive the data packets transmitted in operations 602 and 610 at a time point that is a predetermined time period (e.g., an inter frame spacing) prior to receiving the block acknowledgment. For example, referring to FIG. 5, in one configuration, at time t60, the station D 314 may receive the immediate block acknowledgment frame 524, but may not receive a block acknowledgment request frame 522 sent at time t50 to time t56 or may not receive the data frame 518 sent at time t30 to t40. The inter frame spacing between the data frame 518 and the block acknowledgment request frame 522 as well as the inter frame spacing between the block acknowledgment request frame 522 and the immediate block acknowledgment frame 524 can be a short inter frame space (SIFS).

In another configuration, at operation 622, the access point 320 may transmit the delayed block acknowledgment frame 528 in response to the block acknowledgment request frame 522. The spacing between the delayed block acknowledgment frame 528 and the block acknowledgment request frame 522 (e.g., from time t56 to time t80 in FIG. 5) may not be a SIFS. The access point 320 can be configured to set a data unit (such as a bit) in a block acknowledgment frame to indicate that a PPDU is received at the access point 320 from the destination of the block acknowledgment frame at or within a specified time period (such as a SIFS or 50 microseconds) prior to the transmission time of the block acknowledgment frame (e.g., at time t40 or time t56). In this example, the access point 320 sends a delayed block acknowledgment frame 528 with the data unit to the station D 314. (In another example, the access point 320 sends an immediate block acknowledgment frame 524 with the data unit to the station D 314). The station D 314, upon receiving the delayed block acknowledgment frame 528 at operation 622, can first detect whether this data unit is present in the delayed block acknowledgment frame 528. Upon determining that the data unit is present, the station D 314 can learn that a PPDU is transmitted to the access point 320 at or within the specified time period prior to the transmission time of the block acknowledgment frame. Then the station D 314 can determine whether the station D 314 has received the PPDU at or within the relevant time from the node whose MAC address is the same as the destination address of the block acknowledgment frame. If the station D 314 has not received the PPDU, the station D 314 can determine that a hidden nod exists. In one configuration, the station D 314 may only consider delayed block acknowledgment frame 528 when this data unit is set. The data unit can be one of the nine reserved bits B3-B11 in the control field of each delayed block acknowledgment frame 528.

The immediate block acknowledgment frame 524 and the delayed block acknowledgment frame 528 each contain the source and destination MAC addresses and may also contain partial association ID (PAID) of the destination device. The station D 314 can determine that the destination MAC address and the PAID are associated with a hidden note (e.g., the station A 302).

At operation 630, the station D 314 can transmit a report to the access point 320. The report can include the identification of the hidden node (e.g., the station A 302). Optionally, prior to operation 630 at operation 626, the station D 314 may decide to request the access point 320 to instruct both the station A 302 and the station D 314 to use the RTS/CTS procedure to transmit data to the access point 320. In this technique, the station D 314 can transmit the request, for example in the report of operation 630, to the access point 320.

At operation 634, in certain configurations, the access point 320 can decide to request the station A 302 and another station communicating with the access point 320 (e.g., the station D 314) to jointly use the RTS/CTS procedure to transmit data to the access point 320 based on the indications detected with respect to data reception from the station A 302 as described supra. In certain configurations, if the access point 320 has determined (e.g., using the operations described supra with respect to FIG. 5) that a ratio of stations with uplink traffic and having hidden nodes with respect to all of the stations with uplink traffic is greater than a predetermined threshold (e.g., 50%), the access point 320 can request all the stations with uplink traffic to enable the RTS/CTS procedure. In certain configurations, the access point 320 can decide to request the station D 314 and a hidden node of the station D 314 identified in the report of operation 630 (e.g., the station A 302) to jointly use the RTS/CTS procedure to transmit data to the access point 320. In certain configurations, the access point 320 can decide to request the station A 302 and the station D 314 to jointly use the RTS/CTS procedure to transmit data to the access point 320 upon receiving a request requesting the same as described supra.

C.3 Joint Enablement Information Element Format

To address the hidden node issue described supra with reference to FIG. 6, the access point 320 can be configured to, upon identifying that the station A 302 and/or the station D 314 have a hidden node, request the station A 302 and the station D 314 to jointly enable the RTS/CTS procedure.

FIG. 7 is a diagram 700 illustrating formats of information elements (IEs) used to signal joint enablement of the RTS/CTS procedure. In one configuration, a joint RTS/CTS IE 710 has an element ID field 711, a length field 712, a group indicator field 715, an RTS on start time field 716, an RTS on duration field 717, an RTS off start time field 718, and an RTS off duration field 719.

The element ID field 711 identifies the element such that a receiving station can distinguish the joint RTS/CTS IE 710 from other IEs. The group indicator field 715 indicates the stations that belong to the same group for enabling and disabling the RTS/CTS procedure. The length field 712 indicates the length of remaining fields in the joint RTS/CTS IE 710. The RTS on start time field 716 indicates a time at which the receiving station is requested to enable the RTS/CTS procedure, that is, to start using the RTS/CTS procedure to transmit data to the access point 320. The RTS on duration field 717 indicates a time duration during which the receiving station is requested to enable the RTS/CTS procedure, that is, to continuously use the RTS/CTS procedure to transmit data to the access point 320. The RTS off start time field 718 indicates a time at which the receiving station is requested to disable the RTS/CTS procedure, that is, to start transmitting data to the access point 320 without using the RTS/CTS procedure. The RTS off duration field 719 indicates a time duration during which the receiving station is requested to disable the RTS/CTS procedure, that is, to continuously transmit data to the access point 320 without using the RTS/CTS procedure.

An access point that is capable of handling joint enablement can construct a joint RTS/CTS IE 710. The access point can configure the group indicator field 715 to specify the stations that are requested to enable the RTS/CTS procedure. The group indicator field 715 can specify the MAC addresses or association IDs (AID) of the selected stations. Alternatively, the group indicator field 715 can be a sequence of bits. Each bit position equal to a distinct station AID. In one configuration, a station is included in a requested group if the bit corresponding to the AID of the station is set to 1. The access point can further configure the RTS on start time field 716 and the RTS on duration field 717 to set a time period in which the group of selected stations is requested to enable the RTS/CTS procedure. The access point can also configure the RTS off start time field 718 and the RTS off duration field 719 to set a time period in which the group of selected stations is requested to disable the RTS/CTS procedure. The access point can transmit the joint RTS/CTS IE 710 to the selected stations for example through a management frame.

In another configuration, a joint RTS/CTS IE 750 has an element ID field 751, an existence indicator field 753, a report indicator field 754, a length field 752, a group indicator field 755, an RTS on start time field 756, an RTS on duration field 757, an RTS off start time field 758, and an RTS off duration field 759. The element ID field 751, the length field 752, the group indicator field 755, the RTS on start time field 756, the RTS on duration field 757, the RTS off start time field 758, and the RTS off duration field 759 are similar to the element ID field 711, the length field 712, the group indicator field 715, the RTS on start time field 716, the RTS on duration field 717, the RTS off start time field 718, and the RTS off duration field 719 of the joint RTS/CTS IE 710. Comparing to the joint RTS/CTS IE 710, the joint RTS/CTS IE 750 has two additional optional fields, that is, the existence indicator field 753 and the report indicator field 754.

In one configuration, only the element ID field 751 and the length field 752 are required in the joint RTS/CTS IE 750 and all other fields may be optional. For example, the joint RTS/CTS IE 750 may not include the group indicator field 755. Accordingly, the stations are configured to interpret such a joint RTS/CTS IE 750 without a group indicator field 755 as an indication that all receiving stations are selected to operate as instructed by the joint RTS/CTS IE 750. The access point can use this format to instruct all receiving stations with uplink traffic to the access point to enable the RTS/CTS procedure. For example, where the access point has determined (e.g., using the operations described supra with respect to FIG. 5) that a ratio of the number of stations having hidden nodes with respect to all of the stations communicating with the access point is greater than a predetermined threshold (e.g., 50%), the access point can transmit a joint RTS/CTS IE 750 with this format to all the receiving stations to request joint enablement of the RTS/CTS procedure by all the receiving stations. Further, the joint RTS/CTS IE 750 may not include the time fields 756, 757, 758, 759. Accordingly, a station can be configured to enable the RTS/CTS procedure whenever it has received such a joint RTS/CTS IE 750.

As described supra, the report indicator field 754, the group indicator field 755, the RTS on start time field 756, the RTS on duration field 757, the RTS off start time field 758, and the RTS off duration field 759 may be optional. In one configuration, the joint RTS/CTS IE 750 can use the existence indicator field 753 to indicate whether each of the optional fields is included in the joint RTS/CTS IE 750. For example, the existence indicator field 753 may include a series of bits each of which corresponds to an optional field. If an optional field exists in the block, the corresponding bit can be set to a first value such as 1. If an optional field is does not exist in the joint RTS/CTS IE 750, the corresponding bit can be set to a second value such as 0.

The report indicator field 754 can be included in the joint RTS/CTS IE 750 to solicit report of a throughput metric. In combination with the RTS on start time field 756, the RTS on duration field 757, the RTS off start time field 758, and the RTS off duration field 759, the access point can configure the joint RTS/CTS IE 750 having a report indicator field 754 to request the selected stations to report the throughput metric in each indicated time period back to the access point. Alternatively, the access point can send a separate frame after the indicated periods to request a report from the selected stations.

In one configuration, first and second predetermined values of the element ID field 751 can be used to signal requests for enablement and disablement of the RTS/CTS procedure, respectively. A joint RTS/CTS IE 750 having an element ID field 751 configured as such, can use one set of the time fields (e.g., RTS on start time field 756 and RTS on duration field 757, or alternatively, RTS off start time field 758 and RTS off duration field 759) to signal a selected time for either enablement or disablement.

In another configuration, instead of using a dedicated IE, the joint RTS/CTS indicator can be represented by a bit at a predetermined location of any specified frame. For example, 1 and 0 may correspond to enabling and disabling RTS/CTS, respectively, for all associated stations. The bit can be in any part of any frame from the AP. For example, this bit can be in SIG field of frame preamble or in MAC header of management, control, and data frames.

C.4 Joint Enablement Procedure

Figure 8:
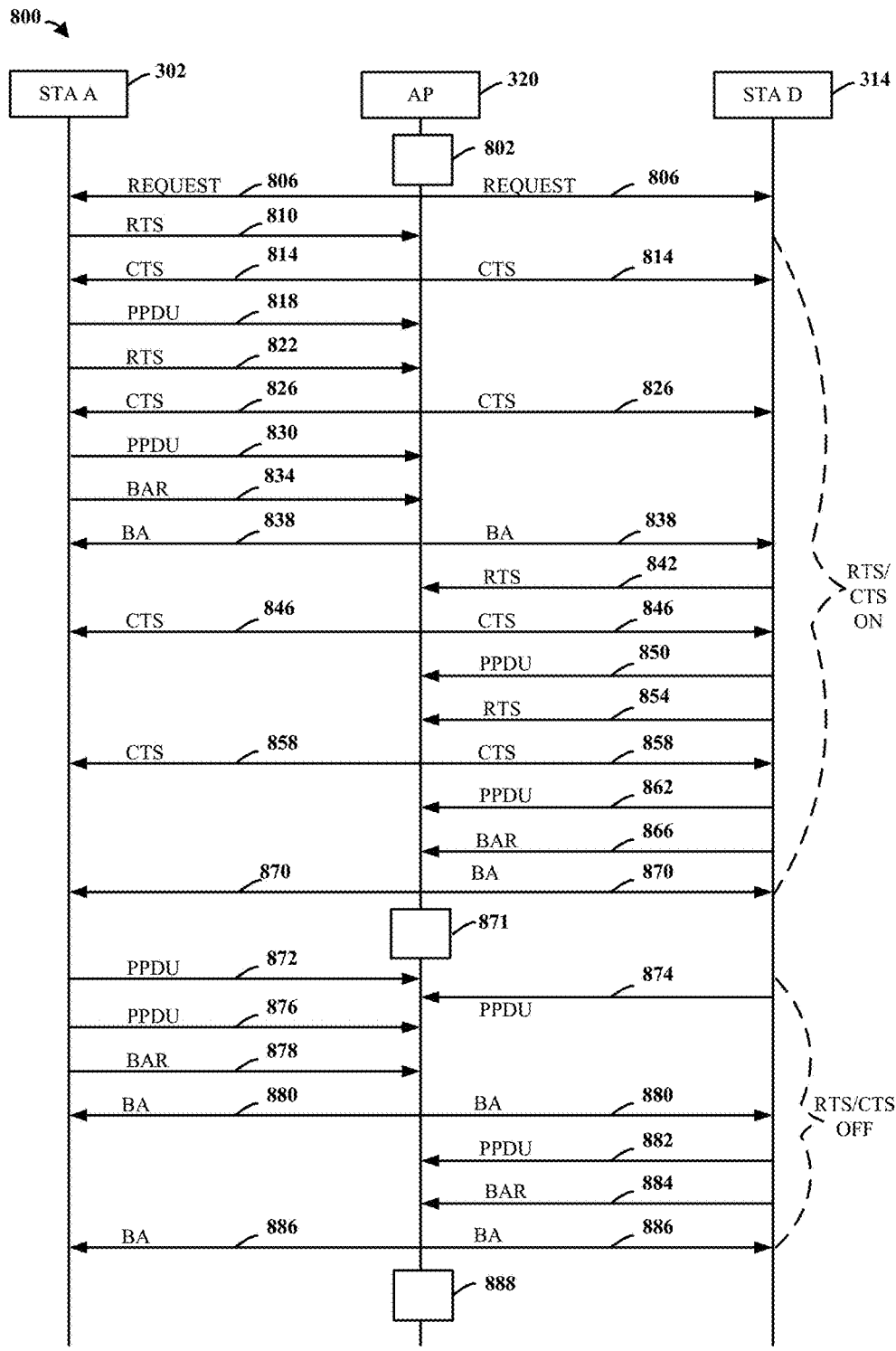
FIG. 8 is a diagram illustrating signal communication among wireless devices in a wireless network.

FIG. 8 is a diagram 800 illustrating signal communication among wireless devices in a wireless network. In one configuration, upon identifying hidden nodes, the access point 320 may initially use an evaluation procedure to determine whether enabling the RTS/CTS procedure can improve throughput at the station A 302 and the station D 314. Particularly, at operation 802, the access point 320 may decide to initiate an evaluation procedure with the station A 302 and the station D 314. The evaluation procedure can determine whether the station A 302 and the station D 314 jointly by using the RTS/CTS procedure to transmit data to the access point 320 can improve throughput of the station A 302 and the station D 314. More specifically, at operation 806, the access point 320 can transmit a joined enablement request to both the station A 302 and the station D 314. The request can be implemented using an IE as described in FIG. 7, which may be transmitted from the access point 320 to the station A 302 and the station D 314 through a management frame. The access point 320 can specify the MAC addresses of the station A 302 and the station D 314 in the group indicator field 715. The access point 320 can use the RTS on start time field 716 and RTS on duration field 717 to specify a first time period in which the station A 302 and the station D 314 are requested to enable the RTS/CTS procedure. The access point 320 can use the RTS off start time field 718 and the RTS off duration field 719 to specify a second time period in which the station A 302 and the station D 314 are requested to disable the RTS/CTS procedure.

Upon receiving the requests, the station A 302 and the station D 314 operate to enable and disable the RTS/CTS procedure as specified in the request. Within the first time period specified by the request, at operation 810, the station A 302 transmits an RTS to the access point 320. At operation 814, the access point 320 transmits a CTS to the station A 302. Because the station D 314 is within the transmission range of the access point 320, the station D 314 may also receive the CTS and accordingly withhold any data transmission during the time period indicated in the CTS. At operation 818, the station A 302 transmits one or more data packets (e.g., PPDUs) to the access point 320. At operation 822, the station A 302 transmits another RTS to the access point 320. At operation 826, the access point 320 transmits another CTS, which is received by both the station A 302 and the station D 314. At operation 830, the access point 320 transmits one or more data packets to the access point 320. At operation 834, the station A 302 transmits a block acknowledgment request to the access point 320. At operation 838, the access point 320 transmits a block acknowledgment, which may be received by both the station A 302 and the station D 314.

At operation 842, still within the first time period, the station D 314 transmits an RTS to the access point 320. At operation 846, the access point 320 transmits a CTS, which may be received by both the station A 302 and the station D 314. At operation 850, the station D 314 transmits one or more data packets to the access point 320. At operation 854, the station D 314 transmits another RTS to the access point 320. At operation 858, the access point 320 transmits another CTS, which may be received by both the station A 302 and the station D 314. At operation 862, the station D 314 transmits one or more data packets to the access point 320. At operation 866, the station D 314 transmits a block acknowledgment request to the access point 320. At operation 870, the access point 320 transmits a block acknowledgment, which may be received by both the station A 302 and the station D 314.

At operation 871, the access point 320 can determine, using the techniques described supra with reference to FIG. 3, the values of one or more throughput metrics at the station A 302 and the station D 314, respectively, in the first time period. For example, the throughput metric can be an actual throughput measured at the access point 320, the station A 302, and the station D 314. As another example, the throughput metric can be an equivalent full buffer throughput measured at the station A 302 and the station D 314. The stations may report those metrics to the AP if they are measured by stations. The AP can indicate stations to report or not in the joint RTS/CTS enablement IE described supra. In certain configurations, the access point 320 may use communication metric other than the throughput metric. The communication metric may include at least one of an actual throughput, an equivalent full buffer throughput, a retry rate, a packet error rate (PER), a modulation coding scheme (MCS), or an access delay.

Subsequently, within the second time period, at operation 872, the station A 302 transmits one or more data packets to the access point 320. At operation 874, the station D 314 transmits one or more data packets to the access point 320. At operation 876, the station A 302 transmits one or more data packets to the access point 320. At operation 878, the station A 302 transmits a block acknowledgment request to the access point 320. At operation 880, the access point 320 transmits a block acknowledgment, which may be received by both the station A 302 and the station D 314. At operation 882, the station D 314 transmits one or more data packets to the access point 320. At operation 884, the station D 314 transmits a block acknowledgment request to the access point 320. At operation 886, the access point 320 transmits a block acknowledgment, which may be received by both the station A 302 and the station D 314.

At operation 888, the access point 320 can determine again, using the techniques described supra with reference to FIG. 5, the values of the one of more throughput metrics at the station A 302 and the station D 314, respectively, in the second time period. Subsequently, the access point 320 can use the techniques described supra with reference to FIG. 5 to determine whether the station A 302 and the station D 314 jointly using the RTS/CTS procedure to transmit data to the access point 320 can improve throughput of the station A 302 and the station D 314. Subsequently, the access point 320 can transmit another request for enabling the RTS/CTS procedure to the station A 302 and the station D 314, in response to a determination that joint enablement of the RTS/CTS procedure by the station A 302 and the station D 314 can improve the throughput of the station A 302 and/or the station D 314. The request instructs the station A 302 and the station D 314 to enable the RTS/CTS procedure. The request can further specify a time period of the requested joint enablement.

D. Enhancement Procedure

D.1 Busy Neighbor Receiving Data from a Hidden Node

Figure 9:
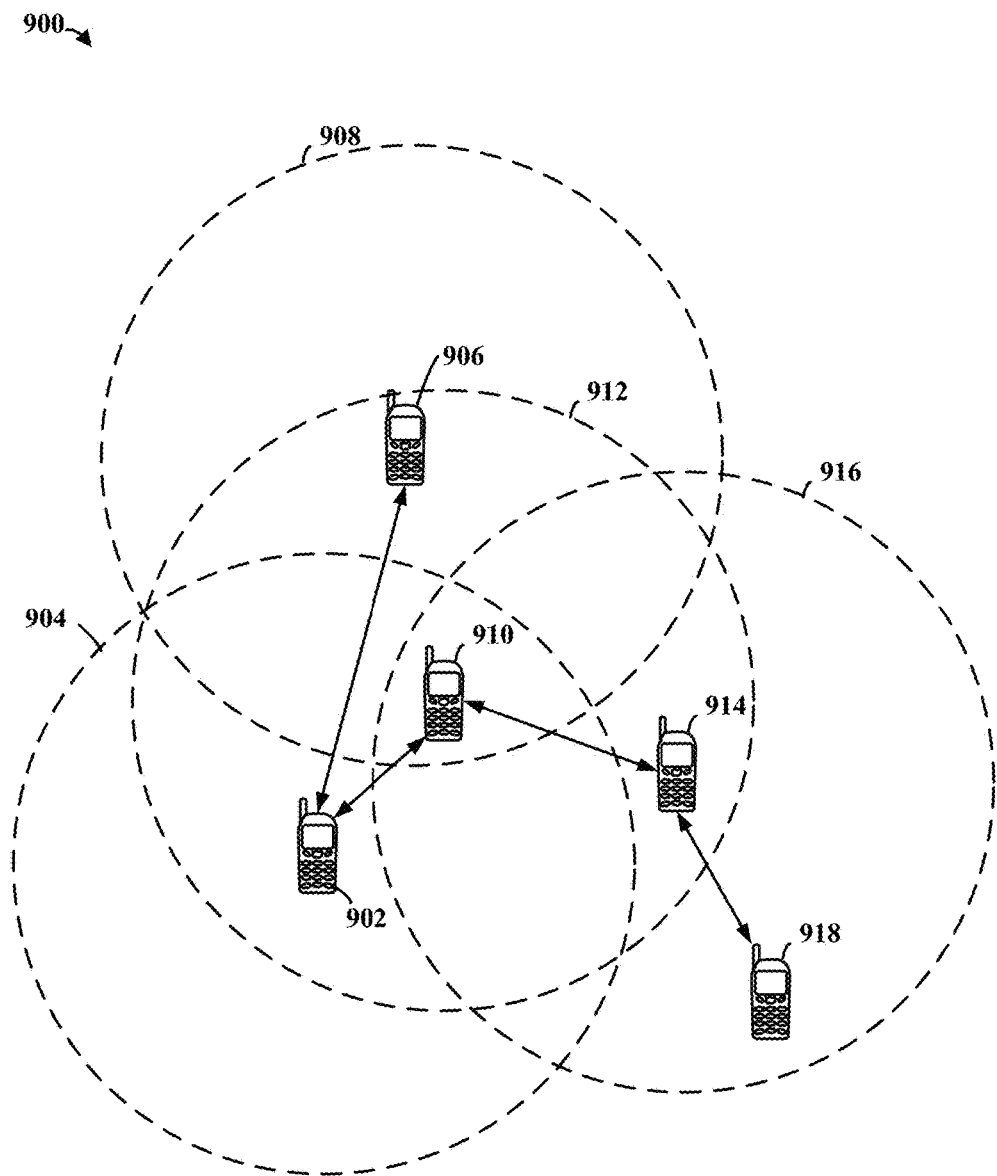
FIG. 9 is a diagram illustrating wireless devices in a wireless network.

FIG. 9 is a diagram 900 illustrating wireless devices in a wireless network. A station 914 is transmitting data to a station 910. A station 902 and a station 906 are out of the transmission range 916 of the station 914. Thus, the station 902 and the station 906 do not sense the data transmission from the station 914 to the station 910. While the station 914 is transmitting to the station 910, the station 902 may transmit an RTS to the station 906. Still during the transmission, the station 906 may transmit a CTS to the station 902. Because the station 910 is busy receiving data from the station 914, the station 910 does not detect the RTS or the CTS. After successfully communicating the RTS and the CTS, the station 902 and the station 906 determines that the medium is clear and starts transmitting data. While the data transmission between the station 902 and the station 906 is ongoing, the station 910, which did not detect the RTS or the CTS, may determine that the medium is clear and start transmitting data to the station 914. Because the station 902 and the station 906 are within the transmission range 912 of the station 910, the data transmission from the station 910 can also reach the station 902 and the station 906 and become interference to the station 902 and the station 906.

D.1.a Technique to Request Neighbor to Reduce Over the Air Medium Occupancy

In one configuration, the station 902 and/or the station 906 can use an enhancement procedure to reduce the interference from the data transmission between the station 910 and the station 914. For example, the station 902 or the station 906 can transmit a request requesting the neighbors of the station 902 and the station 906 to reduce an over the air (OTA) medium occupancy. For example, the station 902 or the station 906 can request the station 910 to use less aggressive enhanced distributed channel access (EDCA) parameters for communication (e.g., communication with the station 914). As another example, the station 902 or the station 906 can request the station 910 to maintain one or more dedicated silence periods. Further, the dedicated silence periods can be periodic. Thus, the station 910 may have more idle time to capture the RTS/CTS transmitted between the station 902 and that the station 906.

D.2 Available Neighbor Interfered by a Full Buffer Hidden Node

Further, in some situations, the station 914 may continuously transmit data to the station 918. Because the station 910 is in the transmission range 916 of the station 914, the station 910 also receives the data transmission as interference. The interference strength at the station 910 of the data transmission from the station 914 may be much stronger than the signal strength at the station 910 of the RTS transmissions from the station 902. An issue exists in that the station 910, although available (idle), may not detect the RTS or CTS transmitted from the station 902 or the station 906 while the station 910 is receiving the interference from the station 914 to the station 918.

D.2.a Technique to Transmit RTS/CTS in a Repeating Pattern

Figure 10:
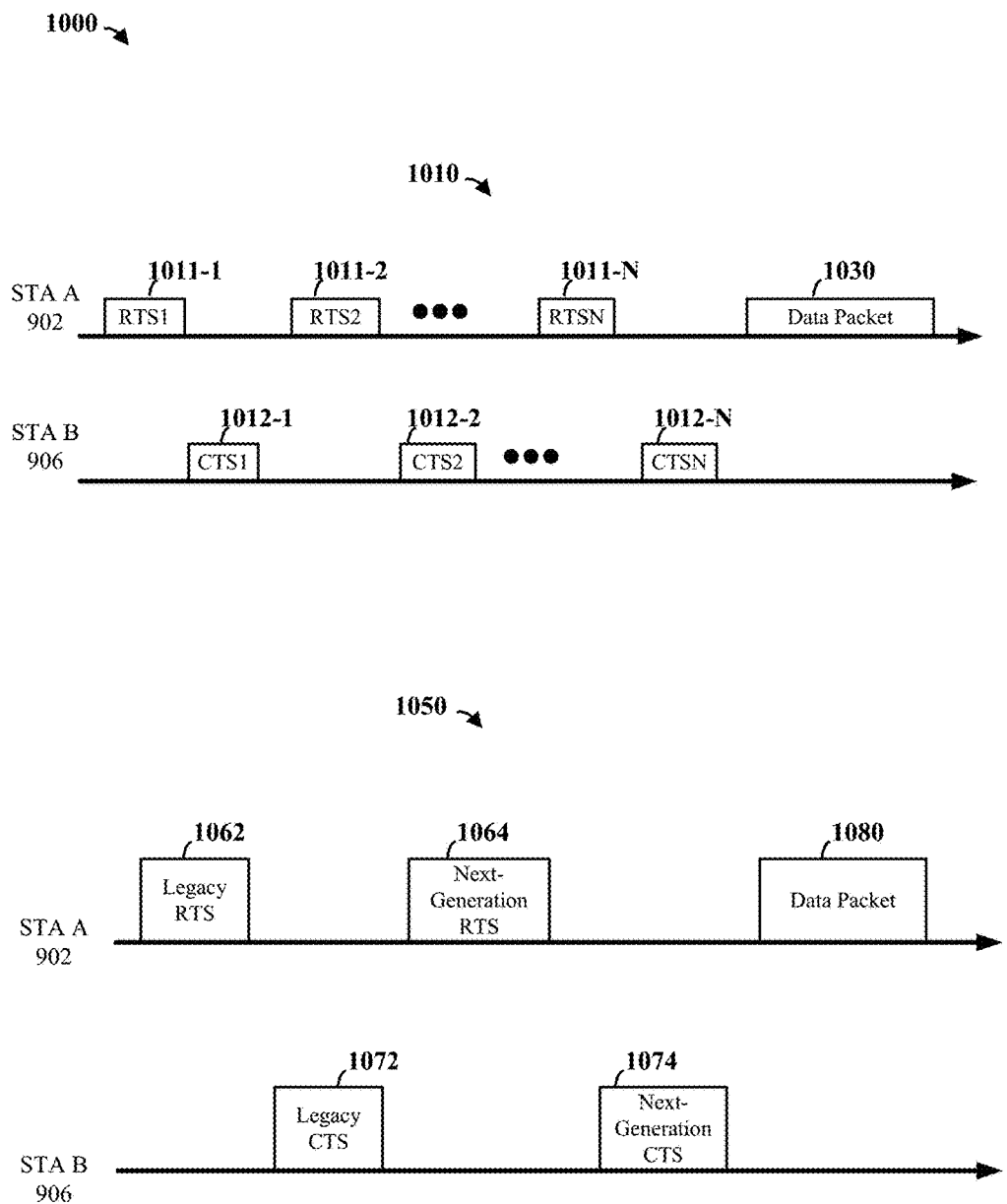
FIG. 10 is a diagram illustrating signal communication among wireless devices in a wireless network.

To address the above interference issue, in one configuration, the station 902 can transmit RTSs to the station 906 or the station 910 in a repeating pattern. FIG. 10 is a diagram 1000 illustrating signal communication among wireless devices in a wireless network. In configuration 1010, the station 902 can transmit first RTS 1011-1, second RTS 1011-2, . . . , and N$^{th}$ RTS 1011-N to the station 906, N being a predetermined positive integer. In response, the station 906 transmits first CTS 1012-1, second CTS 1012-2, . . . , and N$^{th}$ CTS 1012-N to the station 902. In this particular pattern, each RTS is followed by a CTS. The inter frame spacing between two RTSs, between two CTSs, as well as between one RTS and one CTS can be any suitable respective pre-specified time periods. In this example, the inter frame spacing between two consecutive RTS and CTS can be the same time period such as a SIFS. Subsequent to receiving the N$^{th}$ CTS, the station 902 transmits one or more data packets 1030 to the station 906.

Alternatively, the station 902 can transmit a single first RTS 1011-1 to the station 906. The station 906, in response, transmits N CTSs (e.g., first CTS 1012-1, second CTS 1012-2, . . . , N$^{th}$ CTS 1012-N) in a repeating pattern. The inter frame spacing between the RTS and the subsequent CTS as well as between two consecutive CTSs can be any suitable respective pre-specified time periods. In this example, the pre-specified time periods can be the same time period such as a SIFS.

When the station 902 and the station 906 exchange RTSs/CTSs in a repeating pattern, it reduces the probability for stations to miss all the RTSs/CTSs of the station 910 (as well as the station 906). Further, the repeated RTSs/CTSs may be combined for joint detection and decoding.

The number of repeats (e.g., the value of N) can be increased if data packets 1030 still frequently suffer hidden node interference. The interference can be determined using the techniques described supra with reference to FIG. 5 such as determining whether the data packets 1030 are frequently hit by interference in the middle (e.g., after preamble) or determining whether the actual PER is much higher than estimated interference-free PER.

D.2.b Technique to Adaptively Boost RTS/CTS Transmission Power

To address the above interference issue, in one configuration, the station 902 and the station 906 can adaptively boost the RTS/CTS transmission power. For example, initially the station 902 and the station 906 exchange RTSs/CTSs. As described supra, data reception at the station 910 is interfered by the data transmission from the station 914 to the station 918. Thus, the station 910 may not detect the RTS transmitted from the station 902. If the station 902 and the station 906 detect that data packets still frequently suffer hidden node interference, the station 902 and station 906 can increase the transmission power for RTSs/CTSs to improve detection at low signal-to-interference-plus-noise ratio (SINR) (e.g., at the station 910). For example, the station 902 can indicate, in an RTS or in a beacon frame, a transmission power to be used by the station 906 for transmitting a CTS. The station 906 can indicate, in a CTS or an acknowledgment frame, a transmission power to be used by the station 902 to transmit the next RTS. In one configuration, this power adaptation technique can be used in combination with the technique regarding transmitting RTSs/CTSs in a repeating pattern described supra. For example, each time an RTS/CTS is repeated, the transmission power of that RTS/CTS is also increased.

D.2.c Technique to Transmit RTS/CTS at a Different Rate

To address the above interference issue, in one configuration, the station 902 and the station 906 can transmit RTS/CTS at a different rate. For example, if the station 902 and the station 906 detect that data packets still frequently suffer hidden node interference after enabling the RTS/CTS procedure, the station 902 and station 906 can send RTSs/CTSs at a lower data rate than the previous data rate used in the RTS/CTS procedure. The lower data rate RTSs/CTSs can be decoded at a low SINR at the station 910, which is capable of detecting the RTSs/CTSs transmitted at the lower rate. The station 906, however, may not be capable of detecting the RTSs/CTSs at the lower rate. The station 902 can be configured to transmit RTS/CTS at the previous, higher rate prior to or subsequent to the transmission of the RTSs/CTSs at the lower rate. Subsequent to the RTS/CTS transmission, the station 902 transmits data packets to the station 906. The transmissions of the RTSs/CTSs as well as the data packets may be within the same transmit opportunity.

In a configuration 1050 shown in FIG. 10, the station 902 initially transmits a legacy RTS 1062 to the station 906, which, in response, transmits a legacy CTS 1072 to the station 902. Subsequently, the station 902 transmits a next-generation RTS 1064 to the station 906, which, in response, transmits a next-generation CTS 1074 to the station 902. Subsequently, the station 902 transmits data packets 1080 to the station 906. The inter frame spacing between any two frames can be any suitable, specified time period. The inter frame spacing can be the same time period such as a SIFS. The legacy RTS 1062, the legacy CTS 1072, the next-generation RTS 1064, the next-generation CTS 1074, and the data packets 1080 may be within the same transmit opportunity. The legacy RTS/CTS are sent at legacy rate, e.g. 1 or 6 Mbps, while the next-generation RTS/CTS can be sent at a higher rate.

The next-generation RTS/CTS may not be recognized by legacy devices. To maintain protection from legacy devices, as discussed, the next-generation RTS/CTS can be used together with a legacy RTS/CTS. In the configuration 1050, a legacy RTS/CTS is followed by a next-generation RTS/CTS. The next-generation RTS/CTS can be decoded by compatible devices at low SINR. The legacy RTS/CTS can be decoded by legacy devices at normal SINR.

D.3 Busy Receiver with Low Response Rate

Further, referring back to FIG. 9, while the station 914 is transmitting data to the station 910, the station 910 may not frequently respond to RTSs transmitted by the station 902, because the channel is busy most of time at the station 910. One major impact of a low CTS response rate is that the station 902 drops data packets after the number of RTS retries exceeds a max limit. Dropped data packets may create holes in the received data packet sequence at the station 910 and may delay date packet delivery to upper layers. Unsuccessful RTS may also waste medium and increase interference.

In other words, the station 910 may receive continuous data transmission from the station 914. Thus, the station 910 frequently may not detect the RTSs transmitted from the station 902. An issue exists in that a low RTS response rate from the station 910 causes that the station 902 has fewer opportunities to transmit data to the station 910.

D.3.1 Technique to Determine Whether to Initiate a Switching Procedure Based on a Response Rate In one configuration, the station 902 is configured to determine a response rate of the station 910. For example, the station 902 may keep a record of the number (e.g., M) of RTSs transmitted to the station 910 and the number (e.g., N) of CTSs received from the station 910 in response to the RTSs. The station 902 may determine a response rate. For example, the response rate may be the ratio of the number of RTSs and the number of CTSs (e.g., N/M). If the response rate is less than a predetermined threshold (e.g., 50%), the station 902 may determine that the response rate from the station 910 is low.

Upon detecting a low RTS response rate, the station 902 can send to the station 910 one or more switching requests with an observed channel load at the station 902. The switching request requests the station 910 to confirm switching to using a polling procedure to transmit data between the station 902 and the station 910. The switching request can be embedded in an IE in a management frame or a data frame.

Upon receiving a switching request, the station 910 may compare the channel load at the station 902 and the channel load at the station 910. If the channel load at the station 910 is greater than the channel load at the station 902, the station 910 may decide to switch to using the polling procedure for data communication with the station 902. Accordingly, the station 910 transmits a switching confirmation to the station 902. Alternatively, the station 910 may send the confirmation without comparing the channel loads. The switching confirmation can be embedded in an IE in a management frame or a data frame.

Upon receiving the switching confirmation from the station 910, the station 902 stop transmitting RTSs to the station 910 and waits to receive from the station 910 a polling request that announces availability of the station 910.

If the station 910 determines that the channel load at the station 910 is not greater than the channel load at the station 902, the station 910 may not transmit a switching confirmation to the station 902. Without receiving the switching confirmation, the station 902 continues transmitting RTSs to the station 910.

In addition or alternatively, the station 910 may keep a record of the RTSs received from the station 902 and the CTSs sent to the station 902 in response. The station 910 may not respond a CTS if NAV is set or other packets with high energy are detected. Thus, the station 910 may similarly determine a response rate. Accordingly, when the response rate is lower than a threshold, the station 910 may send a switching request to the station 902 that requests the station 902 to confirm that the station 910 may use the polling procedure for communicating with the station 902. The switching request may include the channel load at the station 910. The station 902 may similarly compare the channel load at the station 902 with the channel load at the station 910 to determine whether to confirm or deny the switching request. Upon receiving the switching confirmation from the station 902, the station 910 may send to the station 902 a polling request that announces availability of the station 910.

Once the station 910 has determined to use a polling procedure for data transmission between the station 902 and the station 910, at a time point when the station 914 is not transmitting data to the station 910 and the station 910 sense that the medium is available, the station 910 can send a polling request to the station 902 to announce the availability of the station 910. If the station 902 is also available, upon receiving the polling request from the station 910, the station 902 can start transmitting data to the station 910. If the station 902 is not available, the station 910 does not receive data from the station 902 within a predetermined time period (e.g., a SIFS). Subsequently, if the station 910 is still available, the station 910 can transmit another polling request to the station 902.

Further, the station 906 may move out of the transmission range 912 of the station 910 and continuously transmits data to the station 902. The station 906 does not sense signals transmitted from the station 910. While the station 906 is transmitting data to the station 902, the station 902 may not frequently respond to polling requests transmitted by the station 910, because the channel is busy most of time at the station 902.

In other words, the station 902 may receive continuous data transmission from the station 906. Thus, the station 910 frequently may not detect the polling requests transmitted from the station 910. A low response rate from the station 902 causes that the station 902 has fewer opportunities to transmit data to the station 910.

In one configuration, the station 910 is configured to determine a response rate of the station 902. For example, the station 910 may keep a record of the number (e.g., M) of polling requests transmitted to the station 902 and the number (e.g., N) of responses (e.g., data) received from the station 902 in response to the polling requests. If the ratio of the number of podium requests and the number of responses (e.g., N/M) is less than a predetermined ratio (e.g., 50%), the station 910 can determine that the response rate from the station 902 is low.

Upon detecting a low polling response rate, the station 910 can send to the station 902 one or more switching requests with an observed channel load at the station 910. The switching request requests the station 902 to confirm switching to using an RTS/CTS procedure to transmit data between the station 902 and the station 910. The switching request can be embedded in an IE in a management frame or a data frame.

Upon receiving a switching request, the station 902 may compare the channel load at the station 902 and the channel load at the station 910. If the channel load at the station 902 is greater than the channel load at the station 910, the station 902 can decide to switch to using the RTS procedure for data communication with the station 910. Accordingly, the station 902 transmits a switching confirmation to the station 910. The switching confirmation can be embedded in an IE in a management frame or a data frame. Alternatively, the station 910 may send the confirmation without comparing the channel load. Upon receiving the switching confirmation from the station 902, the station 910 stop transmitting polling requests to the station 902 and waits to receive from the station 902 an RTS.

If the station 902 determines that the channel load at the station 902 is not greater than the channel load at the station 910, the station 902 may not transmit a switching confirmation to the station 910. Without receiving the switching confirmation, the station 910 continues transmitting polling requests to the station 902.

In addition or alternatively, the station 902 may keep a record of the polling requests received from the station 910 and the data sent to the station 910 in response. The station 902 may not respond to a polling request with data if NAV is set or other packets with high energy are detected. Thus, the station 902 may similarly determine a response rate. Accordingly, when the response rate is lower than a threshold, the station 902 may send a switching request to the station 910 that requests the station 910 to confirm that the station 902 may use the RTS/CTS procedure for communicating with the station 910. The switching request may include the channel load at the station 902. The station 910 may similarly compare the channel load at the station 910 with the channel load at the station 902 to determine whether to confirm or deny the switching request. Upon receiving the switching confirmation from the station 910, the station 902 may send to the station 910 an RTS.

Once the station 902 has determined to use the RTS/CTS procedure for data transmission between the station 902 and the station 910, at a time point when the station 906 is not transmitting data to the station 902 and the station 902 sense that the medium is available, the station 902 can send an RTS request to the station 910. If the station 910 is also available, upon receiving the RTS from the station 910, the station 910 can transmit a CTS to the station 902. If the station 910 is not available, the station 902 does not receive a CTS from the station 910 within a predetermined time period (e.g., a SIFS). Subsequently, if the station 902 is still available, the station 902 can transmit another RTS to the station 910.

Figure 11:
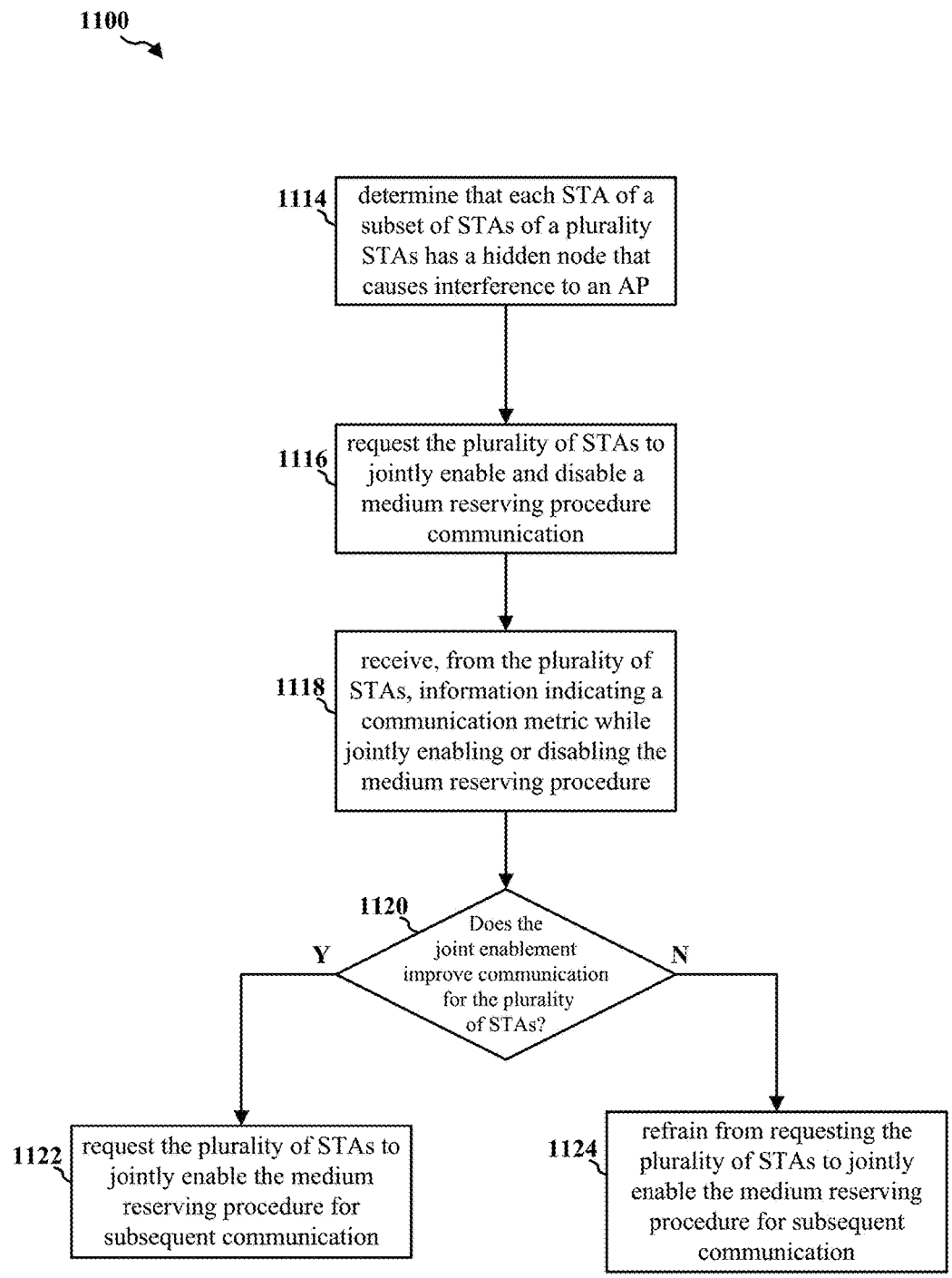
FIG. 11 is a flow chart of an exemplary method of joint enablement of a medium reserving procedure.

FIG. 11 is a flow chart of an exemplary method 1100 of joint enablement of a medium reserving procedure. The method may be performed by an AP (e.g., the access point 104, the access point 320, the apparatus 2902/202). In certain configurations, at operation 1114, the AP determines that each STA of a subset of STAs of a plurality of STAs has a hidden node that causes interference to the AP. The hidden node transmits data to the AP and disrupts a communication between the AP and the each STA. Further, each STA of the plurality of STAs has uplink traffic with the AP. The subset of STAs may include all of the plurality of STAs. For example, referring to FIG. 8, the access point 320 receives uplink traffic from the station A 302 and the station D 314. Referring to FIG. 5, the access point 320 determines that the station D 314 has a hidden node At operation 1116, the AP requests the plurality of STAs to jointly enable and disable a medium reserving procedure for communication based on at least one of that each STA of the plurality of STAs has uplink traffic with the AP or that each STA of the subset of STAs has a hidden node. The plurality of STAs may be requested to jointly enable and disable the medium reserving procedure based on that the plurality of STAs each have uplink traffic and that a ratio of the subset of STAs with respect to the plurality of STAs meets a threshold. For example, referring to FIG. 8, the access point 320 requests the station A 302 and the station D 314 to jointly enable and disable the RTS/CTS procedure.

At operation 1118, the AP receives, from the plurality of STAs, information indicating a communication metric while jointly enabling or disabling the medium reserving procedure for communication. For example, referring to FIG. 8, the access point 320 determines one or more throughput metrics at the station A 302 and the station D 314.

At operation 1120, the AP determines, based on the received information indicating the communication metric, whether the joint enablement of the medium reserving procedure improves communication for the plurality of STAs. When the joint enablement of the medium reserving procedure improves communication for the plurality of STAs, the AP, at operation 1122, requests the plurality of STAs to jointly enable the medium reserving procedure for subsequent communication. When the joint enablement of the medium reserving procedure does not improve communication for the plurality of STAs, the AP, at operation 1124, refrains from requesting the plurality of STAs to jointly enable the medium reserving procedure for subsequent communication.

In certain configurations, the medium reserving procedure employs an RTS/CTS procedure. In certain configurations, the communication metric includes at least one of an actual throughput, an equivalent full buffer throughput, a retry rate, a PER, a MCS, or an access delay.

Figure 12:
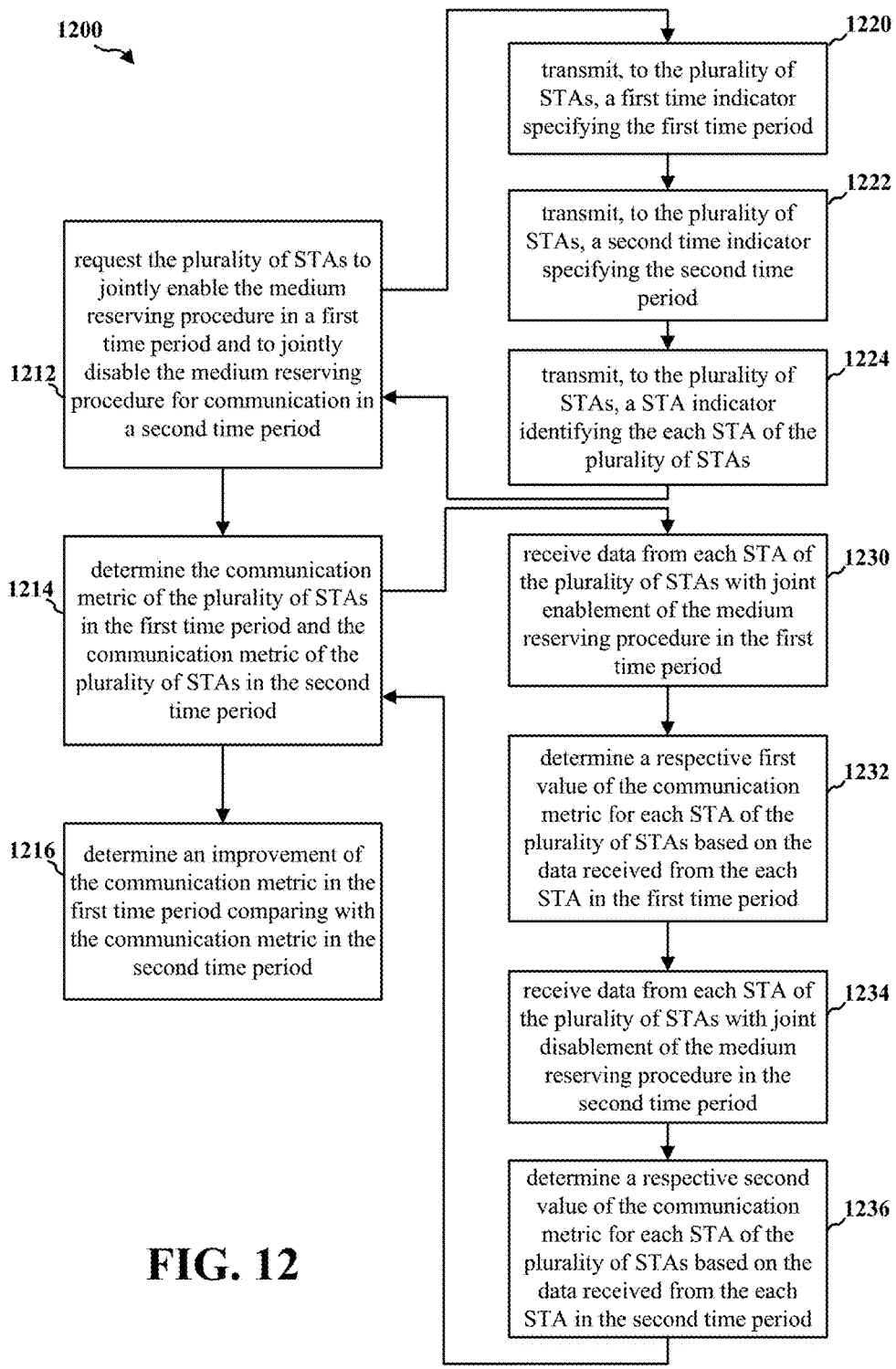
FIG. 12 is a flow chart of an exemplary method for determining an improvement of a communication metric.

FIG. 12 is a flow chart of an exemplary method 1200 for determining an improvement of the communication metric within operation 1120 illustrated in FIG. 11. The method may be performed by an AP (e.g., the access point 104, the access point 320, the apparatus 2902/202). At operation 1212, the AP requests the plurality of STAs to jointly enable the medium reserving procedure for communication in a first time period and to jointly disable the medium reserving procedure for communication in a second time period. In certain configurations, within operation 1212, the AP, at operation 1220, transmits, to the plurality of STAs, a first time indicator indicating the first time period. At operation 1222, the AP transmits, to the plurality of STAs, a second time indicator indicating the second time period. At operation 1224, the AP transmits, to the plurality of STAs, a STA indicator identifying the each STA of the plurality of STAs. In certain configurations, each of the first time indicator, the second time indicator, and the STA indicator may be included in an IE of a frame or may be one or more information bits in a frame.

For example, referring to FIG. 8, at operation 806, the access point 320 can transmit a joined enablement request to both the station A 302 and the station D 314. The request can be implemented using an IE as described in FIG. 7, which may be transmitted from the access point 320 to the station A 302 and the station D 314 through a management frame. The access point 320 can specify the MAC addresses of the station A 302 and the station D 314 in the group indicator field 715. The access point 320 can use the RTS on start time field 716 and RTS on duration field 717 to specify a first time period in which the station A 302 and the station D 314 are requested to enable the RTS/CTS procedure. The access point 320 can use the RTS off start time field 718 and the RTS off duration field 719 to specify a second time period in which the station A 302 and the station D 314 are requested to disable the RTS/CTS procedure.

At operation 1214, the AP determines the communication metric of the plurality of STAs in the first time period and the communication metric of the plurality of STAs in the second time period. In certain configurations, within operation 1214, the AP, at operation 1230, receives data from each STA of the plurality of STAs with joint enablement of the medium reserving procedure in the first time period. At operation 1232, the AP determines a respective first value of the communication metric for each STA of the plurality of STAs based on the data received from the each STA in the first time period. At operation 1234, the AP receives data from each STA of the plurality of STAs with joint disablement of the medium reserving procedure in the second time period. At operation 1236, the AP determines a respective second value of the communication metric for each STA of the plurality of STAs based on the data received from the each STA in the second time period. The improvement of the communication metric is determined based on the first values and the second values. For example, referring to FIG. 8, at operation 871, the access point 320 can determine, using the techniques described supra with reference to FIG. 3, the values of one or more throughput metrics at the station A 302 and the station D 314, respectively, in the first time period.

At operation 1216, the AP determines an improvement of the communication metric in the first time period comparing with the communication metric in the second time period. The communication for the plurality of STAs is determined to be improved when the improvement of the communication metric meets a first threshold.

Figure 13:
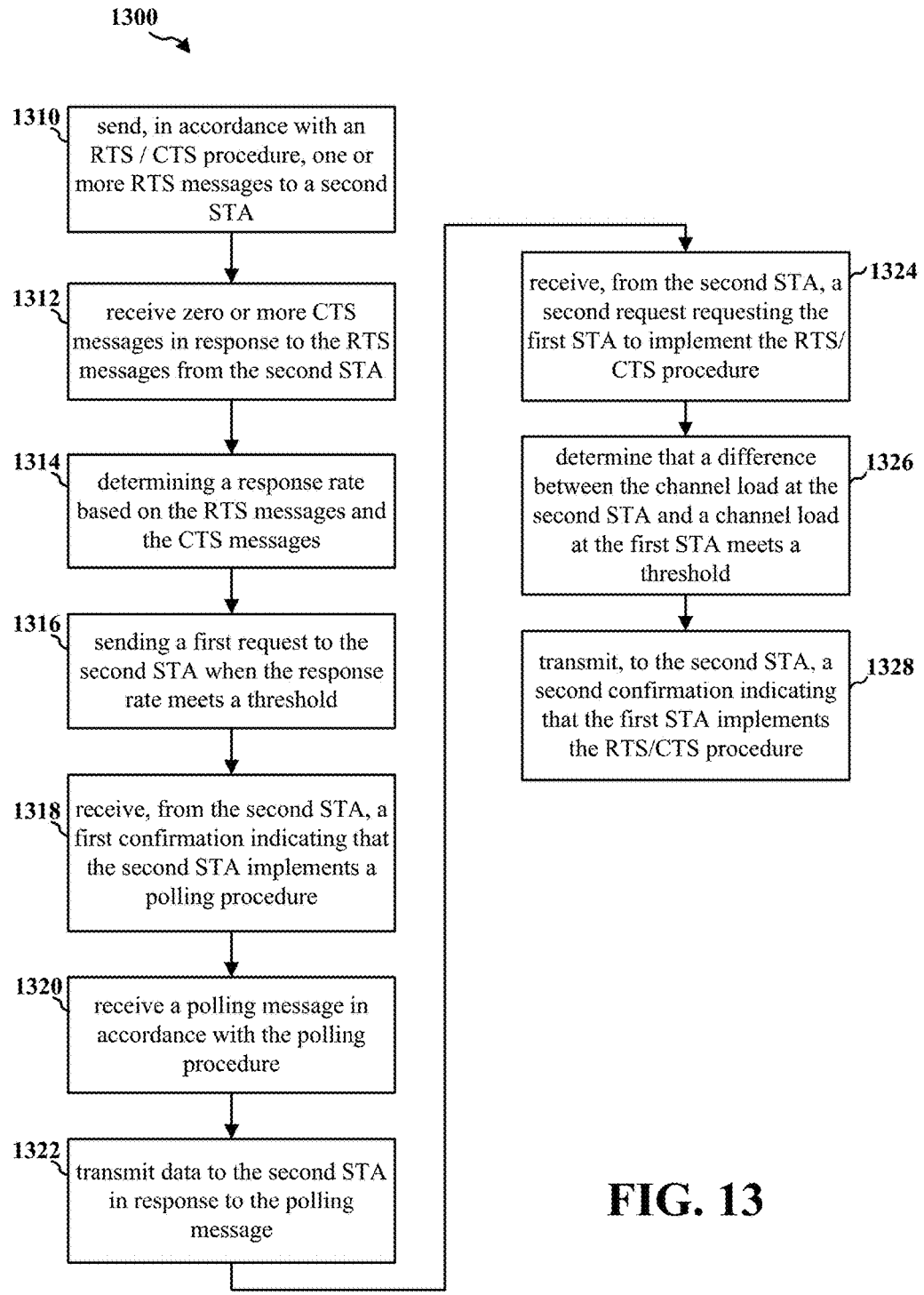
FIG. 13 is a flow chart of an exemplary method for switching from an RTS/CTS procedure to a polling procedure.

FIG. 13 is a flow chart of an exemplary method 1300 for switching from an RTS/CTS procedure to a polling procedure. The method may be performed by a first STA (e.g., the station 114, the station 902, the apparatus 3002/202). At operation 1310, the first STA sends, in accordance with an RTS/CTS procedure, one or more RTS messages to a second STA. At operation 1312, the first STA receives zero or more CTS messages in response to the RTS messages from the second STA. At operation 1314, the first STA determines a response rate based on the RTS messages and the CTS messages. In certain configurations, the one or more RTS messages include a first number of RTS messages. The zero or more CTS messages include a second number of CTS messages. The response rate is determined based on the first number and the second number.

For example, referring to FIG. 9, in one configuration, the station 902 is configured to determine a response rate of the station 910. For example, the station 902 may keep a record of the number (e.g., M) of RTSs transmitted to the station 910 and the number (e.g., N) of CTSs received from the station 910 in response to the RTSs. If the ratio of the number of RTSs and the number of CTSs (e.g., N/M) is less than a predetermined ratio (e.g., 50

At operation 1316, the first STA sends a first switching request to the second STA when the response rate meets a threshold. The first switching request requests the second STA to implement a polling procedure. The polling procedure announces receiver availability for receiving data transmission. In certain configurations, the first switching request includes a channel load at the first STA. For example, referring to FIG. 9, the station 902 can send to the station 910 one or more switching requests with an observed channel load at the station 902.

At operation 1318, the first STA receives, from the second STA, a first switching confirmation indicating that the second STA implements the polling procedure. For example, referring to FIG. 9, if the channel load at the station 910 is greater than the channel load at the station 902, the station 910 may decide to switch to using the polling procedure for data communication with the station 902. Accordingly, the station 910 transmits a switching confirmation to the station 902.

At operation 1320, the first STA receives a polling message in accordance with the polling procedure. The polling message indicates that the second STA is available for data transmission. At operation 1322, the first STA transmits data to the second STA in response to the polling message. For example, referring to FIG. 9, once the station 910 has determined to use a polling procedure for data transmission between the station 902 and the station 910, at a time point when the station 914 is not transmitting data to the station 910 and the station 910 sense that the medium is available, the station 910 can send a polling request to the station 902 to announce the availability of the station 910. If the station 902 is also available, upon receiving the polling request from the station 910, the station 902 can start transmitting data to the station 910.

At operation 1324, the first STA receives, from the second STA, a second switching request requesting the first STA to implement the RTS/CTS procedure. The second switching request includes a channel load at the second STA. At operation 1326, the first STA determines that a difference between the channel load at the second STA and a channel load at the first STA meets a threshold. At operation 1328, the first STA transmits, to the second STA, a second switching confirmation indicating that the first STA implements the RTS/CTS procedure. For example, referring to FIG. 9, upon detecting a low polling response rate, the station 910 can send to the station 902 one or more switching requests with an observed channel load at the station 910. The switching request requests the station 902 to confirm switching to using an RTS/CTS procedure to transmit data between the station 902 and the station 910. Upon receiving a switching request, the station 902 may compare the channel load at the station 902 and the channel load at the station 910. If the channel load at the station 902 is greater than the channel load at the station 910, the station 902 can decide to switch to using the RTS procedure for data communication with the station 910. Accordingly, the station 902 transmits a switching confirmation to the station 910. The switching confirmation can be embedded in an IE in a management frame or a data frame.

Figure 14:
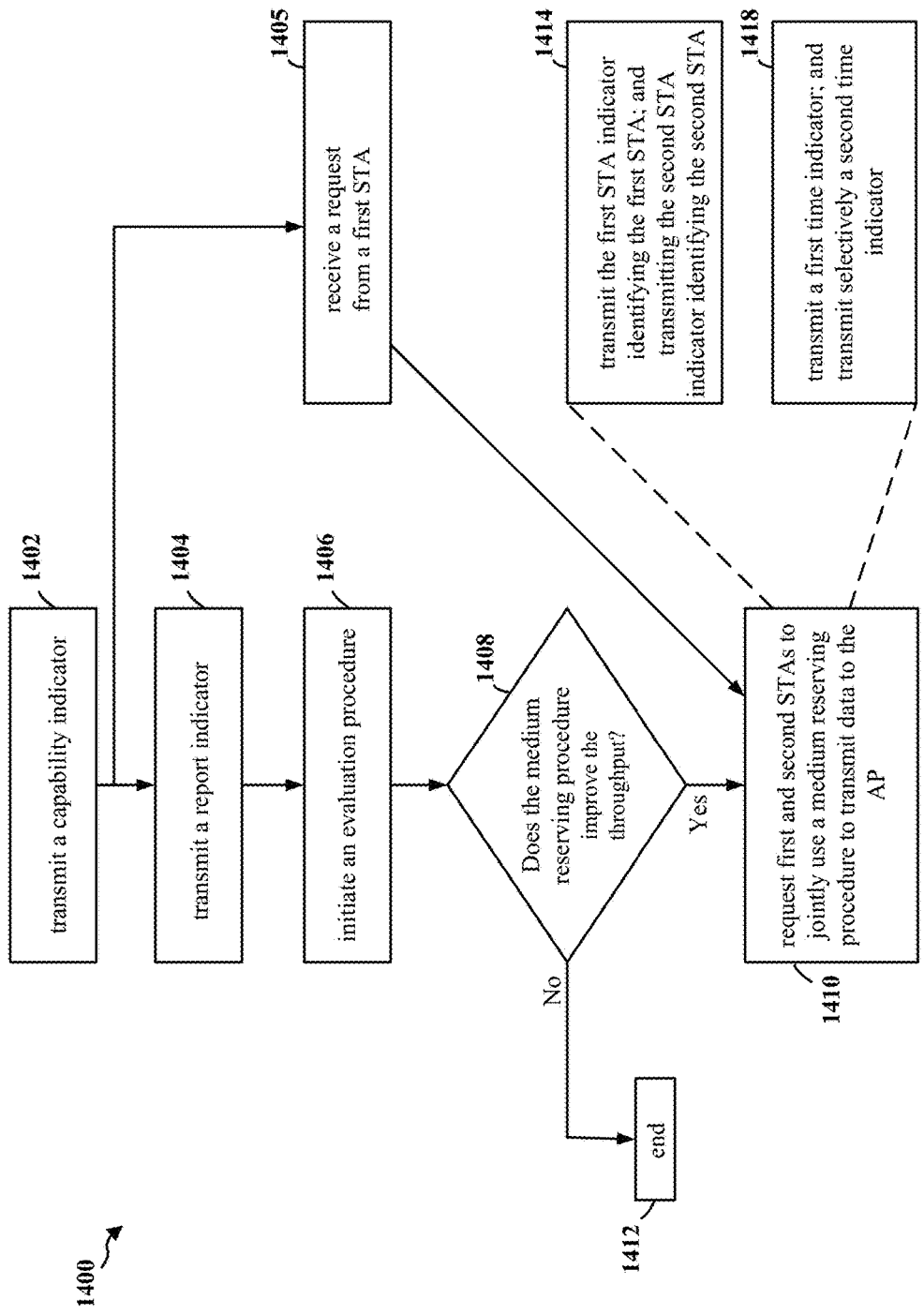
FIG. 14 is a flowchart of a first method of wireless communication for jointly enabling a medium reserving procedure.

FIG. 14 is a flowchart 1400 of a method of wireless communication for jointly enabling a medium reserving procedure. In one configuration and optionally, at operation 1402, an AP transmits a capability indicator indicating a capability of the AP to request two or more STAs to jointly use the medium reserving procedure to transmit data to the AP; the medium reserving procedure reserves a medium for data transmission. The medium reserving procedure can employ an RTS/CTS procedure. In one configuration and optionally, at operation 1404, the AP transmits a report indicator that requests a STA to report a throughput metric to the AP in a measurement period specified in the indicator. In one configuration and optionally, at operation 1406, the AP initiates an evaluation procedure with first and second STAs. The evaluation procedure determines an evaluation result associated with throughput of respective data communications between the AP and the first STA and the second STA jointly using the medium reserving procedure. In one configuration and optionally, at operation 1408, the AP determines whether the medium reserving procedure improves the throughput based on the evaluation result.

If the medium reserving procedure improves the throughput, at operation 1410, the AP requests the first and second STAs to jointly use the medium reserving procedure to transmit data to the AP. If the medium reserving procedure does not improve the throughput, at operation 1412, the procedure of the AP ends and the AP operates without requesting the first and second STAs to enable the medium reserving procedure.

In one configuration and optionally, within operation 1410, the AP transmits, at operation 1414, a first STA indicator identifying the first STA to instruct the first STA to use the medium reserving procedure to transmit data to the AP. The AP transmits a second STA indicator identifying the second STA to instruct the second STA to use the medium reserving procedure to transmit data to the AP. In one configuration and optionally, the first STA indicator and the second STA indicator are included in an IE of a frame. In one configuration and optionally, within operation 1410, the AP transmits, at operation 1414, a first time indicator indicating the first time period to transmit data to the AP using the medium reserving procedure. In one configuration and optionally, the AP transmits a second time indicator indicating the second time period to transmit data to the AP without using the medium reserving procedure.

In one configuration and optionally, subsequent to operation 1402, the AP receives, at operation 1405, a request from the first STA to instruct both the first STA and the second STA to transmit data using the medium reserving procedure. Subsequent to operation 1405, the AP executes operation 1410.

Figure 15:
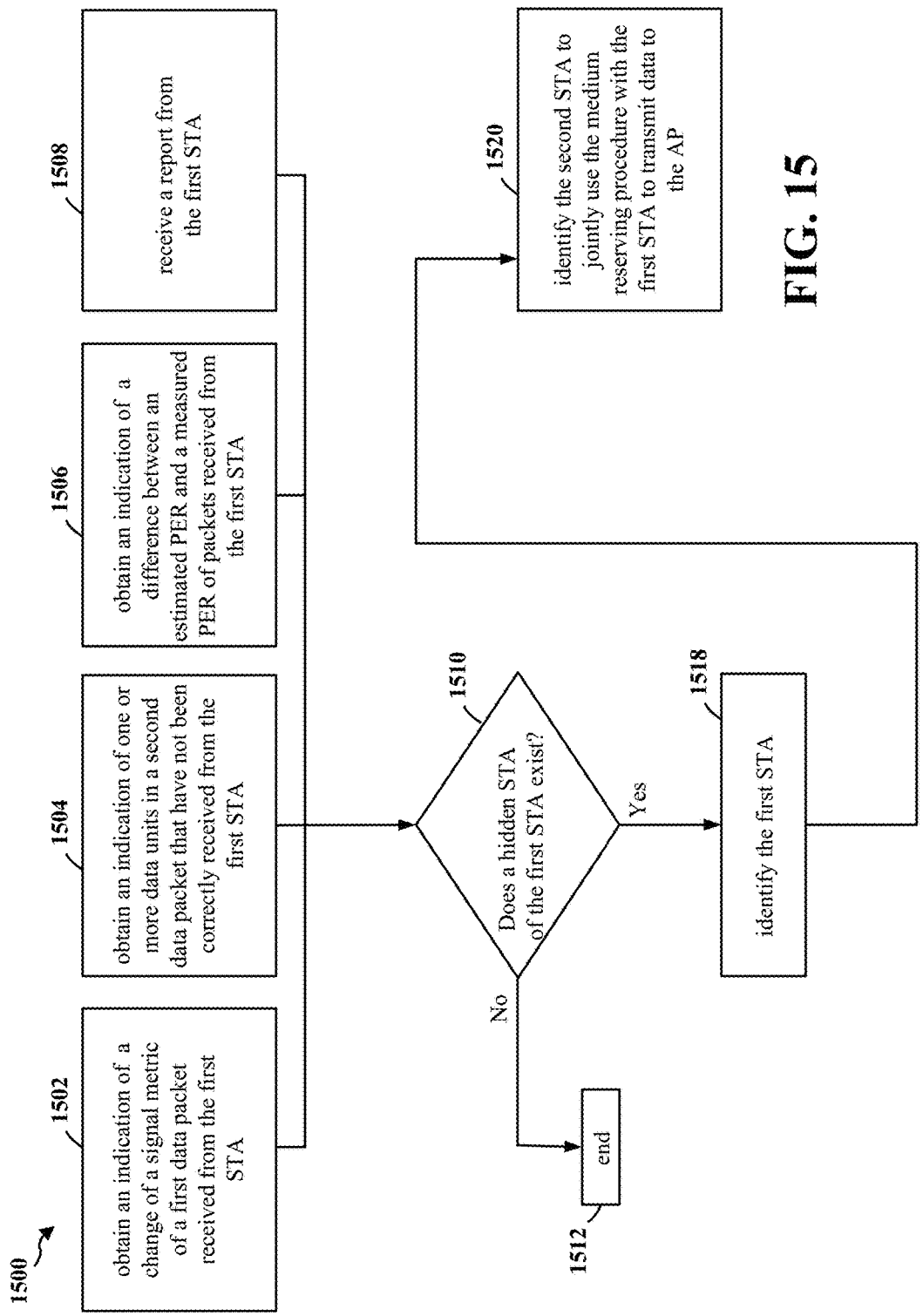
FIG. 15 is a flowchart of a method of wireless communication for determining existence of a hidden node.

FIG. 15 is a flowchart 1500 of a method of wireless communication for determining existence of a hidden node. In one configuration, at operation 1502, an AP obtains an indication of a change of a signal metric of a first data packet received from a first STA. In one configuration, at operation 1504, the AP obtains an indication of one or more data units in a second data packet that have not been correctly received from the first STA. In one configuration, at operation 1506, the AP obtains an indication of a difference between an estimated PER and a measured PER of packets received from the first STA. In one configuration, at operation 1508, the AP receives a report from the first STA. The report includes an identification of a hidden STA disrupting the data communication of the first STA. The AP identifies the first STA based on the report.

Subsequent to the operations 1502, 1504, 1506, and 1508, the AP determines, at operation 1510, whether a hidden STA of the first STA exists based on the indication or the report. The hidden STA transmits data to the AP and disrupts a data communication of the first STA. If a hidden STA of the first STA exists, the AP enters operation 1518. At operation 1518, the AP identifies the first STA to jointly use the medium reserving procedure with another STA to transmit data to the AP. At operation 1520, the AP identifies the second STA to jointly use the medium reserving procedure with the first STA to transmit data to the AP. If a hidden STA of the first STA does not exist, at operation 1512, the procedure of the AP ends.

Figure 16:
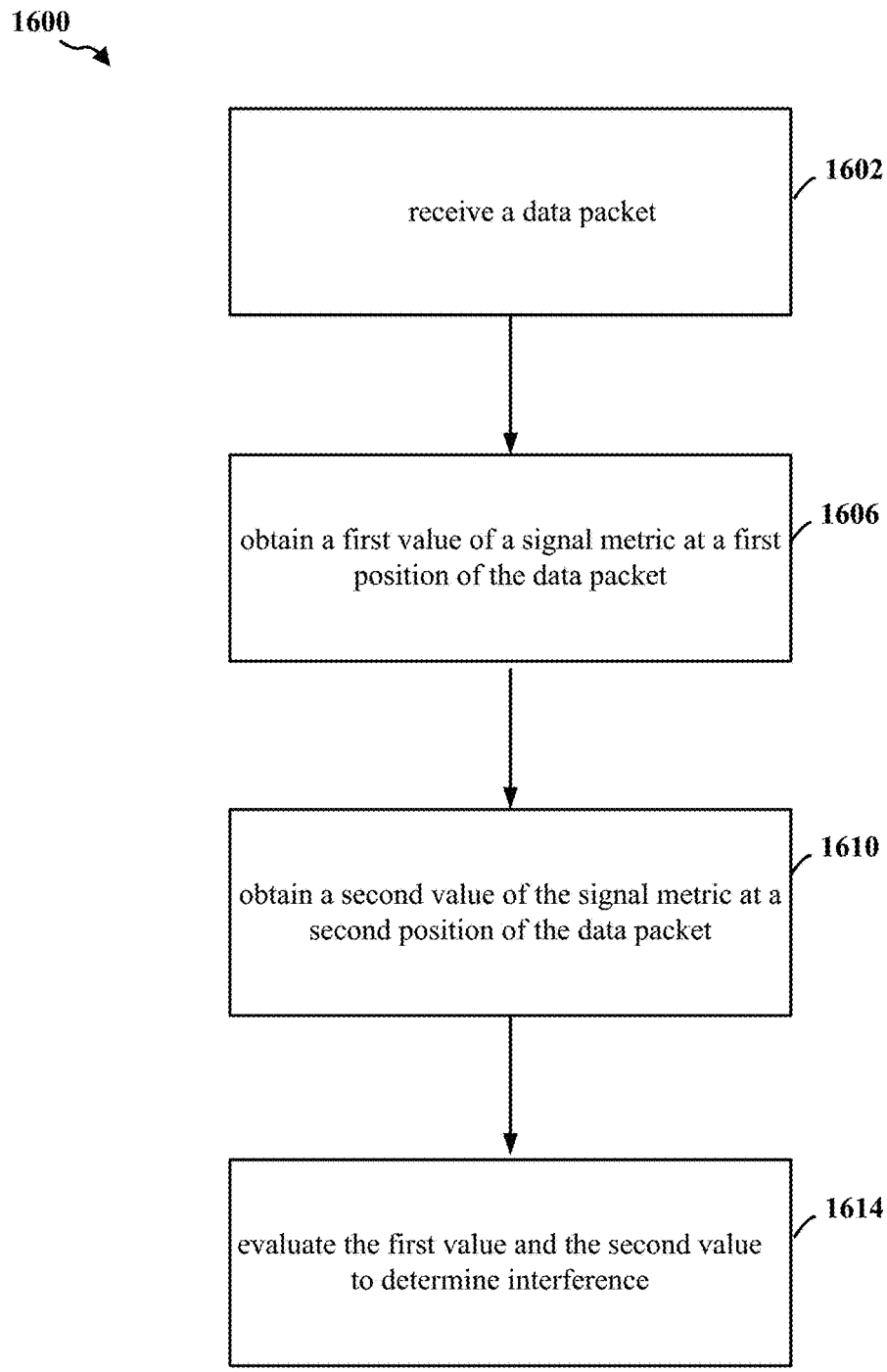
FIG. 16 is a flowchart of a method of wireless communication for determining interference.

FIG. 16 is a flowchart 1600 of a method of wireless communication for determining interference. At operation 1602, an AP receives a data packet from a STA. At operation 1606, the AP obtains a first value of a signal metric at a first position of the data packet. The signal metric can include at least one of an RSSI, an estimated channel coefficient, an estimated phase offset, an estimated frequency offset, or a measured pilot error vector magnitude. At operation 1610, the AP obtains a second value of the signal metric at a second position of the data packet. At operation 1614, the AP evaluates the first value and the second value to determine interference.

Figure 17:
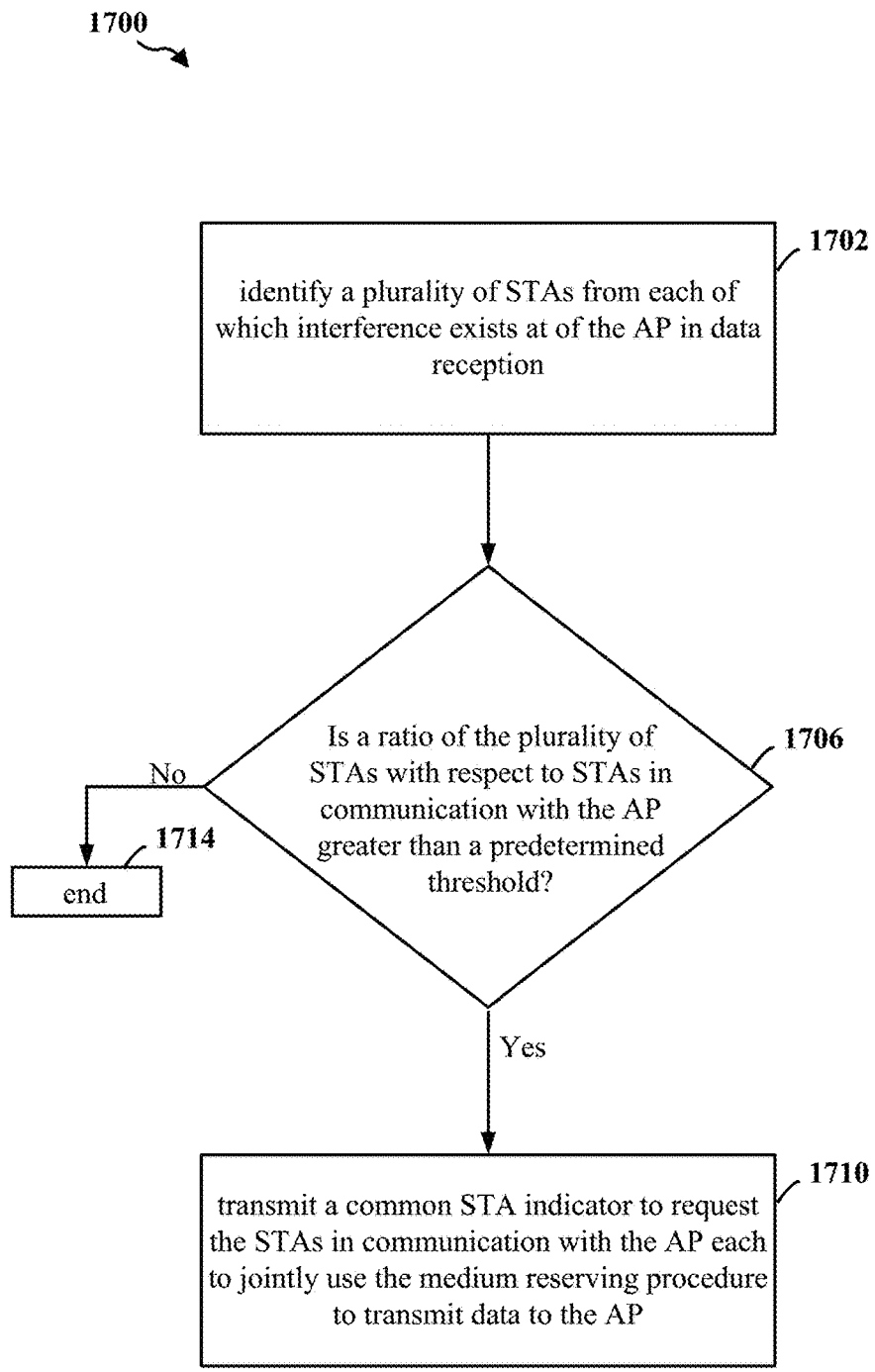
FIG. 17 is a flowchart of a method of wireless communication for jointly enabling a medium reserving procedure at all receiving stations.

FIG. 17 is a flowchart 1700 of a method of wireless communication for jointly enabling a medium reserving procedure at all receiving stations. At operation 1702, an AP identifies a plurality of STAs from each of which interference exists at of the AP in data reception. At operation 1706, the AP determines whether a ratio of the plurality of STAs with respect to STAs in communication with the AP is greater than a predetermined threshold. If the ratio is greater than the predetermined threshold, the AP, at operation 1710, transmits a common STA indicator that instructs the STAs in communication with the AP each to jointly use the medium reserving procedure to transmit data to the AP. If the ratio is not greater than the predetermined threshold, at operation 1714, the procedure of the AP ends and the AP operates without requesting the STAs to enable the medium reserving procedure.

Figure 18:
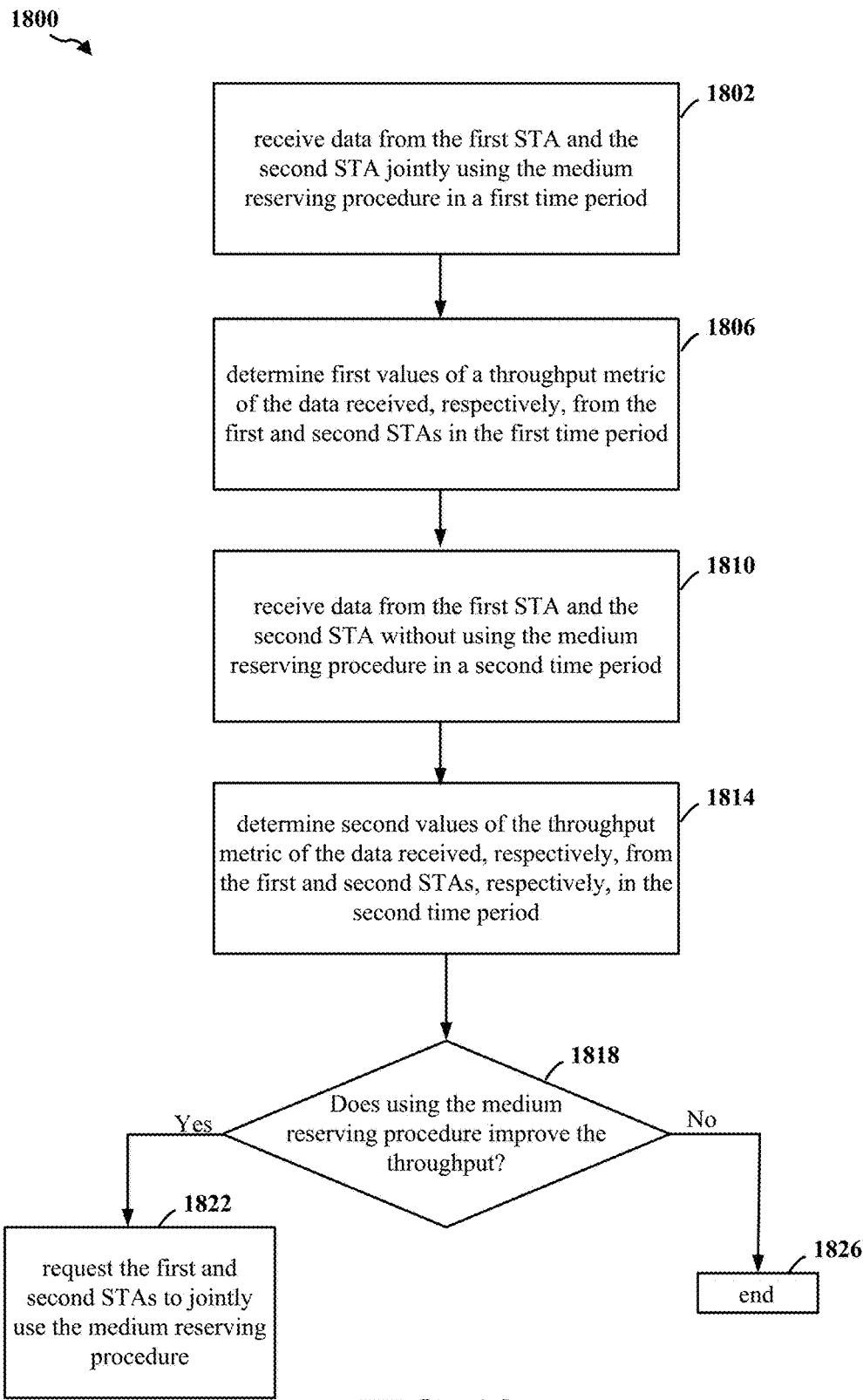
FIG. 18 is a flowchart of a first method of wireless communication for evaluating whether using a medium reserving procedure can improve throughput.

FIG. 18 is a flowchart 1800 of a method of wireless communication for evaluating whether using a medium reserving procedure can improve throughput. At operation 1802, an AP receives data from the first STA and the second STA jointly using the medium reserving procedure in a first time period. At operation 1806, the AP determines first values of a throughput metric of the data received, respectively, from the first and second STAs in the first time period. At operation 1810, the AP receives data from the first STA and the second STA without using the medium reserving procedure in a second time period. At operation 1814, the AP determines second values of the throughput metric of the data received, respectively, from the first and second STAs, respectively, in the second time period. At operation 1818, the AP determines whether using the medium reserving procedure improves the throughput of the first and second STAs.

If the medium reserving procedure improves the throughput, the AP, at operation 1822, requests the first and second STAs to jointly use the medium reserving procedure to transmit data to the AP. If the medium reserving procedure does not improve the throughput, at operation 1826, the procedure of the AP ends and the AP operates without requesting the first and second STAs to enable the medium reserving procedure.

Figure 19:
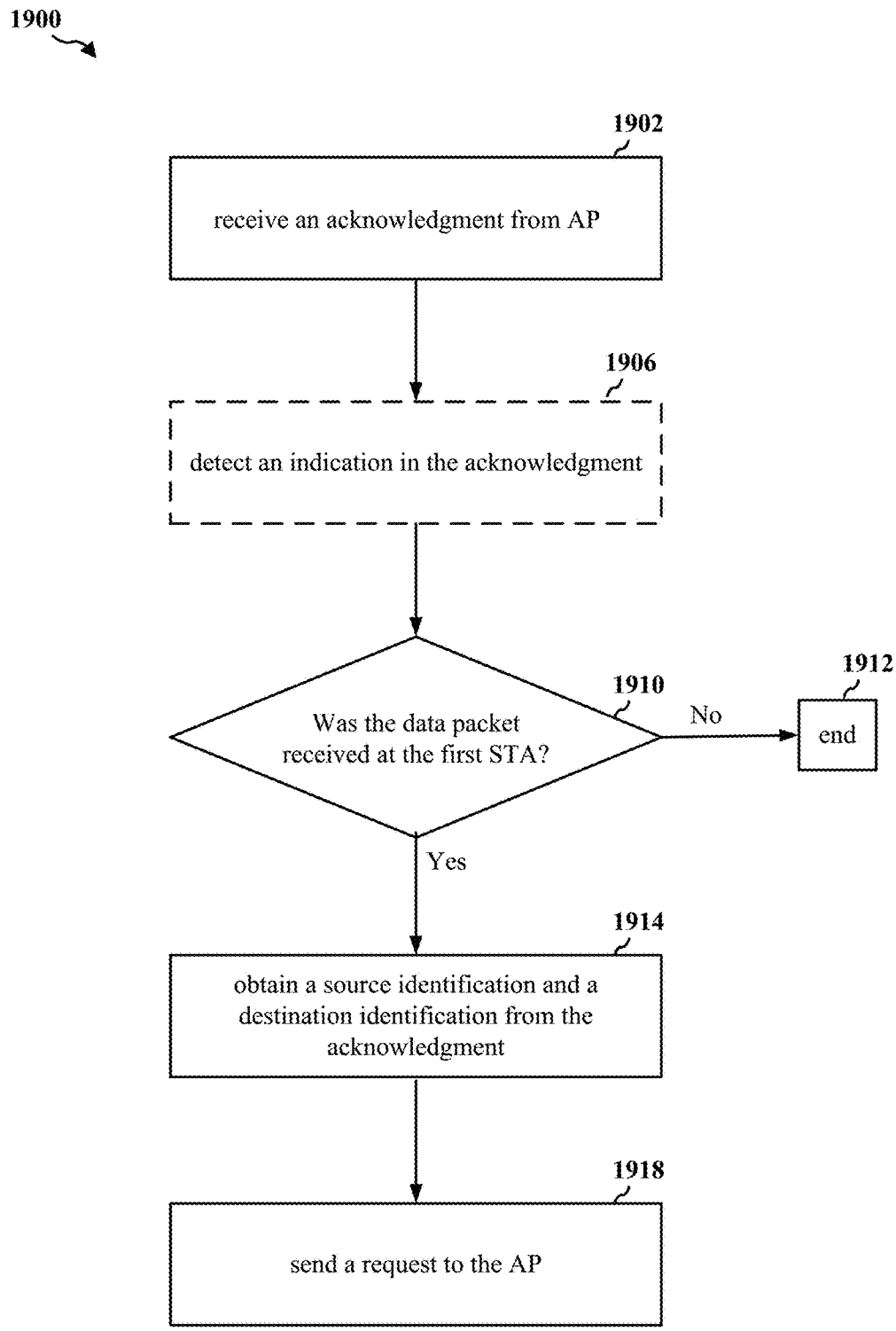
FIG. 19 is a flowchart of a second method of wireless communication for determining existence of a hidden node.

FIG. 19 is a flowchart 1900 of a method of wireless communication for determining existence of a hidden node. At operation 1902, a STA receives an acknowledgment from an AP. The acknowledgment acknowledges receipt of a data packet. In one configuration and optionally, at operation 1906, the STA detects an indication in the acknowledgment. The indication indicates that the data packet was received at the AP at the predetermined time period prior to sending the acknowledgment.

At operation 1910, the STA determines whether the data packet was received at the predetermined time period prior to receiving the acknowledgment. If the data packet was not received, the STA, at operation 1914, obtains a source identification and a destination identification from the acknowledgment. The source identification is associated with the AP. The destination identification is associated with a second STA.

At operation 1918, the STA sends a request to the AP. The request requests the AP to instruct both the first STA and the second STA to transmit data using a medium reserving procedure, and the medium reserving procedure reserves a medium for data transmission. If at operation 1910 the STA determines that the data packet was received, at operation 1912, the procedure of the STA ends.

Figure 20:
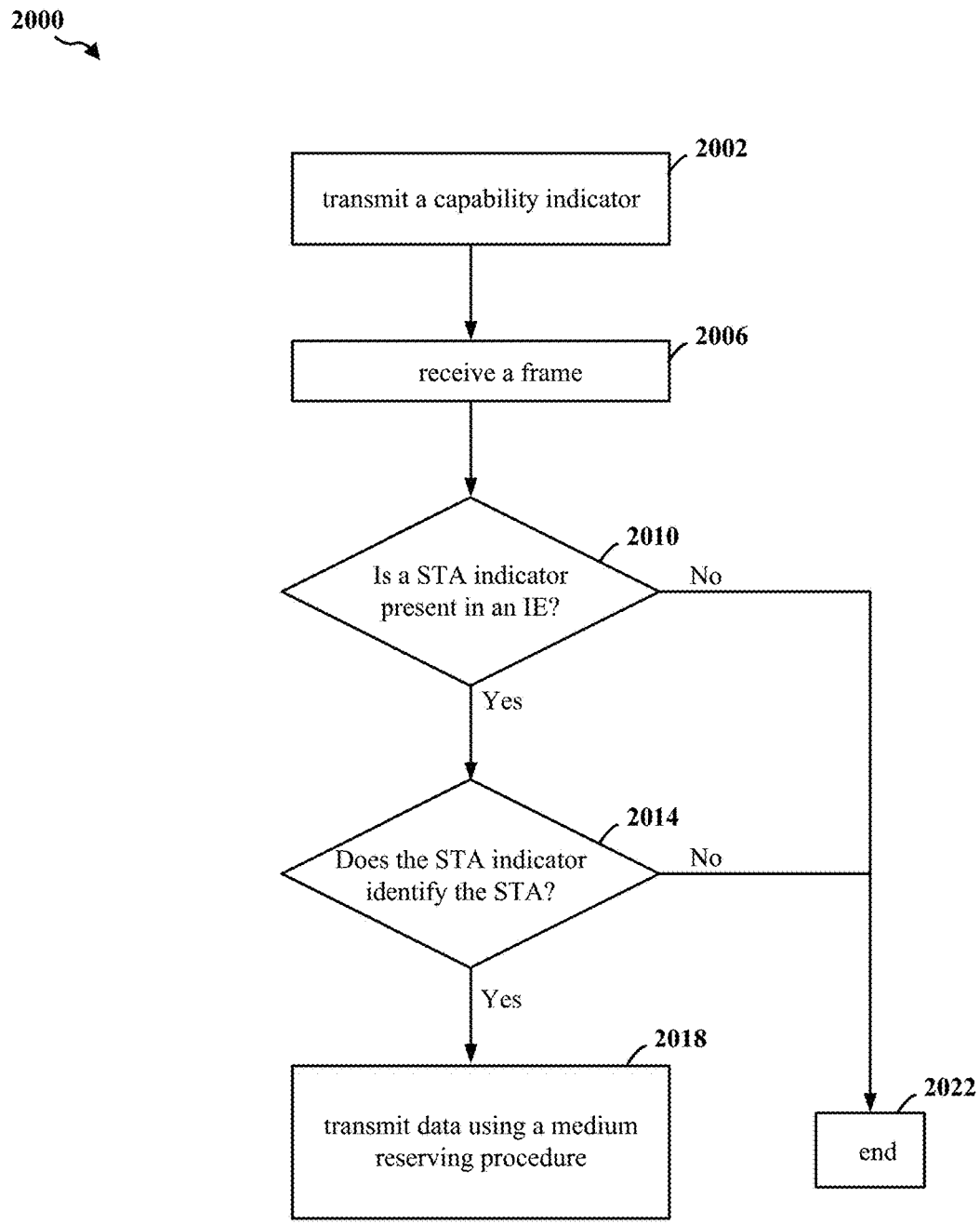
FIG. 20 is a flowchart of a method of wireless communication for jointly enabling a medium reserving procedure at a station.

FIG. 20 is a flowchart 2000 of a method of wireless communication for jointly enabling a medium reserving procedure at a station. In one configuration and optionally, at operation 2002, a STA transmits a capability indicator indicating a capability of the STA to jointly use the medium reserving procedure with another STA. In one configuration and optionally, the STA indicator is included in an IE of a frame, At operation 2006, the STA receives the frame. In one configuration and optionally, at operation 2010, the STA detects whether the STA indicator is present in the IE. If the STA indicator is present, the STA executes operation 2014. If the STA indicator is not present, at operation 2022, the procedure of the STA ends.

At operation 2014, the STA determines whether the STA indicator identifies the STA. If the STA indicator identifies the STA, at operation 2018, the STA transmits data to the AP using a medium reserving procedure, and the medium reserving procedure reserves a medium for data transmission. If the STA indicator does not identify the STA, at operation 2022, the procedure of the STA ends.

Figure 21:
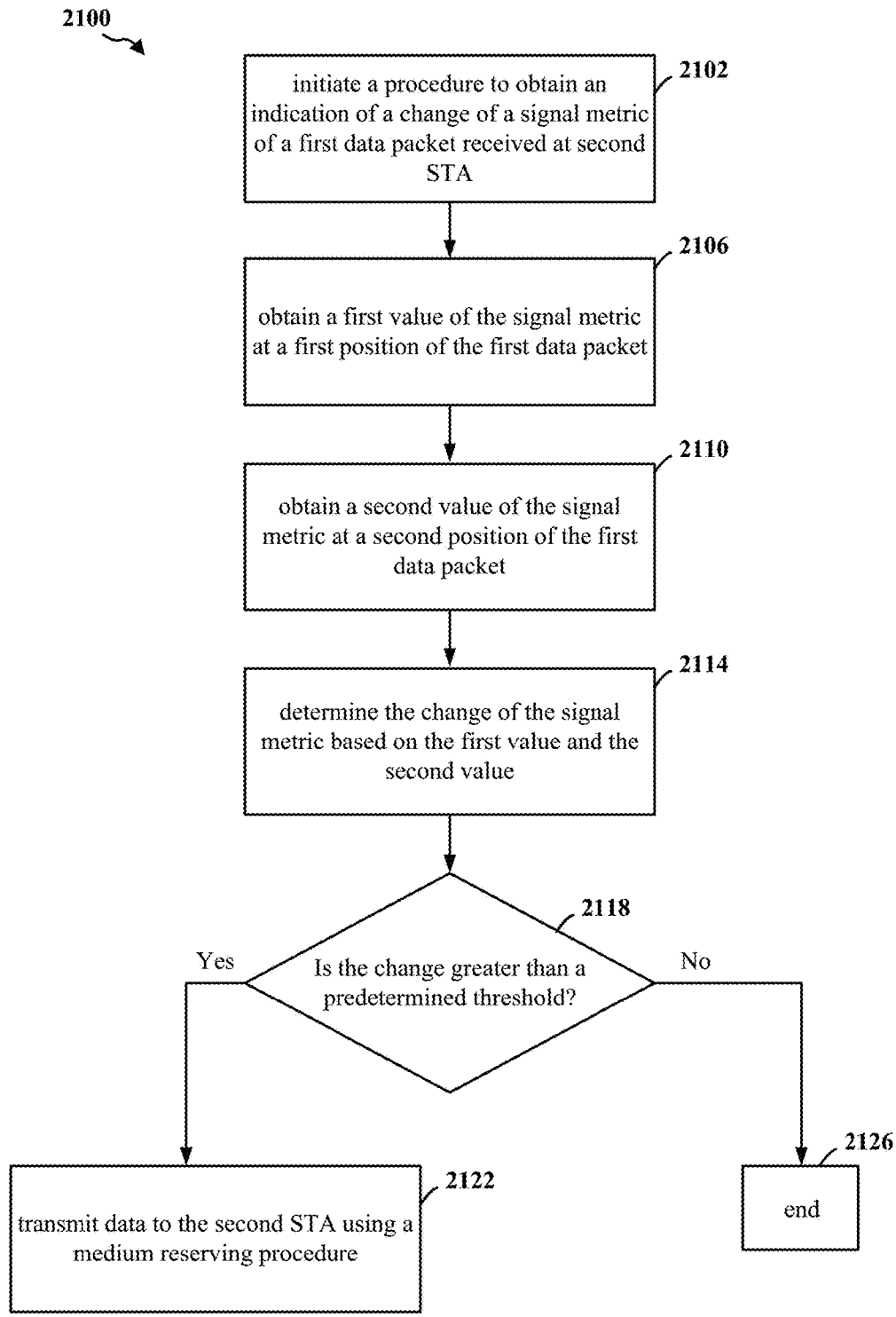
FIG. 21 is a flowchart of a method of wireless communication for determining whether to enable a medium reserving procedure based on signal metrics.

FIG. 21 is a flowchart 2100 of a method of wireless communication for determining whether to enable a medium reserving procedure based on signal metrics. At operation 2102, a STA initiates a procedure to obtain an indication of a change of a signal metric of a first data packet received at a second STA. In one configuration and optionally, the signal metric includes at least one of RSSI, an estimated channel coefficient, an estimated phase offset, an estimated frequency offset, or a measured pilot error vector magnitude. At operation 2106, the STA obtains a first value of the signal metric at a first position of the first data packet. At operation 2110, the STA obtains a second value of the signal metric at a second position of the first data packet. At operation 2114, the STA determines the change of the signal metric based on the first value and the second value. At operation 2118, the STA determines whether the change is greater than a predetermined threshold. If the change is greater, at operation 2122, the STA transmits data to the second STA using a medium reserving procedure, and the medium reserving procedure reserves a medium for data transmission. If the change is not greater, at operation 2126, the procedure of the STA ends. In one configuration, the medium reserving procedure employs an RTS/CTS procedure.

Figure 22:
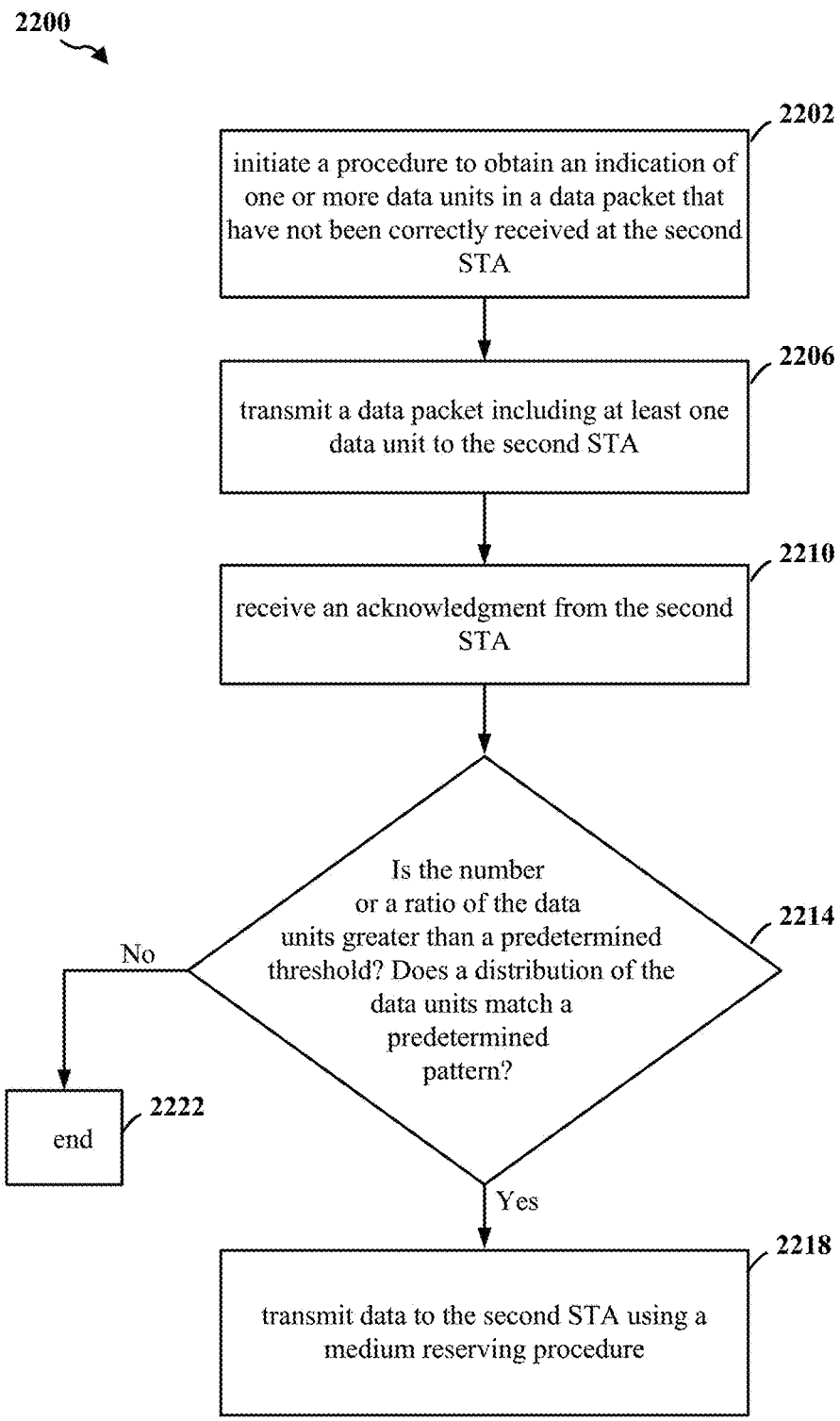
FIG. 22 is a flowchart of a method of wireless communication for determining whether to enable a medium reserving procedure based on data units that have not been correctly received at a station.

FIG. 22 is a flowchart 2200 of a method of wireless communication for determining whether to enable a medium reserving procedure based on data units that have not been correctly received at a station. At operation 2202, a STA initiates a procedure to obtain an indication of one or more data units in a data packet that have not been correctly received at the second STA. At operation 2206, the STA transmits the data packet including at least one data unit to the second STA. At operation 2210, the STA receives an acknowledgment from the second STA. The acknowledgment includes the indication of the one or more data units of the at least one data unit that have not been correctly received at the second STA. At operation 2214, the STA determines whether the number or a ratio of the data units that have not been correctly received at the second STA is greater than a predetermined threshold. The STA can also determine whether a distribution of the data units that have not been correctly received at the second STA matches a predetermined pattern. If the number or a ratio is greater or if distribution matches the predetermined pattern, at operation 2218, the STA transmits data to the second STA using a medium reserving procedure, and the medium reserving procedure reserves a medium for data transmission. In one configuration, the medium reserving procedure employs an RTS/CTS procedure. If the number or a ratio is not greater or if distribution does not match the predetermined pattern, at operation 2222, the procedure of the STA ends. In one configuration, the second data packet is a PPDU. The at least one data unit includes MPDUs. The acknowledgment is a block acknowledgment.

Figure 23:
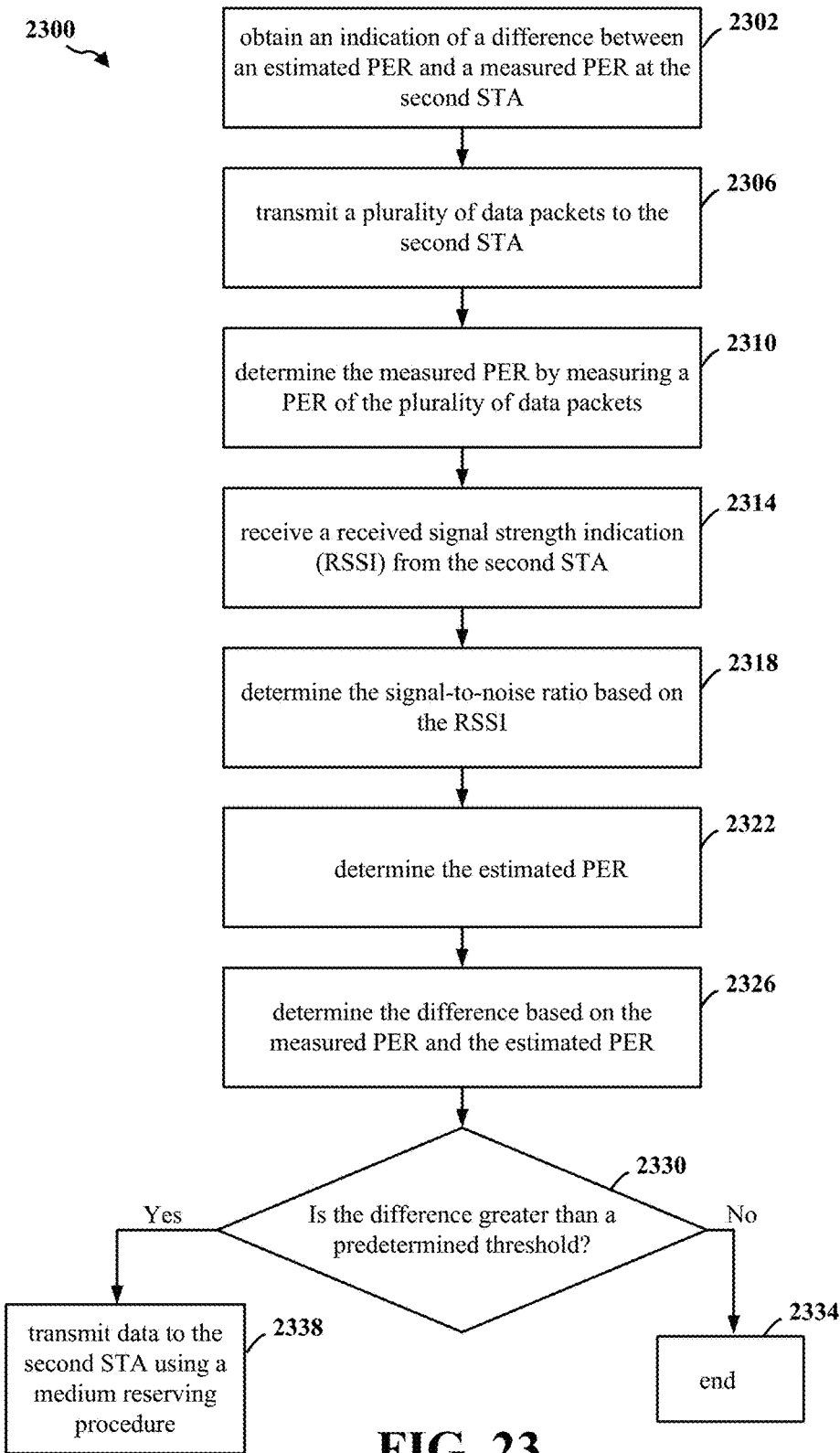
FIG. 23 is a flowchart of a method of wireless communication for determining whether to enable a medium reserving procedure based on PERs.

FIG. 23 is a flowchart 2300 of a method of wireless communication for determining whether to enable a medium reserving procedure based on PERs. At operation 2302, a STA initiates a procedure to obtain an indication of a difference between an estimated PER and a measured PER at the second STA. At operation 2306, the STA transmits a plurality of data packets to the second STA. At operation 2310, the STA determines the measured PER by measuring a PER of the plurality of data packets. At operation 2314, the STA receives an RSSI from the second STA. At operation 2318, the STA determines the SNR based on the RSSI. At operation 2322, the STA estimates a PER based on the SNR between the first STA and the second STA. At operation 2326, the STA determines the difference based on the measured PER and the estimated PER. At operation 2330, the STA determines whether the difference is greater than a predetermined threshold. If the difference is greater, at operation 2334, the STA transmits data to the second STA using a medium reserving procedure, and the medium reserving procedure reserves a medium for data transmission. In one configuration, the medium reserving procedure employs an RTS/CTS procedure. If the difference is greater, at operation 2338, the procedure of the STA ends.

Figure 24:
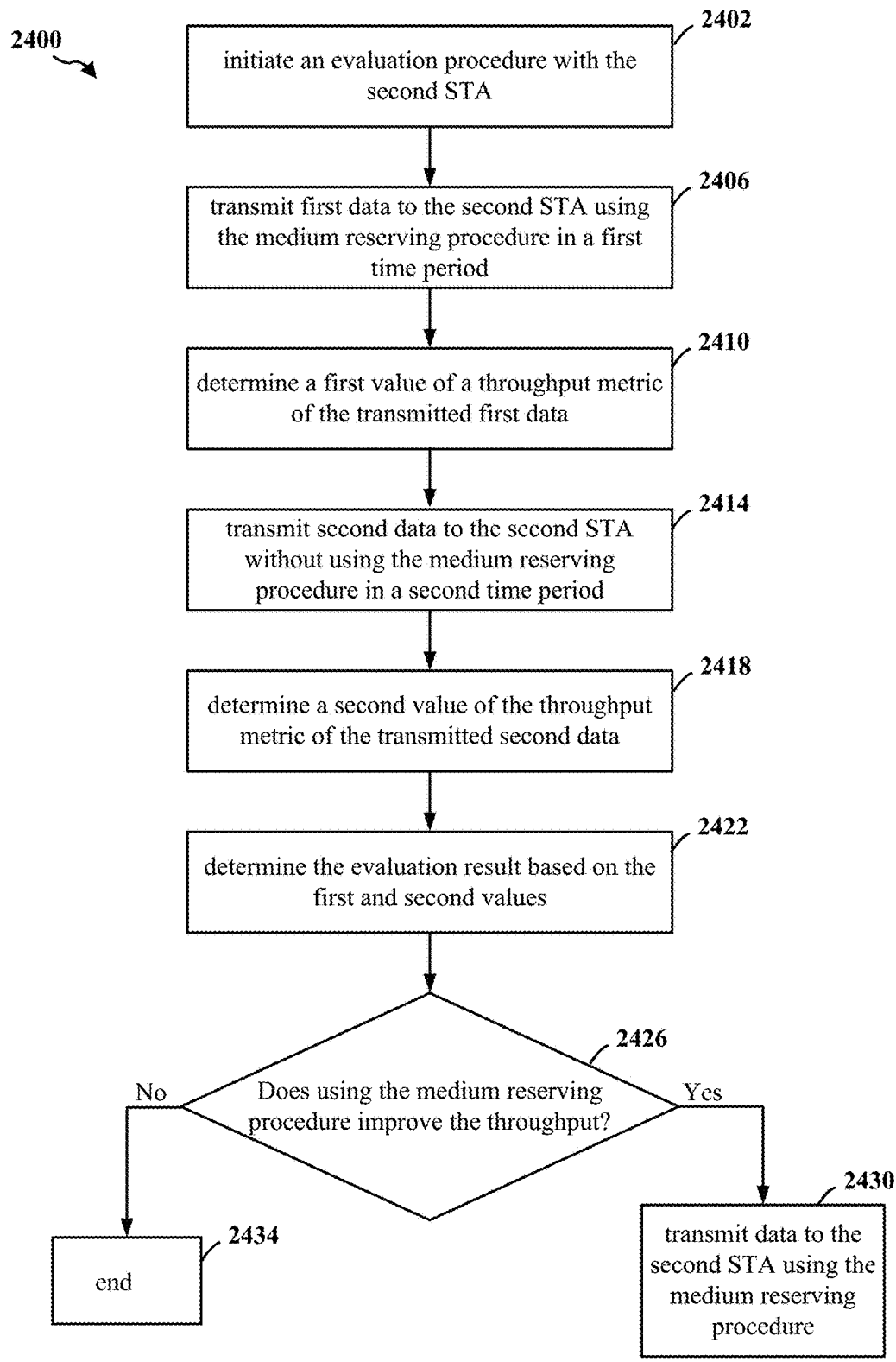
FIG. 24 is a flowchart of a second method of wireless communication for evaluating whether using a medium reserving procedure can improve throughput.

FIG. 24 is a flowchart 2400 of a method of wireless communication for evaluating whether using a medium reserving procedure can improve throughput. At operation 2402, a STA initiates an evaluation procedure with the second STA. The evaluation procedure determines an evaluation result associated with a throughput of a data communication between the first STA and the second STA using the medium reserving procedure. At operation 2406, the STA transmits first data to the second STA using the medium reserving procedure in a first time period. At operation 2410, the STA determines a first value of a throughput metric of the transmitted first data. In one configuration, the throughput metric is based on an actual throughput determined at one or more of the first STA or the second STA. In one configuration, the throughput metric is based on an equivalent full buffer throughput determined at the first STA. At operation 2414, the STA transmits second data to the second STA without using the medium reserving procedure in a second time period. At operation 2418, the STA determines a second value of the throughput metric of the transmitted second data. At operation 2422, the STA determines the evaluation result based on the first and second values. At operation 2426, the STA determines whether using the medium reserving procedure improves the throughput of the STA based on the evaluation result. In one configuration, the medium reserving procedure employs an RTS/CTS procedure. If the medium reserving procedure improves the throughput, the STA, at operation 2430, use the medium reserving procedure to transmit data to the second STA. If the medium reserving procedure does not improve the throughput, at operation 2434, the STA transmits data to the second STA without using the medium reserving procedure.

Figure 25:
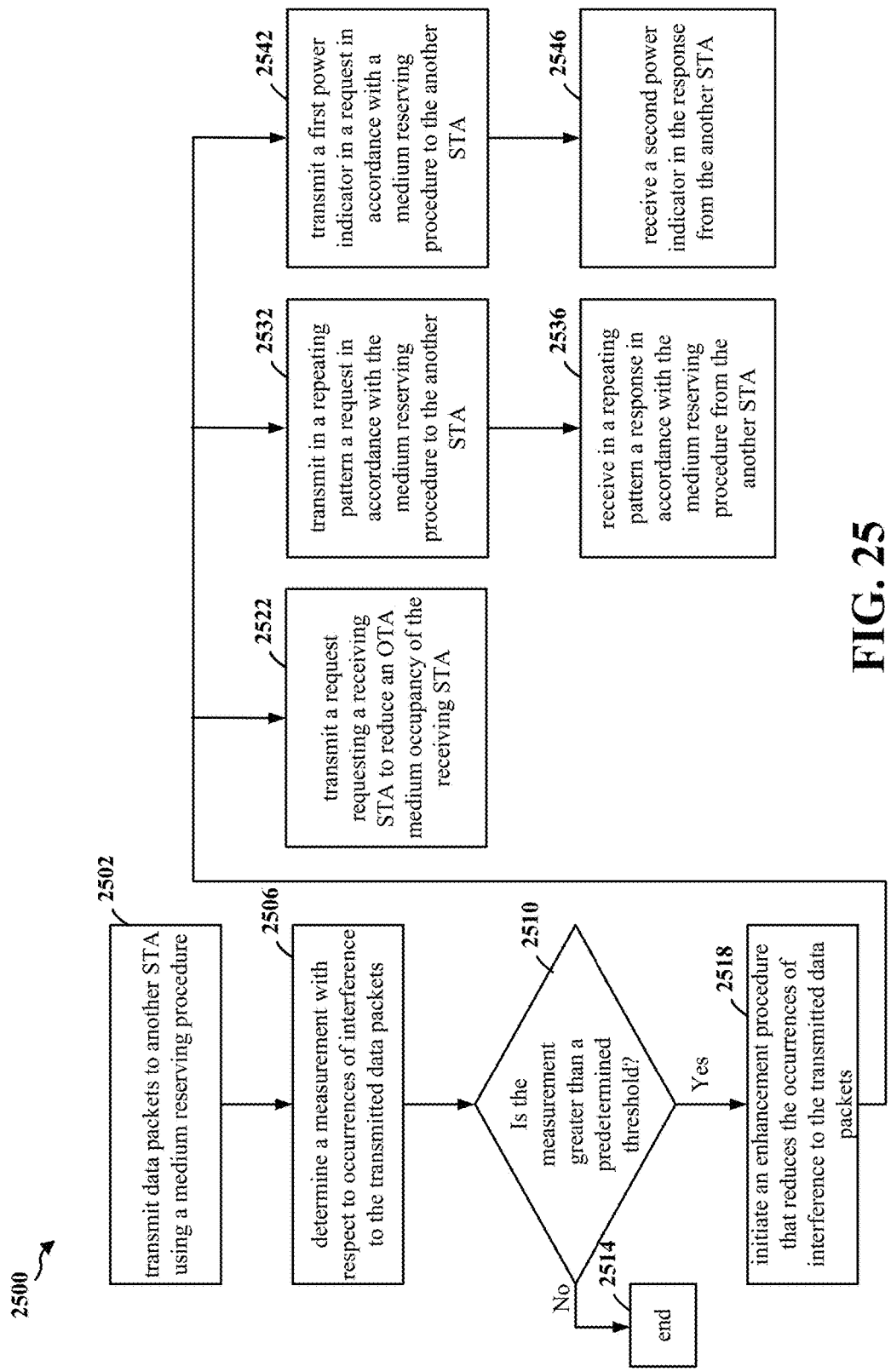
FIG. 25 is a flowchart of a method of wireless communication for using an enhanced medium reserving procedure.

FIG. 25 is a flowchart 2500 of a method of wireless communication for using an enhanced medium reserving procedure. At operation 2502, the STA transmits data packets to another STA using a medium reserving procedure, and the medium reserving procedure reserves a medium for data transmission. In one configuration, the medium reserving procedure employs an RTS/CTS procedure. At operation 2506, the STA determines a measurement with respect to occurrences of interference to the transmitted data packets. At operation 2510, the STA determines whether the measurement is greater than a predetermined threshold. If the measurement is not greater, at operation 2514, the procedure of the STA ends. If the measurement is greater, at operation 2518, the STA initiates an enhancement procedure that reduces the occurrences of interference to the transmitted data packets. In one configuration, subsequent to operation 2518, the STA transmits, at operation 2522, a request requesting a receiving STA to reduce an OTA medium occupancy of the receiving STA. In one configuration and optionally, the request instructs the receiving STA to adjust an EDCA parameter. In one configuration and optionally, the request instructs the receiving STA to maintain one or more silence periods. In one configuration and optionally, the one or more silence periods include at least three silence periods and are periodic.

In one configuration, subsequent to operation 2518, the STA transmits, at operation 2532, in a repeating pattern a request in accordance with the medium reserving procedure to the another STA. At operation 2536, the STA receives in a repeating pattern a response in accordance with the medium reserving procedure from the another STA. In one configuration and optionally, both the request is transmitted and the response is received in the respective repeating pattern.

In one configuration, subsequent to operation 2518, the STA transmits, at operation 2542, a first power indicator in a request in accordance with the medium reserving procedure to the another STA. The first power indicator indicates a transmission power to be used at the another STA to transmit a response in accordance with the medium reserving procedure to the STA. At operation 2546, the STA receives a second power indicator in the response from the another STA. The second power indicator indicates a transmission power to be used at the STA to transmit another request in accordance with the medium reserving procedure to the another STA.

Figure 26:
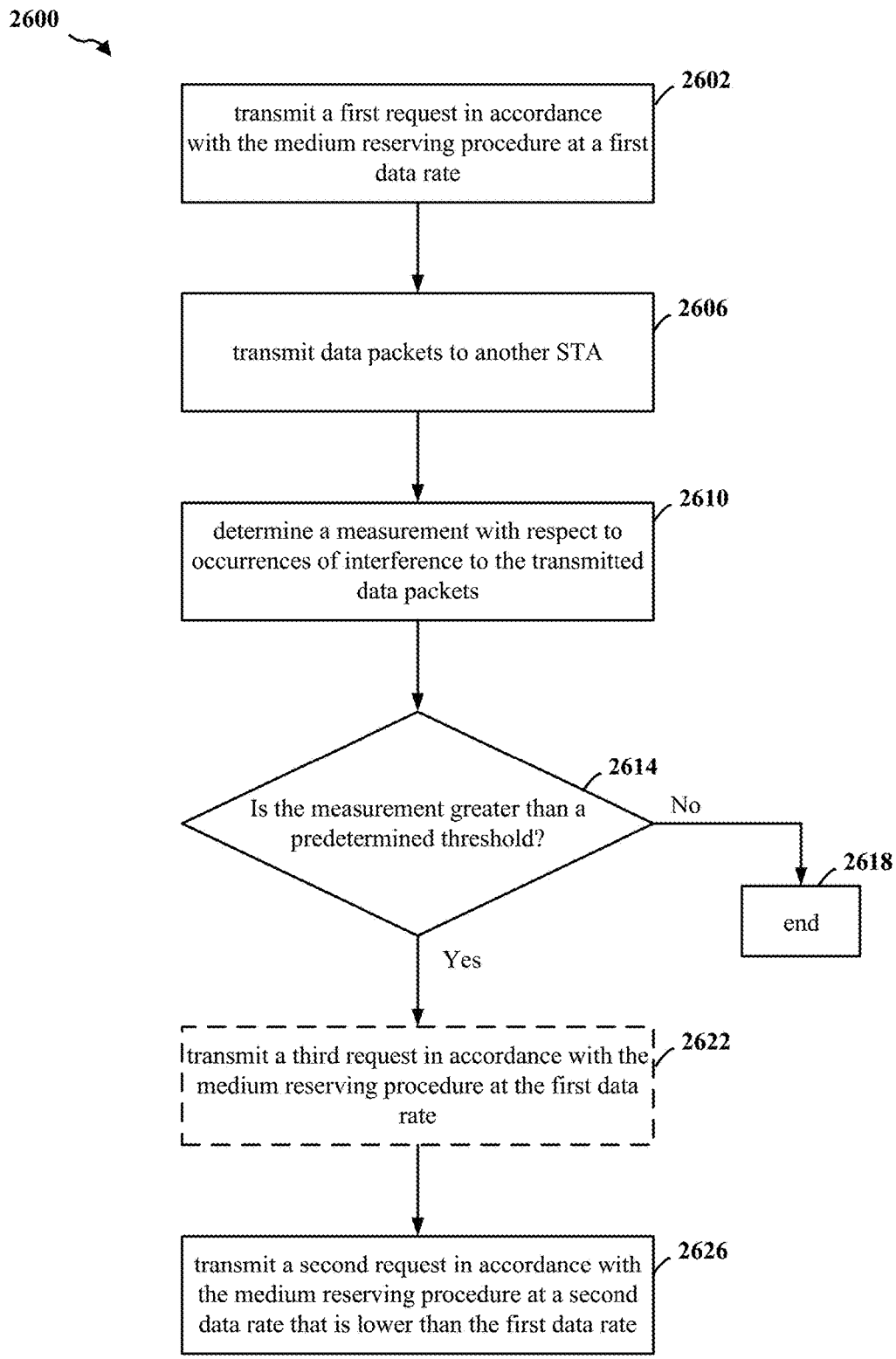
FIG. 26 is a flowchart of a method of wireless communication for transmitting requests/responses of a medium reserving procedure at different data rates.

FIG. 26 is a flowchart 2600 of a method of wireless communication for transiting requests/responses of a medium reserving procedure at different data rates. At operation 2602, a STA transmits a first request in accordance with a medium reserving procedure at a first data rate, and the medium reserving procedure reserves a medium for data transmission. At operation 2606, the STA transmits data packets to another STA At operation 2610, the STA determines a measurement with respect to occurrences of interference to the transmitted data packets. At operation 2614, the STA determines whether the measurement is greater than a predetermined threshold. If the measurement is not greater than the predetermined threshold, at operation 2618, the procedure of the STA ends. If the measurement is greater than the predetermined threshold, at operation 2626, the STA transmits a second request in accordance with the medium reserving procedure at a second data rate that is lower than the first data rate. In one configuration and optionally, prior to operation 2626, the STA transmits, at operation 2622, a third request in accordance with the medium reserving procedure at the first data rate prior to transmitting the second request in the same transmit opportunity in which the second request is transmitted.

Figure 27:
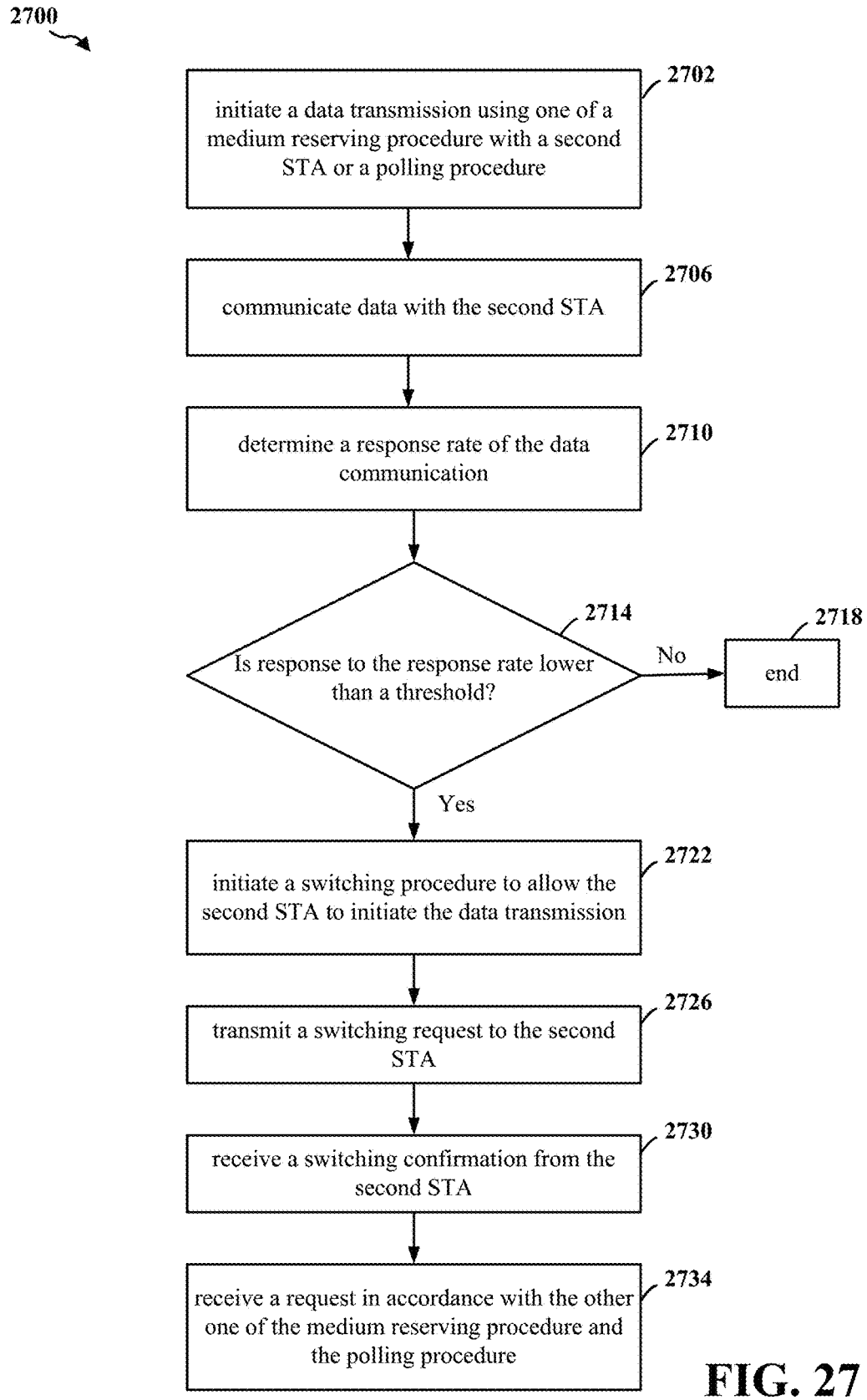
FIG. 27 is a flowchart of a method of wireless communication for initiating a switching procedure.

FIG. 27 is a flowchart 2700 of a method of wireless communication for initiating a switching procedure. At operation 2702, a first STA initiates a data transmission with a second STA using one of a medium reserving procedure or a polling procedure. The medium reserving procedure reserves a medium for data transmission. The polling procedure announces receiver availability for receiving data transmission. At operation 2706, the first STA communicates data with the second STA. At operation 2710, the first STA determines a response rate of the data communication in accordance with the one of the medium reserving procedure and the polling procedure. At operation 2714, the first STA determines whether the response rate is lower than a predetermined threshold. In one configuration, the first STA transmits M requests in accordance with the one of the medium reserving procedure and the polling procedure to the second STA, M being an integer greater than 1. The first STA receives N responses in accordance with the one of the medium reserving procedure and the polling procedure from the second STA, N being an integer greater than −1. Then the first STA determines whether N/M is lower than a predetermined ratio.

If the response rate is not lower, at operation 2718, the procedure of the STA ends. If the response rate is lower, at operation 2722, the first STA initiates a switching procedure to allow the second STA to initiate the data transmission. At operation 2726, the STA transmits a switching request to the second STA. In one configuration, the switching request includes a channel load at the first STA. At operation 2730, the STA receives a switching confirmation from the second STA. At operation 2734, the first STA receives a request in accordance with the other one of the medium reserving procedure and the polling procedure.

Figure 28:
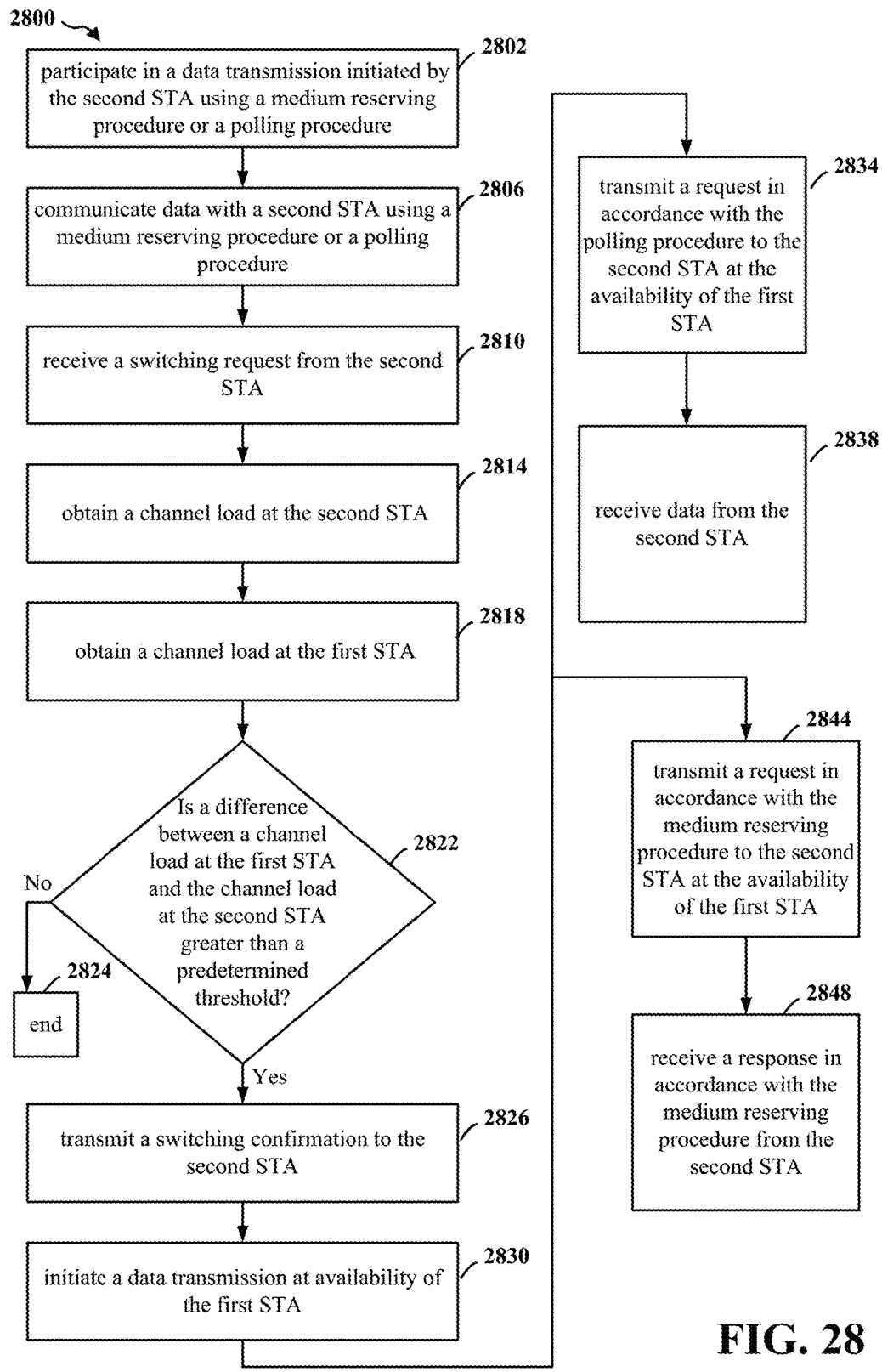
FIG. 28 is a flowchart of a method of wireless communication for responding to a switching procedure.

FIG. 28 is a flowchart 2800 of a method of wireless communication for responding to a switching procedure. At operation 2802, a first STA participates in a data transmission initiated by the second STA using a medium reserving procedure or a polling procedure. The medium reserving procedure reserves a medium for data transmission. The polling procedure announces receiver availability for receiving data transmission. At operation 2806, the first STA communicates data with the second STA. At operation 2810, the first STA receives a switching request from the second STA. At operation 2814, the first STA obtains a channel load at the second STA from the switching request. At operation 2818, the first STA obtains a channel load at the first STA. At operation 2822, the first STA determines whether a difference between the channel load at the first STA and the channel load at the second STA is greater than a predetermined threshold. If the difference is not greater, at operation 2824, the procedure of the STA ends.

If the difference is greater, the first STA, at operation 2826 transmits a switching confirmation to the second STA. At operation 2830, the first STA initiates a data transmission at availability of the first STA. In one configuration and optionally, the data communication in operation 2806 uses the medium reserving procedure. Subsequent to operation 2830, the first STA transmits, at operation 2834, a request in accordance with the polling procedure to the second STA at the availability of the first STA. At operation 2838, the first STA receives data from the second STA. In one configuration and optionally, the data communication in operation 2806 uses the polling procedure. Subsequent to operation 2830, the first STA transmits, at operation 2844, a request in accordance with the medium reserving procedure to the second STA at the availability of the first STA. At operation 2848, the first STA receives a response in accordance with the medium reserving procedure from the second STA.

Figure 29:
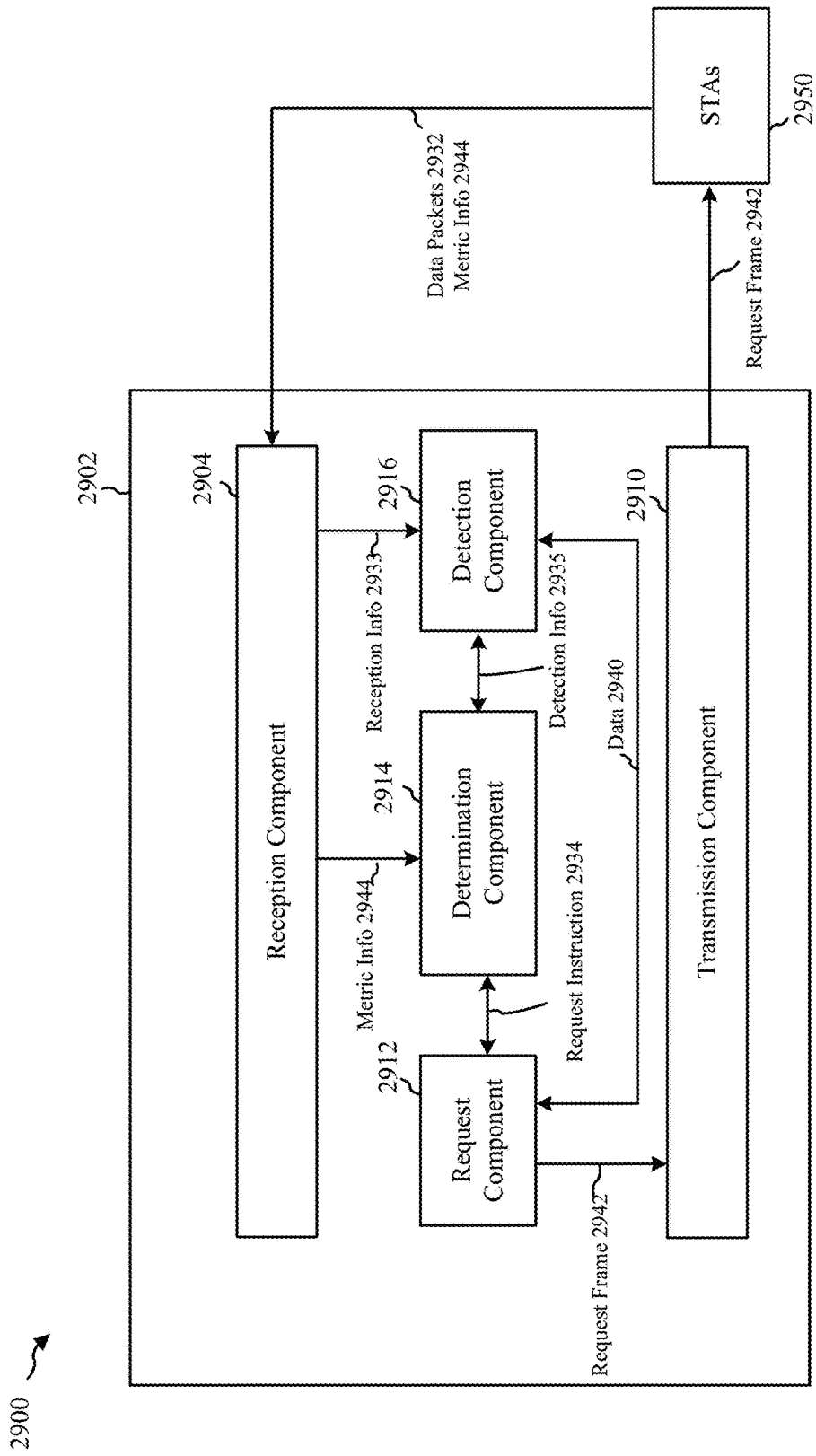
FIG. 29 is a conceptual data flow diagram illustrating the data flow between different components/means in an exemplary apparatus.

FIG. 29 is a conceptual data flow diagram 2900 illustrating the data flow between different components/means in an exemplary apparatus 2902. The apparatus 2902 may be an AP (e.g., the access point 104, the access point 320). The apparatus 2902 includes a reception component 2904, a transmission component 2910, a request component 2912, a determination component 2914, and a detection component 2916.

The apparatus 2902/202 is communication with a plurality of STAs 2950 via the reception component 2904 and the transmission component 2910. The reception component 2904 may receive data packets 2932 from the plurality of STAs 2950. The detection component 2916 may monitor the operation at the reception component 2904 and may obtain reception information 2933 regarding the data packets 2932 from the reception component 2904. The detection component 2916 may determine, based on the reception information 2933, that each STA of the plurality of STAs 2950 has uplink traffic with the apparatus 2902/202. Further, the detection component 2916 may also determine, based on the reception information 2933, that each STA of a subset of STAs of the plurality of STAs 2950 has a hidden node that transmits data to the apparatus 2902/202 and disrupts a communication between the apparatus 2902/202 and the each STA. The detection component 2916 may send such detection information 2935 to the determination component 2914.

The determination component 2914 may decide to, based on the detection information 2935, request a plurality of STAs 2950 to jointly enable and disable a medium reserving procedure for communication in order to evaluate whether the joint enablement of the medium reserving procedure improves communication for the plurality of STAs 2950. The determination component 2914 may make such a decision based on at least one of that each STA of the plurality of STAs 2950 has uplink traffic with the apparatus 2902/202 or that each STA of the subset of STAs of the plurality of STAs 2950 has a hidden node that transmits data to the apparatus 2902/202 and disrupts a communication between the apparatus 2902/202 and the each STA. In certain configurations, the determination component 2914 may determine, based on the detection information 2935, that each of the plurality of STAs 2950 has a hidden node. The plurality of STAs 2950 are requested to jointly enable and disable the medium reserving procedure based on the apparatus 2902/202 receiving interference from the hidden node in association with the plurality of STAs 2950. In certain configurations, the determination component 2914 may determine, based on the detection information 2935, that each STA of the subset of STAs has a hidden node that causes interference to the apparatus 2902/202. The plurality of STAs 2950 are requested to jointly enable and disable the medium reserving procedure based on that the plurality of STAs 2950 each have uplink traffic and that a ratio of the subset of STAs with respect to the plurality of STAs 2950 meets a threshold.

In certain configurations, the determination component 2914 determines that a first STA of the subset of STAs has a hidden node when the detection component 2916 detects a change of a signal metric during reception a data packet received from the first STA. In certain configurations, the reception component 2904 receives the data packets 2932 from the first STA. The detection component 2916 determines a first value of the signal metric at a first position of the data packet. The detection component 2916 further determines a second value of the signal metric at a second position of the data packet. The change of the signal metric is detected based on the first value and the second value. In certain configurations, the signal metric includes at least one of a RSSI, an estimated channel coefficient, an estimated phase offset, an estimated frequency offset, or a measured pilot error vector magnitude. In certain configurations, the determination component 2914 determines that a first STA of the subset of STAs has a hidden node when the detection component 2916 detects that one or more data units in a data packet from the first STA have not been correctly received at the apparatus 2902/202. In certain configurations, the determination component 2914 determines that a first STA of the subset of STAs has a hidden node when the apparatus 2902/202 detects a difference between an estimated PER and a measured PER for packets received from the first STA. In certain configurations, the reception component 2904 receives data packets 2932 carrying a report from the first STA. The report includes an identification of the hidden node of the first STA. The determination component 2914 obtains the report from the reception component 2904 and determines that a first STA of the subset of STAs has a hidden node based on the report.

Accordingly, the determination component 2914 sends a request instruction 2934 to the request component 2912. The request component 2912 constructs a request frame 2942 and sends the request frame 2942 to the transmission component 2910. The transmission component 2910 transmits the request frame 2942 to the plurality of STAs 2950. In certain configurations, the request frame 2942 requests the plurality of STAs 2950 to jointly enable the medium reserving procedure for communication in a first time period and to jointly disable the medium reserving procedure for communication in a second time period. In certain configurations, the request frame 2942 includes a first time indicator indicating the first time period. In certain configurations, the request frame 2942 includes a second time indicator indicating the second time period. In certain configurations, the request frame 2942 includes a STA indicator identifying the each STA of the plurality of STAs 2950. In certain configurations, the first time indicator, the second time indicator, and/or the STA indicator may be included in an IE of the request frame 2942 or is an information bit in the request frame 2942.

The reception component 2904 may receive communication metric information 2944 from the plurality of STAs 2950. The communication metric information 2944 indicates a communication metric while jointly enabling or disabling the medium reserving procedure for communication. The reception component 2904 sends the communication metric information 2944 to the determination component 2914. The determination component 2914 may determine, based on the received communication metric information 2944, whether the joint enablement of the medium reserving procedure improves communication for the plurality of STAs 2950. In certain configurations, the determination component 2914 determines, based on the received communication metric information 2944, the communication metric of the plurality of STAs 2950 in the first time period and the communication metric of the plurality of STAs 2950 in the second time period.

In certain configurations, the reception component 2904 may receive data packets 2932 from each STA of the plurality of STAs 2950 with joint enablement of the medium reserving procedure in the first time period. The detection component 2916 may determine a respective first value of the communication metric for each STA of the plurality of STAs 2950 based on the data packets 2932 received from the each STA in the first time period. The reception component 2904 may receive data packets 2932 from each STA of the plurality of STAs 2950 with joint disablement of the medium reserving procedure in the second time period. The detection component 2916 may determine a respective second value of the communication metric for each STA of the plurality of STAs 2950 based on the data received from the each STA in the second time period. The detection component 2916 sends corresponding detection information 2935 the determination component 2914. The determination component 2914 may determine the improvement of the communication metric based on the first values and the second values.

The determination component 2914 may decide to request the plurality of STAs 2950 to jointly enable the medium reserving procedure for subsequent communication when the joint enablement of the medium reserving procedure improves communication for the plurality of STAs 2950. In certain configurations, the determination component 2914 determines, based on the received communication metric information 2944, an improvement of the communication metric in the first time period comparing with the communication metric in the second time period. The communication for the plurality of STAs 2950 is determined to be improved when the improvement of the communication metric meets a first threshold.

Accordingly, the determination component 2914 sends a request instruction 2934 to the request component 2912. The request component 2912 constructs a request frame 2942 and sends the request frame 2942 to the transmission component 2910. The transmission component 2910 transmits the request frame 2942 to the plurality of STAs 2950.

In certain configurations, the medium reserving procedure employs an RTS/CTS procedure. In certain configurations, the communication metric includes at least one of an actual throughput, an equivalent full buffer throughput, a retry rate, a PER, a MCS, or an access delay.

The apparatus may include additional components that perform each of the blocks of the algorithm in the aforementioned flowcharts of FIGS. 11-28. As such, each block in the aforementioned flowcharts of FIGS. 11-28 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The request component 2912, the determination component 2914, and the detection component 2916 may constitute the MRP component 224 shown in FIG. 2. The request component 2912, the determination component 2914, and the detection component 2916 may employ the processor 204, the memory 206, the signal detector 218, the DSP 220, and/or the user interface 222. The reception component 2904 and the transmission component 2910 may employ the processor 204, the memory 206, the signal detector 218, and/or the DSP 220. The transceiver 214 receives a signal from the one or more antennas 216, extracts information from the received signal, and provides the extracted information to the reception component 2904. In addition, the transceiver 214 receives information from the transmission component 2910, and based on the received information, generates a signal to be applied to the one or more antennas 216.

In one aspect, the apparatus 2902/202 may be an AP. The apparatus 2902/202 may be configured to include means for performing the operations illustrated in FIGS. 11-28. More specifically, the apparatus 2902/202 may be configured to include means for requesting a plurality of STAs to jointly enable and disable a medium reserving procedure for communication based on at least one of that each STA of the plurality of STAs has uplink traffic with the AP or that each STA of a subset of STAs of the plurality of STAs has a hidden node that transmits data to the AP and disrupts a communication between the AP and the each STA. The apparatus 2902/202 may be configured to include means for receiving, from the plurality of STAs, information indicating a communication metric while jointly enabling or disabling the medium reserving procedure for communication. The apparatus 2902/202 may be configured to include means for determining, based on the received information indicating the communication metric, whether the joint enablement of the medium reserving procedure improves communication for the plurality of STAs. The apparatus 2902/202 may be configured to include means for requesting the plurality of STAs to jointly enable the medium reserving procedure for subsequent communication when the joint enablement of the medium reserving procedure improves communication for the plurality of STAs.

In certain configurations, the apparatus 2902/202 may be configured to include means for determining that each of the plurality of STAs has a hidden node. The plurality of STAs are requested to jointly enable and disable the medium reserving procedure based on the AP receiving interference from the hidden node in association with the plurality of STAs. In certain configurations, the apparatus 2902/202 may be configured to include means for determining that each STA of the subset of STAs has a hidden node that causes interference to the AP. The plurality of STAs are requested to jointly enable and disable the medium reserving procedure based on that the plurality of STAs each have uplink traffic and that a ratio of the subset of STAs with respect to the plurality of STAs meets a threshold. In certain configurations, the medium reserving procedure employs an RTS/CTS procedure. In certain configurations, the communication metric includes at least one of an actual throughput, an equivalent full buffer throughput, a retry rate, a PER, a MCS, or an access delay.

In certain configurations, the means for requesting the plurality of STAs to jointly enable and disable the medium reserving procedure is further configured to request the plurality of STAs to jointly enable the medium reserving procedure for communication in a first time period and to jointly disable the medium reserving procedure for communication in a second time period. The means for determining whether the joint enablement of the medium reserving procedure improves communication is further configured to determine the communication metric of the plurality of STAs in the first time period and the communication metric of the plurality of STAs in the second and to determine an improvement of the communication metric in the first time period comparing with the communication metric in the second time period. The communication for the plurality of STAs is determined to be improved when the improvement of the communication metric meets a first threshold.

In certain configurations, the means for determining the communication metric of the plurality of STAs in the first time period and the communication metric of the plurality of STAs in the second time period is further configured to receive data from each STA of the plurality of STAs with joint enablement of the medium reserving procedure in the first time period. the means for determining the communication metric of the plurality of STAs in the first time period and the communication metric of the plurality of STAs in the second time period is further configured to determine a respective first value of the communication metric for each STA of the plurality of STAs based on the data received from the each STA in the first time period. The means for determining the communication metric of the plurality of STAs in the first time period and the communication metric of the plurality of STAs in the second time period is further configured to receive data from each STA of the plurality of STAs with joint disablement of the medium reserving procedure in the second time period. the means for determining the communication metric of the plurality of STAs in the first time period and the communication metric of the plurality of STAs in the second time period is further configured to determine a respective second value of the communication metric for each STA of the plurality of STAs based on the data received from the each STA in the second time period. The improvement of the communication metric is determined based on the first values and the second values.

In certain configurations, the means for requesting the plurality of STAs to jointly enable the medium reserving procedure for communication in the first time period and to jointly disable the medium reserving procedure for communication in the second time period is further configured to transmit, to the plurality of STAs, a first time indicator indicating the first time period and to transmit, to the plurality of STAs, a second time indicator indicating the second time period. In certain configurations, the apparatus 2902/202 may be configured to include means for requesting the plurality of STAs to jointly enable the medium reserving procedure for communication in the first time period and to jointly disable the medium reserving procedure for communication in the second time period is further configured to transmit, to the plurality of STAs, a STA indicator identifying the each STA of the plurality of STAs. In certain configurations, the STA indicator is included in an information element (IE) of a frame or is an information bit in a frame. In certain configurations, the apparatus 2902/202 may be configured to include means for determining that a first STA of the subset of STAs has a hidden node when the AP detects a change of a signal metric during reception a data packet received from the first STA.

In certain configurations, the apparatus 2902/202 may be configured to include means for receiving the data packet from the first STA. The apparatus 2902/202 may be configured to include means for determining a first value of the signal metric at a first position of the data packet. The apparatus 2902/202 may be configured to include means for determining a second value of the signal metric at a second position of the data packet. The change of the signal metric is detected based on the first value and the second value. In certain configurations, the signal metric includes at least one of a RSSI, an estimated channel coefficient, an estimated phase offset, an estimated frequency offset, or a measured pilot error vector magnitude.

In certain configurations, the apparatus 2902/202 may be configured to include means for determining that a first STA of the subset of STAs has a hidden node when the AP detects that one or more data units in a data packet from the first STA have not been correctly received at the AP. In certain configurations, the apparatus 2902/202 may be configured to include means for determining that a first STA of the subset of STAs has a hidden node when the AP detects a difference between an estimated PER and a measured PER for packets received from the first STA. In certain configurations, the apparatus 2902/202 may be configured to include means for determining that a first STA of the subset of STAs has a hidden node when the AP receives a report from the first STA. The report includes an identification of the hidden node of the first STA.

The aforementioned means may be one or more of the aforementioned components of the wireless device 202/2902 configured to perform the functions recited by the aforementioned means. The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Figure 30:
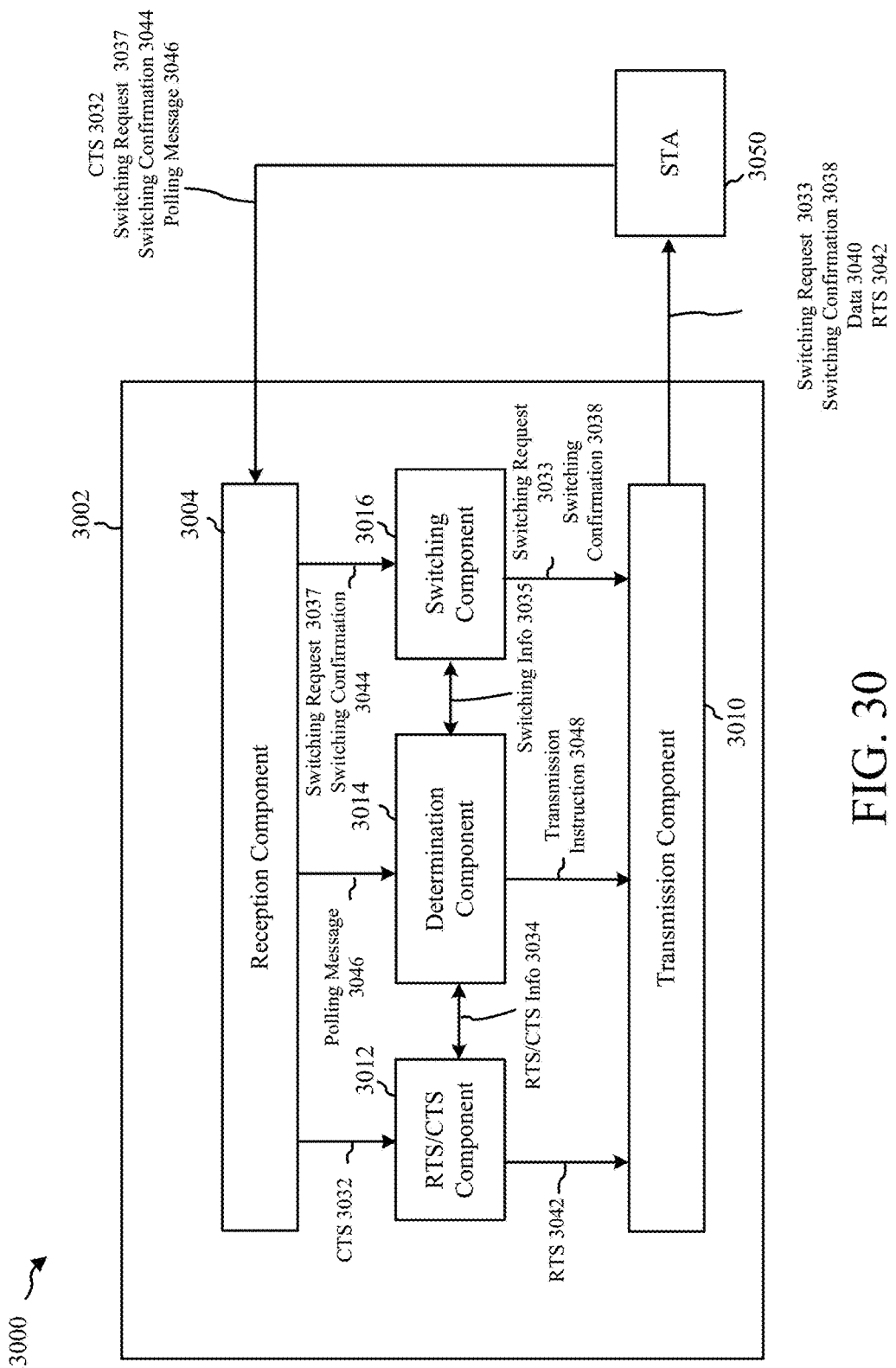
FIG. 30 is a conceptual data flow diagram illustrating the data flow between different components/means in another exemplary apparatus.

FIG. 30 is a conceptual data flow diagram 3000 illustrating the data flow between different components/means in an exemplary apparatus 3002. The apparatus 3002 may be a first STA (e.g., the station 114, the station 902). The apparatus 3002 includes a reception component 3004, a transmission component 301 an RTS/CTS component 3012, a determination component 3014, and a detection component 3016.

The apparatus 3002/202 is communication with the STA 3050 via the reception component 3004 and the transmission component 3010. The RTS/CTS component 3012 may construct one or more RTS messages 3042 in accordance with an RTS/CTS procedure. The RTS/CTS component 3012 sends the RTS messages 3042 to the transmission component 3010. The transmission component 3010 transmits the RTS messages 3042 to the STA 3050.

The reception component 3004 may receive zero or more CTS messages 3032 in response to the RTS messages from the STA 3050. The reception component 3004 sends the CTS messages 3032 to the RTS/CTS component 3012. The RTS/CTS component 3012 sends corresponding RTS/CTS information 3034 to the determination component 3014. The determination component 3014 may determine a response rate based on the RTS/CTS information 3034. The determination component 3014 sends switching information 3035 to the detection component 3016 when the response rate meets a threshold. The switching information 3035 indicates to request the STA 3050 to implement a polling procedure. The polling procedure announces receiver availability for receiving data transmission. Accordingly, the detection component 3016 construct a corresponding first switching request 3033 and sends the first switching request 3033 to the transmission component 3010. The transmission component 3010 transmits the first switching request 3033 to the STA 3050. The first switching request 3033 requests the STA 3050 to implement the polling procedure. In certain configurations, the first switching request 3033 includes a channel load at the apparatus 3002/202.

In certain configurations, the RTS/CTS component 3012 determines that the one or more RTS messages 3042 include a first number of RTS messages. The RTS/CTS component 3012 determines that the CTS messages 3032 include a second number of CTS messages. The RTS/CTS information 3034 includes information regarding the first number and the second number. The determination component 3014 determines the response rate based on the first number and the second number.

In certain configurations, the reception component 3004 may receive, from the STA 3050, a first switching confirmation 3044 indicating that the STA 3050 implements the polling procedure. The reception component 3004 sends the first switching confirmation 3044 to the detection component 3016. The detection component 3016 sends switching information 3035 indicating the confirmation to the determination component 3014.

Subsequently, the reception component 3004 may receiving a polling message 3046 in accordance with the polling procedure. The polling message indicates that the STA 3050 is available for data transmission. The reception component 3004 sends the polling message 3046 to the determination component 3014. The determination component 3014 sends a transmission instruction 3048 to the reception component 2904 to instructs the reception component 2904 to transmit data 3040 to the STA 3050.

In certain configurations, the reception component 3004 may receive, from the STA 3050, a second switching request 3037 requesting the apparatus 3002/202 to implement the RTS/CTS procedure. The second switching request 3037 includes a channel load at the STA 3050. The reception component 3004 sends the second switching request 3037 to the detection component 3016. The detection component 3016 accordingly sends switching information 3035 indicating such request to the determination component 3014. The determination component 3014 determines that a difference between the channel load at the STA 3050 and a channel load at the apparatus 3002/202 meets a threshold. The determination component 3014 sends to the detection component 3016 switching information 3035 indicating a confirmation of the request. The detection component 3016 constructs a corresponding second switching confirmation 3038 and send the second switching confirmation 3038 to the reception component 3004. The reception component 3004 transmits, to the STA 3050, the second switching confirmation 3038 indicating that the apparatus 3002/202 implements the RTS/CTS procedure.

The apparatus may include additional components that perform each of the blocks of the algorithm in the aforementioned flowcharts of FIGS. 11-28. As such, each block in the aforementioned flowcharts of FIGS. 11-28 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The RTS/CTS component 3012, the determination component 3014, and the detection component 3016 may constitute the MRP component 224 shown in FIG. 2. The RTS/CTS component 3012, the determination component 3014, and the detection component 3016 may employ the processor 204, the memory 206, the signal detector 218, the DSP 220, and/or the user interface 222. The reception component 3004 and the transmission component 3010 may employ the processor 204, the memory 206, the signal detector 218, and/or the DSP 220. The transceiver 214 receives a signal from the one or more antennas 216, extracts information from the received signal, and provides the extracted information to the reception component 3004. In addition, the transceiver 214 receives information from the transmission component 3010, and based on the received information, generates a signal to be applied to the one or more antennas 216.

In one aspect, the apparatus 3002/202 may be a first STA. The apparatus 3002/202 may be configured to include means for performing the operations illustrated in FIGS. 11-28. More specifically, the apparatus 3002/202 may be configured to include means for sending, in accordance with the RTS/CTS procedure, one or more RTS messages to a second STA. The apparatus 3002/202 may be configured to include means for receiving zero or more CTS messages in response to the RTS messages from the second STA. The apparatus 3002/202 may be configured to include means for determining a response rate based on the RTS messages and the CTS messages. The apparatus 3002/202 may be configured to include means for sending a first switching request to the second STA when the response rate meets a threshold, the first switching request requesting the second STA to implement a polling procedure, the polling procedure announcing receiver availability for receiving data transmission.

In certain configurations, the first switching request includes a channel load at the first STA. In certain configurations, the one or more RTS messages include a first number of RTS messages. The zero or more CTS messages include a second number of CTS messages. The response rate is determined based on the first number and the second number.

In certain configurations, the apparatus 3002/202 may be configured to include means for receiving, from the second STA, a first switching confirmation indicating that the second STA implements the polling procedure. The apparatus 3002/202 may be configured to include means for receiving a polling message in accordance with the polling procedure. The polling message indicates that the second STA is available for data transmission. The apparatus 3002/202 may be configured to include means for transmitting data to the second STA in response to the polling message.

In certain configurations, the apparatus 3002/202 may be configured to include means for receiving, from the second STA, a second switching request requesting the first STA to implement the RTS/CTS procedure. The second switching request includes a channel load at the second STA. The apparatus 3002/202 may be configured to include means for determining that a difference between the channel load at the second STA and a channel load at the first STA meets a threshold. The apparatus 3002/202 may be configured to include means for transmitting, to the second STA, a second switching confirmation indicating that the first STA implements the RTS/CTS procedure.

The aforementioned means may be one or more of the aforementioned components of the wireless device 202/3002 configured to perform the functions recited by the aforementioned means. The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Figure 31:
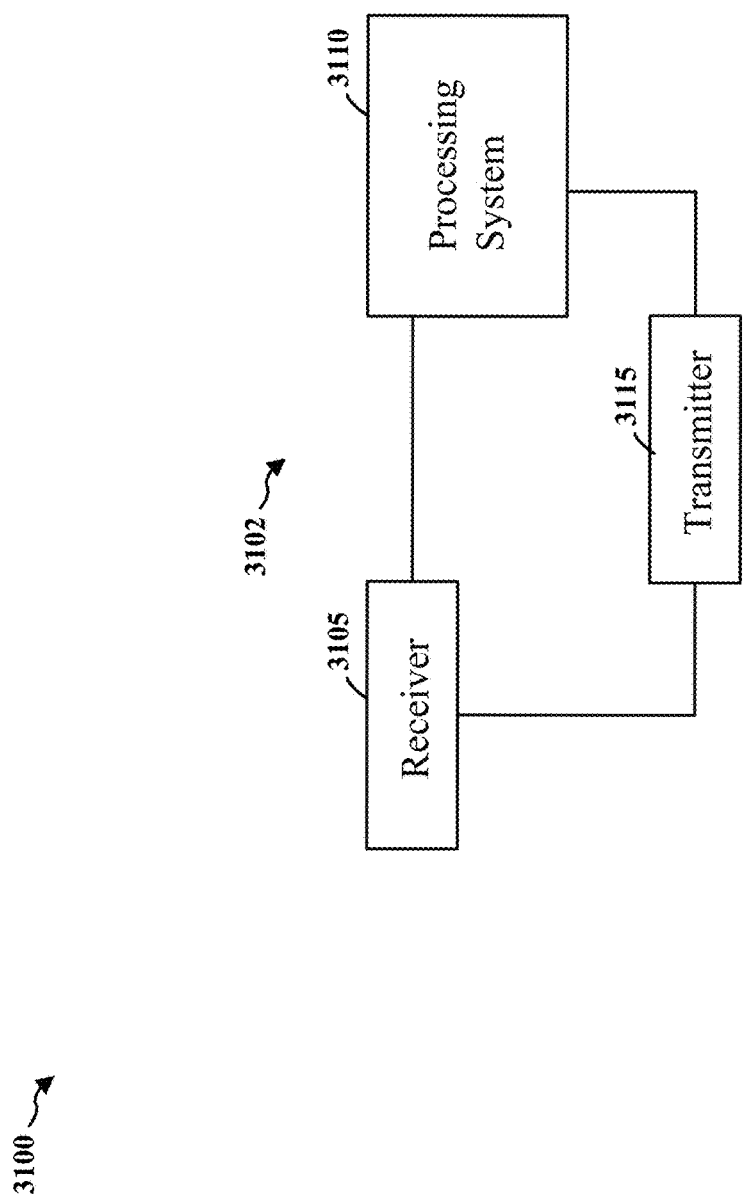
FIG. 31 is a functional block diagram of an example wireless communication device.

FIG. 31 is a functional block diagram 3100 of an example wireless communication device 3102. The wireless communication device 3102 may include a receiver 3105, a processing system 3110, and a transmitter 3115.

In one configuration, the wireless communication device 3102 is an AP. The receiver 3105, the processing system 3110, and/or the transmitter 3115 may be configured to request first and second STAs to jointly use a medium reserving procedure to transmit data to the AP. The medium reserving procedure reserves a medium for data transmission. The medium reserving procedure may employ an RTS/CTS procedure.

The processing system 3110 and/or the transmitter 3115 may be configured to transmit a first STA indicator identifying the first STA to instruct the first STA to use the medium reserving procedure to transmit data to the AP. The processing system 3110 and/or the transmitter 3115 may be configured to transmit a second STA indicator identifying the second STA to instruct the second STA to use the medium reserving procedure to transmit data to the AP. The first STA indicator and the second STA indicator may be included in an IE of a frame.

The processing system 3110 and/or the transmitter 3115 may be configured to transmit a first time indicator specifying the first time period to transmit data to the AP using the medium reserving procedure. The processing system 3110 and/or the transmitter 3115 may be configured to selectively transmit a second time indicator specifying the second time period to transmit data to the AP without using the medium reserving procedure. The processing system 3110 and/or the transmitter 3115 may be configured to transmit a common STA indicator that instructs all receiving STAs to jointly use the medium reserving procedure to transmit data to the AP.

The processing system 3110 may be configured to identify a plurality of STAs from each of which interference exists at of the AP in data reception. The processing system 3110 may be configured to determine whether a ratio of the plurality of STAs with respect to STAs in communication with the AP is greater than a predetermined threshold. The common STA indicator is transmitted in response to determining that the ratio is greater than the predetermined threshold.

The processing system 3110 and/or the transmitter 3115 may be configured to transmit a capability indicator indicating a capability of the AP to request two or more STAs to jointly use the medium reserving procedure to transmit data to the AP. The processing system 3110 and/or the transmitter 3115 may be configured to transmit a report indicator that requests a STA to report a throughput metric to the AP in a measurement period specified in the indicator. The receiver 3105 and/or the processing system 3110 may be configured to receive a request from the first STA to instruct both the first STA and the second STA to transmit data using the medium reserving procedure.

The processing system 3110 may be configured to identify the first STA from which interference exists at the AP in data reception. The processing system 3110 may be configured to identify the second STA to jointly use the medium reserving procedure with the first STA to transmit data to the AP. To identify the first STA, the processing system 3110 may be configured to determine whether a hidden STA of the first STA exists. The hidden STA transmits data to the AP and disrupts a data communication of the first STA.

To determine whether the hidden STA of the first STA exists, the receiver 3105, the processing system 3110, and/or the transmitter 3115 may be configured to obtain an indication of at least one of a change of a signal metric of a first data packet received from the first STA, one or more data units in a second data packet that have not been correctly received from the first STA, or a difference between an estimated PER and a measured PER of packets received from the first STA. The processing system 3110 may be configured to determine whether the hidden STA of the first STA exists based on the indication. To determine whether the hidden STA of the first STA exists, receiver 3105 and/or the processing system 3110 may be configured to receive a report from the first STA. The report includes an identification of a hidden STA disrupting the data communication of the first STA. The AP identifies the first STA based on the report.

To determining whether the hidden STA of the first STA exists, the receiver 3105 and/or the processing system 3110 may be configured to receive a first data packet from the first STA. The receiver 3105 and/or the processing system 3110 may be configured to obtain a first value of a signal metric at a first position of the first data packet. The receiver 3105 and/or the processing system 3110 may be configured to obtain a second value of the signal metric at a second position of the first data packet. The processing system 3110 may be configured to evaluate the first value and the second value. The signal metric may include at least one of an RSSI, an estimated channel coefficient, an estimated phase offset, an estimated frequency offset, or a measured pilot error vector magnitude.

The receiver 3105, the processing system 3110, and/or the transmitter 3115 may be configured to initiate an evaluation procedure with the first and second STAs. The evaluation procedure determines an evaluation result associated with throughputs of respective data communications between the AP and the first STA and the second STA jointly using the medium reserving procedure. The requesting first and second STAs is executed in response to the evaluation result. To execute the evaluation procedure, the receiver 3105 and/or the processing system 3110 may be configured to receive data from the first STA and the second STA jointly using the medium reserving procedure in a first time period. The receiver 3105 and/or the processing system 3110 may be configured to determine first values of a throughput metric of the data received, respectively, from the first and second STAs in the first time period. The receiver 3105 and/or the processing system 3110 may be configured to receive data from the first STA and the second STA without using the medium reserving procedure in a second time period. The processing system 3110 may be configured to determine second values of the throughput metric of the data received, respectively, from the first and second STAs, respectively, in the second time period. The processing system 3110 may be configured to determine the evaluation result based on the first values and the second values.

In one configuration, the wireless communication device 3102 is a STA. The receiver 3105 and/or the processing system 3110 may be configured to receive an acknowledgment from an AP. The acknowledgment acknowledges receipt of a data packet. The receiver 3105 and/or the processing system 3110 may be configured to determine whether the data packet was received at the first STA at a predetermined time period prior to receiving the acknowledgment. In response to determining that the data packet was not received, the processing system 3110 may be configured to obtain a source identification and a destination identification from the acknowledgment. The source identification is associated with the AP. The destination identification is associated with a second STA. The processing system 3110 and/or the transmitter 3115 may be configured to send a request to the AP. The request requests the AP to instruct both the first STA and the second STA to transmit data using a medium reserving procedure. The medium reserving procedure reserves a medium for data transmission.

The receiver 3105 and/or the processing system 3110 may be configured to detect an indication in the acknowledgment. The indication indicates that the data packet was received at the AP at the predetermined time period prior to sending the acknowledgment. The determining whether the data packet was received is executed in response to detecting the indication.

In one configuration, the wireless communication device 3102 is a STA. The receiver 3105 and/or the processing system 3110 may be configured to receive a STA indicator from an AP. The processing system 3110 may be configured to determine whether the STA indicator identifies the STA. In response to determining that the STA indicator identifies the STA, the processing system 3110 and/or the transmitter 3115 may be configured to transmit data to the AP using a medium reserving procedure. The medium reserving procedure reserves a medium for data transmission. The STA indicator may be included in an IE of a frame. The receiver 3105 and/or the processing system 3110 may be configured to receiving the frame and to detect whether the STA indicator is present in the IE. The processing system 3110 and/or the transmitter 3115 may be configured to transmit a capability indicator indicating a capability of the STA to jointly use the medium reserving procedure with another STA.

In one configuration, the wireless communication device 3102 is a STA. The receiver 3105, the processing system 3110, and/or the transmitter 3115 may be configured to obtain an indication of at least one of a change of a signal metric of a first data packet received at a second STA, one or more data units in a second data packet that have not been correctly received at the second STA, or a difference between an estimated PER and a measured PER at the second STA. The processing system 3110 may be configured to determine whether to transmit data to the second STA using a medium reserving procedure based on the indication. The medium reserving procedure reserves a medium for data transmission. The medium reserving procedure may employ an RTS/CTS procedure.

The processing system 3110 may be configured to determine whether to initiate an evaluation procedure with the second STA based on the indication. The evaluation procedure determines an evaluation result associated with a throughput of a data communication between the first STA and the second STA using the medium reserving procedure. The determining whether to transmit data is executed in response to the evaluation result. To execute the evaluation procedure, the processing system 3110 and/or the transmitter 3115 may be configured to transmit first data to the second STA using the medium reserving procedure in a first time period. The processing system 3110 may be configured to determine a first value of a throughput metric of the transmitted first data. The processing system 3110 and/or the transmitter 3115 may be configured to may transmit second data to the second STA without using the medium reserving procedure in a second time period. The processing system 3110 may be configured to determine a second value of the throughput metric of the transmitted second data. The processing system 3110 may be configured to determine the evaluation result based on the first and second values. The throughput metric may be based on an actual throughput determined at one or more of the first STA or the second STA. The throughput metric may be based on an equivalent full buffer throughput determined at the first STA.

To obtain the indication of the change of the signal metric, the receiver 3105 and/or the processing system 3110 may be configured to obtain a first value of the signal metric at a first position of the first data packet. The receiver 3105 and/or the processing system 3110 may be configured to may obtain a second value of the signal metric at a second position of the first data packet. The processing system 3110 may be configured to may determine the change of the signal metric based on the first value and the second value. The signal metric may include at least one of an RSSI, an estimated channel coefficient, an estimated phase offset, an estimated frequency offset, or a measured pilot error vector magnitude.

To obtain the indication of the one or more data units, the processing system 3110 and/or the transmitter 3115 may be configured to transmit the second data packet including at least one data unit to the second STA. The receiver 3105 and/or the processing system 3110 may be configured to receive an acknowledgment from the second STA. The acknowledgment includes the indication of the one or more data units of the at least one data unit that have not been correctly received at the second STA. The second data packet may include a PPDU. The at least one data unit may include a plurality of MPDUs. The acknowledgment may be a block acknowledgment. The indication may indicate MPDUs of the plurality of MPDUs that have been correctly received at the second STA and MPDUs of the plurality of MPDUs that have not been correctly received at the second STA. The determining to initiate the evaluation procedure may be based on the number, a ratio, or a distribution of MPDUs that have not been correctly received at the second STA.

To obtain the indication of the difference between the estimated PER and a measured PER, the processing system 3110 and/or the transmitter 3115 may be configured to transmit a plurality of data packets to the second STA. The receiver 3105 and/or the processing system 3110 may be configured to determine the measured PER by measuring a PER of the plurality of data packets. The processing system 3110 may be configured to determine the estimated PER by estimating a PER based on a signal and noise indicator between the first STA and the second STA. The processing system 3110 may be configured to determine the difference based on the measured PER and the estimated PER. The signal and noise indicator is a signal-to-noise ratio. To estimate the PER, the receiver 3105 and/or the processing system 3110 may be configured to receive an RSSI from the second STA. The processing system 3110 may be configured to determine the signal-to-noise ratio based on the RSSI.

In one configuration, the wireless communication device 3102 is a STA. The processing system 3110 and/or the transmitter 3115 may be configured to transmit data packets to another STA using a medium reserving procedure. The medium reserving procedure reserves a medium for data transmission. The receiver 3105, the processing system 3110, and/or the transmitter 3115 may be configured to determine a measurement with respect to occurrences of interference to the transmitted data packets. The processing system 3110 may be configured to determine whether the measurement is greater than a predetermined threshold. In response to determining that the measurement is greater than the predetermined threshold, the receiver 3105, the processing system 3110, and/or the transmitter 3115 may be configured to initiate an enhancement procedure that reduces the occurrences of interference to the transmitted data packets. The medium reserving procedure may employ an RTS/CTS procedure.

To execute the enhancement procedure, the processing system 3110 and/or the transmitter 3115 may be configured to transmit a request requesting a receiving STA to reduce an OTA medium occupancy of the receiving STA. The request may instruct the receiving STA to adjust an EDCA parameter. The request may instruct the receiving STA to maintain one or more silence periods. The one or more silence periods may include at least three silence periods and may be periodic.

To execute the enhancement procedure, the processing system 3110 and/or the transmitter 3115 may be configured to transmit in a repeating pattern a request in accordance with the medium reserving procedure to the another STA. The medium reserving procedure reserves a medium for data transmission. The receiver 3105 and/or the processing system 3110 may be configured to receive in a repeating pattern a response in accordance with the medium reserving procedure from the another STA. The medium reserving procedure may employ an RTS/CTS procedure. Both the request may be transmitted and the response is received in the respective repeating pattern.

To execute the enhancement procedure, the processing system 3110 and/or the transmitter 3115 may be configured to transmit a first power indicator in a request in accordance with a medium reserving procedure to the another STA. The first power indicator indicates a transmission power to be used at the another STA to transmit a response in accordance with the medium reserving procedure to the STA. The receiver 3105 and/or the processing system 3110 may be configured to receive a second power indicator in the response from the another STA. The second power indicator indicates a transmission power to be used at the STA to transmit another request in accordance with the medium reserving procedure to the another STA.

The transmitting data packets to the another STA using the medium reserving procedure may include transmitting a first request in accordance with the medium reserving procedure at a first data rate. To execute the enhancement procedure, the processing system 3110 and/or the transmitter 3115 may be configured to transmit a second request in accordance with the medium reserving procedure at a second data rate that is lower than the first data rate. The processing system 3110 and/or the transmitter 3115 may be configured to transmit a third request in accordance with the medium reserving procedure at the first data rate prior to transmitting the second request in a same transmit opportunity in which the second request is transmitted.

In one configuration, the wireless communication device 3102 is a first STA. The receiver 3105, the processing system 3110, and/or the transmitter 3115 may be configured to communicate data with a second STA using one of a medium reserving procedure or a polling procedure. In the one of the medium reserving procedure or the polling procedure, the receiver 3105, the processing system 3110, and/or the transmitter 3115 may be configured to initiate a data transmission. The medium reserving procedure reserves a medium for data transmission. The polling procedure announces receiver availability for receiving data transmission. The receiver 3105, the processing system 3110, and/or the transmitter 3115 may be configured to initiate a switching procedure to allow the second STA to initiate the data transmission.

The processing system 3110 may be configured to determine a response rate of the data communication in accordance with the one of the medium reserving procedure and the polling procedure. The switching procedure is initiated in response to the response rate. To determine the response rate, the processing system 3110 and/or the transmitter 3115 may be configured to transmit M requests in accordance with the one of the medium reserving procedure and the polling procedure to the second STA, M being an integer greater than 1. The receiver 3105 and/or the processing system 3110 may be configured to receive N responses in accordance with the one of the medium reserving procedure and the polling procedure from the second STA, N being an integer greater than −1. The processing system 3110 may be configured to determine whether N/M is lower than a predetermined ratio.

To execute the switching procedure, the processing system 3110 and/or the transmitter 3115 may be configured to transmit a switching request to the second STA. The receiver 3105 and/or the processing system 3110 may be configured to receive a switching confirmation from the second STA. The receiver 3105 and/or the processing system 3110 may be configured to receive a request in accordance with the other one of the medium reserving procedure and the polling procedure. The switching request may include a channel load at the first STA.

In one configuration, the wireless communication device 3102 is a first STA. The receiver 3105, the processing system 3110, and/or the transmitter 3115 may be configured to communicate with a second STA using a medium reserving procedure or a polling procedure. In the medium reserving procedure or the polling procedure, the receiver 3105, the processing system 3110, and/or the transmitter 3115 may be configured to participate in a data transmission initiated by the second STA. The medium reserving procedure reserves a medium for data transmission. The polling procedure announces receiver availability for receiving data transmission. The receiver 3105 and/or the processing system 3110 may be configured to receive a switching request from the second STA. The processing system 3110 and/or the transmitter 3115 may be configured to transmit a switching confirmation to the second STA. The receiver 3105, the processing system 3110, and/or the transmitter 3115 may be configured to initiate a data transmission at availability of the first STA. The switching request may include a channel load at the second STA. The processing system 3110 may be configured to determine whether a difference between a channel load at the first STA and the channel load at the second STA is greater than a predetermined threshold. The switching confirmation is transmitted and the data transmission is initiated in response to determining that the difference is greater than the predetermined threshold.

The data communication may use the medium reserving procedure. To initiate the data transmission, the processing system 3110 and/or the transmitter 3115 may be configured to transmit a request in accordance with the polling procedure to the second STA at the availability of the first STA. The receiver 3105 and/or the processing system 3110 may be configured to receive data from the second STA.

The data communication may use the polling procedure. To initiate the data transmission, the processing system 3110 and/or the transmitter 3115 may be configured to transmit a request in accordance with the medium reserving procedure to the second STA at the availability of the first STA. The receiver 3105 and/or the processing system 3110 may be configured to receive a response in accordance with the medium reserving procedure from the second STA.

Moreover, means for execute all the operations described supra with reference to FIGS. 11-28 may comprise the processing system 3110, the receiver 3105, and/or the transmitter 3115.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that components, modules, and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication of an access point (AP), comprising:
   requesting a plurality of stations (STAs) to jointly enable a medium reserving procedure in a first time period and to jointly disable the medium reserving procedure in a second time period, with the medium reserving procedure reserving a medium for data transmission;
   receiving, from the plurality of STAs, information indicating a communication metric while jointly enabling or disabling the medium reserving procedure in the first time period or the second time period, respectively;
   determining, based on the received information indicating the communication metric, whether the joint enablement of the medium reserving procedure improves communication for the plurality of STAs; and
   requesting the plurality of STAs to jointly enable the medium reserving procedure for subsequent communication when the joint enablement of the medium reserving procedure improves communication for the plurality of STAs.

2. The method of claim 1, wherein the requesting a plurality of stations (STAs) to jointly enable a medium reserving procedure in a first time period and to jointly disable the medium reserving procedure in a second time period is based on each STA of the plurality of STAs having uplink traffic with the AP or each STA of a subset of STAs of the plurality of STAs having a hidden node that transmits data to the AP and disrupts a communication between the AP and the each STA.

3. The method of claim 2, further comprising determining that each of the plurality of STAs has a hidden node, wherein the plurality of STAs are requested to jointly enable and disable the medium reserving procedure based on the AP receiving interference from the hidden node in association with the plurality of STAs.

4. The method of claim 2, further comprising determining that each STA of the subset of STAs has a hidden node that causes interference to the AP, wherein the plurality of STAs are requested to jointly enable and disable the medium reserving procedure based on that the plurality of STAs each have uplink traffic and that a ratio of the subset of STAs with respect to the plurality of STAs meets a threshold.

5. The method of claim 1, wherein the medium reserving procedure employs a Request-to-Send (RTS)/Clear-to-Send (CTS) procedure.

6. The method of claim 1, wherein the communication metric includes at least one of an actual throughput, an equivalent full buffer throughput, a retry rate, a packet error rate (PER), a modulation coding scheme (MCS), or an access delay.

7. The method of claim 1,
   wherein the determining whether the joint enablement of the medium reserving procedure improves communication includes:
   determining the communication metric of the plurality of STAs in the first time period and the communication metric of the plurality of STAs in the second time period; and
   determining an improvement of the communication metric in the first time period comparing with the communication metric in the second time period, and wherein the communication for the plurality of STAs is determined to be improved when the improvement of the communication metric meets a first threshold.

8. The method of claim 7, wherein the determining the communication metric of the plurality of STAs in the first time period and the communication metric of the plurality of STAs in the second time period includes:
   receiving data from each STA of the plurality of STAs with joint enablement of the medium reserving procedure in the first time period;
   determining a respective first value of the communication metric for each STA of the plurality of STAs based on the data received from the each STA in the first time period;
   receiving data from each STA of the plurality of STAs with joint disablement of the medium reserving procedure in the second time period; and
   determining a respective second value of the communication metric for each STA of the plurality of STAs based on the data received from the each STA in the second time period, wherein the improvement of the communication metric is determined based on the first values and the second values.

9. The method of claim 7, wherein the requesting the plurality of STAs to jointly enable the medium reserving procedure in the first time period and to jointly disable the medium reserving procedure in the second time period comprising:
   transmitting, to the plurality of STAs, a first time indicator indicating the first time period; and
   transmitting, to the plurality of STAs, a second time indicator indicating the second time period.

10. The method of claim 7, wherein the requesting the plurality of STAs to jointly enable the medium reserving procedure in the first time period and to jointly disable the medium reserving procedure in the second time period comprising:
    transmitting, to the plurality of STAs, a STA indicator identifying the each STA of the plurality of STAs.

11. The method of claim 10, wherein the STA indicator is included in an information element (IE) of a frame or is an information bit in a frame.

12. The method of claim 1, further comprising determining that a first STA of the subset of STAs has a hidden node when the AP detects a change of a signal metric during reception a data packet received from the first STA.

13. The method of claim 12, further comprising:
    receiving the data packet from the first STA;
    determining a first value of the signal metric at a first position of the data packet; and
    determining a second value of the signal metric at a second position of the data packet, wherein the change of the signal metric is detected based on the first value and the second value.

14. The method of claim 12, wherein the signal metric includes at least one of a received signal strength indication (RSSI), an estimated channel coefficient, an estimated phase offset, an estimated frequency offset, or a measured pilot error vector magnitude.

15. The method of claim 1, further comprising determining that a first STA of the subset of STAs has a hidden node when the AP detects that one or more data units in a data packet from the first STA have not been correctly received at the AP.

16. The method of claim 1, further comprising determining that a first STA of the subset of STAs has a hidden node when the AP detects a difference between an estimated packet error rate (PER) and a measured PER for packets received from the first STA.

17. The method of claim 1, further comprising determining that a first STA of the subset of STAs has a hidden node when the AP receives a report from the first STA, wherein the report includes an identification of the hidden node of the first STA.

18. An apparatus for wireless communication, the apparatus being an access point (AP), comprising:
a memory; and
at least one processor coupled to the memory and configured to:
request a plurality of stations (STAs) to jointly enable a medium reserving procedure in a first time period and to jointly disable the medium reserving procedure in a second time period, with the medium reserving procedure reserving a medium for data transmission;
receive, from the plurality of STAs, information indicating a communication metric while jointly enabling or disabling the medium reserving procedure in the first time period or the second time period, respectively;
determine, based on the received information indicating the communication metric, whether the joint enablement of the medium reserving procedure improves communication for the plurality of STAs; and
request the plurality of STAs to jointly enable the medium reserving procedure for subsequent communication when the joint enablement of the medium reserving procedure improves communication for the plurality of STAs.

19. The apparatus of claim 18, wherein the requesting a plurality of stations (STAs) to jointly enable a medium reserving procedure in a first time period and to jointly disable the medium reserving procedure in a second time period is based on each STA of the plurality of STAs having uplink traffic with the AP or each STA of a subset of STAs of the plurality of STAs having a hidden node that transmits data to the AP and disrupts a communication between the AP and the each STA.

20. The apparatus of claim 19, wherein the at least one processor is further configured to determine that each of the plurality of STAs has a hidden node, wherein the plurality of STAs are requested to jointly enable and disable the medium reserving procedure based on the AP receiving interference from the hidden node in association with the plurality of STAs.

21. The apparatus of claim 19, wherein the at least one processor is further configured to determine that each STA of the subset of STAs has a hidden node that causes interference to the AP, wherein the plurality of STAs are requested to jointly enable and disable the medium reserving procedure based on that the plurality of STAs each have uplink traffic and that a ratio of the subset of STAs with respect to the plurality of STAs meets a threshold.

22. The apparatus of claim 18, wherein the medium reserving procedure employs a Request-to-Send (RTS)/Clear-to-Send (CTS) procedure.

23. The apparatus of claim 18, wherein the communication metric includes at least one of an actual throughput, an equivalent full buffer throughput, a retry rate, a packet error rate (PER), a modulation coding scheme (MCS), or an access delay.

24. The apparatus of claim 18,
wherein to determine whether the joint enablement of the medium reserving procedure improves communication, the at least one processor is further configured to:
determine the communication metric of the plurality of STAs in the first time period and the communication metric of the plurality of STAs in the second time period; and
determine an improvement of the communication metric in the first time period comparing with the communication metric in the second time period, and wherein the communication for the plurality of STAs is determined to be improved when the improvement of the communication metric meets a first threshold.

25. The apparatus of claim 24, wherein to determine the communication metric of the plurality of STAs in the first time period and the communication metric of the plurality of STAs in the second time period, the at least one processor is further configured to:
receive data from each STA of the plurality of STAs with joint enablement of the medium reserving procedure in the first time period;
determine a respective first value of the communication metric for each STA of the plurality of STAs based on the data received from the each STA in the first time period;
receive data from each STA of the plurality of STAs with joint disablement of the medium reserving procedure in the second time period; and
determine a respective second value of the communication metric for each STA of the plurality of STAs based on the data received from the each STA in the second time period, wherein the improvement of the communication metric is determined based on the first values and the second values.

* * * * *